US012219443B2

United States Patent
Li et al.

(10) Patent No.: US 12,219,443 B2
(45) Date of Patent: Feb. 4, 2025

(54) BROADCAST, MULTICAST, AND UNICAST ON SIDELINK FOR 5G eV2X

(71) Applicant: InterDigital Patent Holdings, Inc., Wilmington, DE (US)

(72) Inventors: Qing Li, Princeton Junction, NJ (US); Pascal M. Adjakple, Great Neck, NY (US); Guodong Zhang, Woodbury, NY (US); Mohamed Awadin, Plymouth Meeting, PA (US); Allan Y. Tsai, Boonton, NJ (US); Yifan Li, Conshohocken, PA (US); Lakshmi R. Iyer, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/265,254

(22) PCT Filed: Jul. 8, 2019

(86) PCT No.: PCT/US2019/040848
§ 371 (c)(1),
(2) Date: Feb. 2, 2021

(87) PCT Pub. No.: WO2020/033089
PCT Pub. Date: Feb. 13, 2020

(65) Prior Publication Data
US 2021/0306824 A1    Sep. 30, 2021

Related U.S. Application Data

(60) Provisional application No. 62/716,833, filed on Aug. 9, 2018, provisional application No. 62/734,673, filed
(Continued)

(51) Int. Cl.
*H04W 72/00*   (2023.01)
*H04L 1/1812*   (2023.01)
(Continued)

(52) U.S. Cl.
CPC ............ *H04W 4/40* (2018.02); *H04L 1/1819* (2013.01); *H04L 1/1896* (2013.01);
(Continued)

(58) Field of Classification Search
None
See application file for complete search history.

(56) References Cited

U.S. PATENT DOCUMENTS 11,102,800 B2 *   8/2021   Wildschek .......... H04W 72/121
11,284,387 B2 *   3/2022   Lin ....................... H04W 72/02
(Continued)

FOREIGN PATENT DOCUMENTS

CN    107113580 A    8/2017
CN    107736064 A    2/2018
(Continued)

OTHER PUBLICATIONS

LG Electronics Inc., "Introduction of LTE-based V2X services", 3GPP TSG-RAN WG2 Meeting #97, R2-1702426, Feb. 2017, pp. 17.
(Continued)

*Primary Examiner* — Brandon M Renner
(74) *Attorney, Agent, or Firm* — Flaster Greenberg, P.C.

(57) ABSTRACT

Methods, systems, and devices may assist in broadcast, multicast, or unicast on sidelink for 5G eV2X. The following mechanisms for broadcast, multicast, or unicast on sidelink for Vehicle to everything (V2X). Broadcast on sidelink may include methods, systems, or devices for broadcast occasions or monitoring window. Multicast on sidelink may include methods, systems, or devices for multicast occasions or group ID. Unicast on sidelink may include methods, systems, or devices for unicast occasions, UE ID, transmitter
(Continued)

initiated transmission, or receiver initiated. Methods, systems, or devices may use communication occasions for platooning.

10 Claims, 30 Drawing Sheets

Related U.S. Application Data on Sep. 21, 2018, provisional application No. 62/827,611, filed on Apr. 1, 2019.

(51) Int. Cl.
*H04L 1/1867* (2023.01)
*H04W 4/40* (2018.01)
*H04W 72/02* (2009.01)
*H04W 72/0446* (2023.01)
*H04W 72/0453* (2023.01)
*H04W 72/1263* (2023.01)
*H04W 72/20* (2023.01)

(52) U.S. Cl.
CPC ....... *H04W 72/02* (2013.01); *H04W 72/0446* (2013.01); *H04W 72/0453* (2013.01); *H04W 72/1263* (2013.01); *H04W 72/20* (2023.01)

(56) References Cited

U.S. PATENT DOCUMENTS

| | | | |
|---|---|---|---|
| 11,924,832 B2* | 3/2024 | Yao | H04W 72/20 |
| 2014/0269605 A1* | 9/2014 | Pecen | H04L 27/2678 370/330 |
| 2017/0127251 A1 | 5/2017 | Yi et al. | |
| 2017/0215183 A1 | 7/2017 | Gulati et al. | |
| 2017/0338912 A1* | 11/2017 | Nigam | H04L 1/1812 |
| 2017/0347394 A1 | 11/2017 | Yasukawa et al. | |
| 2018/0070264 A1* | 3/2018 | Saiwai | H04W 72/04 |
| 2018/0091265 A1* | 3/2018 | Liu | H04L 1/08 |
| 2018/0132207 A1 | 5/2018 | Zhang et al. | |
| 2018/0192397 A1 | 7/2018 | Seo | |
| 2019/0007974 A1* | 1/2019 | Nguyen | H04W 4/40 |
| 2019/0029029 A1 | 1/2019 | Ohtsuji et al. | |
| 2019/0058986 A1 | 2/2019 | Loehr et al. | |
| 2019/0182643 A1 | 6/2019 | Kim et al. | |
| 2020/0028635 A1* | 1/2020 | Lee | H04L 5/0094 |
| 2021/0204250 A1* | 7/2021 | Ashraf | H04W 72/56 |
| 2021/0289473 A1* | 9/2021 | Chae | H04W 4/46 |
| 2022/0060286 A1* | 2/2022 | Yoshioka | H04L 1/1854 |
| 2023/0020105 A1* | 1/2023 | Shin | H04W 72/542 |
| 2023/0318757 A1* | 10/2023 | Lee | H04L 1/08 370/329 |
| 2024/0048285 A1* | 2/2024 | Shrivastava | H04L 1/1825 |

FOREIGN PATENT DOCUMENTS

| | | |
|---|---|---|
| EP | 3206321 A1 | 8/2017 |
| EP | 3282618 A1 | 2/2018 |
| WO | 2013/095355 A1 | 6/2013 |
| WO | 2016/089185 A1 | 6/2016 |
| WO | 2017/126266 A1 | 7/2017 |
| WO | WO 2017/130592 A1 | 8/2017 |
| WO | 2018/048273 A1 | 3/2018 |
| WO | WO 2018/113676 A1 | 6/2018 |

OTHER PUBLICATIONS

Third Generation Partnership Project (3GPP), "Study on Enhancement of 3GPP Support for 5G V2X Services", Technical Specification Group Services and System Aspects, Release 15, 3GPP TR 22.886 V15.2.0, Jun. 2018, 58 pages.

Third Generation Partnership Project (3GPP), "Enhancement of 3GPP support for V2X scenarios", Technical Specification Group Services and System Aspects, Stage 1, Release 15, 3GPP TS 22.186 V15.3.0, Jun. 2018, 16 pages.

Third Generation Partnership Project (3GPP), "Physical Layer Procedures", Evolved Universal Terrestrial Radio Access (E-UTRA), Technical Specification Group Radio Access Network, Release 15, 3GPP TS 36.213 V15.2.0, Jun. 2018, 541 pages.

Third Generation Partnership Project (3GPP), "Final Report of 3GPP TSG RAN WG1 #91 V1.0.0 (Reno, USA, Nov. 27-Dec. 1, 2017)", MCC Support, 3GPP TSG RAN WG1 Meeting #92, Athens, Greece, Feb. 26-Mar. 2, 2018, R1-1801301, 218 pages.

* cited by examiner

BROADCAST, MULTICAST, AND UNICAST ON SIDELINK FOR 5G eV2X

CROSS-REFERENCE TO RELATED APPLICATIONS

This application is the National Stage Application of International Patent Application No. PCT/US2019/040848 filed Jul. 8, 2019 which application claims the benefit of U.S. provisional patent application No. 62/716,833, filed on Aug. 9, 2018, U.S. provisional patent application No. 62/734,673, filed on Sep. 21, 2018, and U.S. provisional patent application No. 62/827,611, filed on Apr. 1, 2019, the contents of all applications are hereby incorporated by reference herein in their entirety.

BACKGROUND

Use Cases and Requirements for 5G V2X: As Vehicle-to-everything (V2X) applications making significant progress, transmission of short messages about vehicles' own status data for basic safety needs be extended with transmission of larger messages including raw sensor data, vehicles' intention data, coordination, confirmation of future maneuver, etc. For these advanced applications, the expected requirements to meet the needed data rate, latency, reliability, communication range and speed are made more stringent.

For enhanced V2X (eV2X) services, 3GPP has identified 25 use cases and the related requirements in TR 22.886. See 3GPP TR 22.886 Study on enhancement of 3GPP Support for 5G V2X Services, Release 15, V15.2.0.

A set of the normative requirements are specified in TS 22.186 with the use cases categorized into four use case groups: vehicles platooning, extended sensors, advanced driving and remote driving. See 3GPP TS 22.186 Enhancement of 3GPP support for V2X scenarios (Stage 1), Release 15, V15.3.0.

The detailed description of performance requirements for each use case group specified in TS 22.186.

Communication for V2X in LTE: In Release 14 LTE V2X, basic requirements for V2X service have been supported for road safety service, i.e. support low latency and reliable exchange of messages among vehicles and the infrastructure to enhance safety and efficiency.

V2X services can be provided by PC5 interface or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

Communications at LTE-Uu interface can be unicast and/or MBMS. These two operation modes may be used by a UE independently for transmission and reception, e.g., a UE can use MBMS for reception without using LTE-Uu for transmission. A UE may also receive V2X messages via LTE-Uu unicast downlink.

SUMMARY

Disclosed herein are methods, systems, and devices that may assist in broadcast, multicast, or unicast on sidelink for 5G eV2X. The following mechanisms for broadcast, multicast, or unicast on sidelink for Vehicle to everything (V2X). Broadcast on sidelink may include methods, systems, or devices for broadcast occasions or source ID or monitoring window or sensing. Multicast on sidelink may include methods, systems, or devices for multicast occasions or group ID or monitoring window or sensing. Unicast on sidelink may include methods, systems, or devices for unicast occasions, UE ID, monitoring window, sensing, transmitter controlled unicast, or receiver control unicast. Also, disclosed herein is methods, systems, or devices for communication occasions for platooning, and V2X communication occasions in proximity, among other things.

Further more, the following mechanisms for broadcast, multicast, or unicast on sidelink for Vehicle to everything (V2X) are disclosed herein: 1) configurations for broadcast, groupcast, or unicast; 2) control signaling for broadcast, groupcast, or unicast; or 3) procedures for broadcast, groupcast, or unicast.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
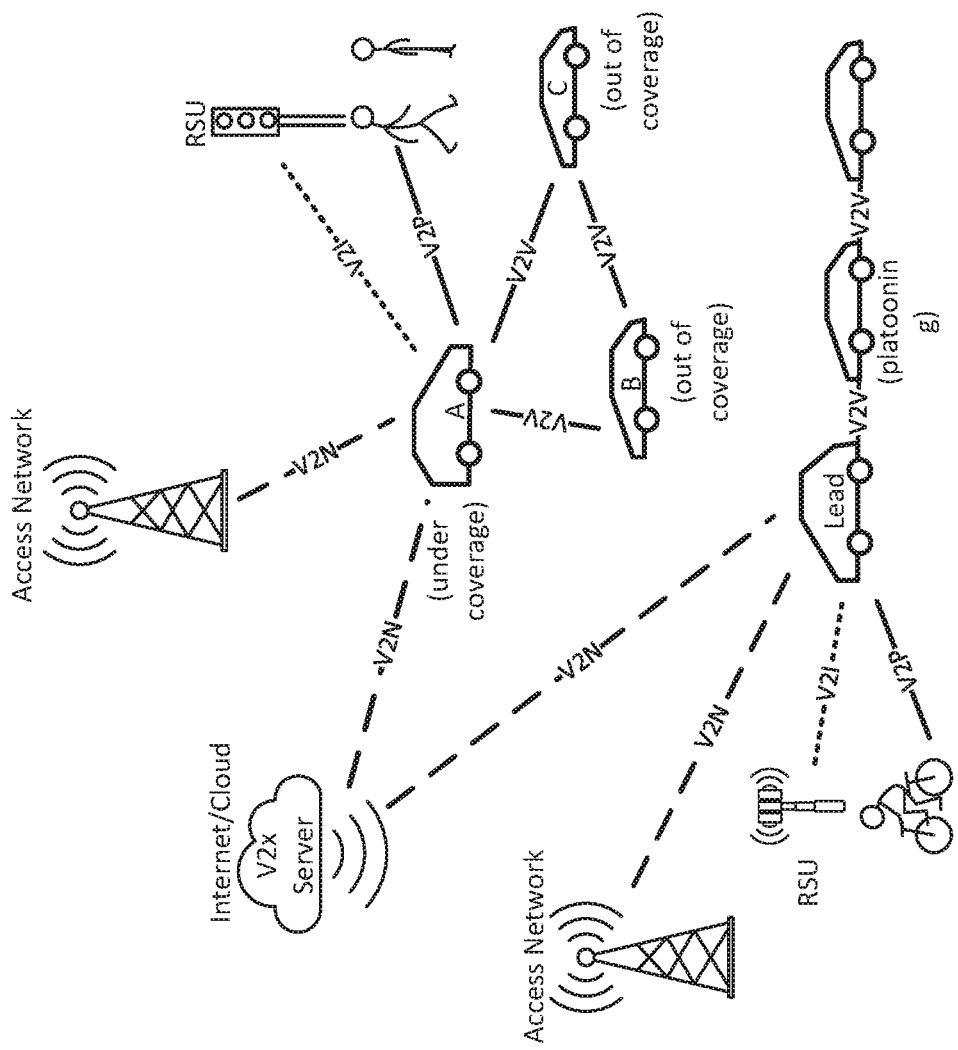
FIG. 1 illustrates exemplary advanced V2X services.

As illustrated in FIG. 1, the advanced V2X applications have created a shift towards more proactive and intelligent transport infrastructure, which requires more dynamically mixed communications, such as broadcast, multicast and unicast in proximity, within and among distributed V2X networks. As more stringent latency and reliability are required, optimization on communications over sidelink may be significant in advancing V2X services.

Different schemes for broadcast, multicast, and unicast on sidelink are described herein. Many advanced V2X applications work well with efficient communications for sharing information, such as trajectory or maneuver maps, emergency site images, sensor data, etc., among UEs in proximity over the direct link, e.g., the sidelink.

Some of the shared data over sidelink are small, e.g., Basic Safety Message (BAM) or Common Awareness Message (CAM), and others may be large, e.g., high-definition image or video. These data may be periodic or aperiodic (e.g., event triggered or on-demand).

Some of the shared data over sidelink are critical (requiring very low latency and high reliability, as well as good coverage), and others are less critical (more tolerant to delay and errors).

For communication between a transmitter and a receiver or receivers, the transmitter should transmit a message on the sidelink resources that the receiver(s) is aware of; otherwise the message may not be properly detected and received by the receiver(s). For this purpose, a communication occasion or occasions, e.g., radio resource allocation (s) in time, frequency and space, may be defined and shared between a transmitter and a receiver or receivers. A transmitter may transmit a message at a communication occasion, and a receiver or receivers may monitor the arriving message at the corresponding communication occasion.

The mechanisms disclosed herein for different communication occasions consider communications in proximity, where the proximity is used for a local communication area. For example, Vehicle-to-Vehicle (V2V) or Vehicle-to-Person (V2P) communications as close as for example 2 or 3 meters apart; Vehicle-to-Infrastructure (V2I) communications as locally as for example a vehicle to a Road Side Unit (RSU) within 50 meters; Vehicle-to-Network (V2N) communications for example a vehicle to a V2X cloud server within 1000 meters. The communication occasion(s) may be specified, pre-configured by manufacturer or service provider.

With the network control, the communication occasion(s) may be statically configured with the System Information (SI) from a gNB via Vehicle-to-Network (V2N) interface, e.g., the Uu interface between gNB and a UE; the communication occasion(s) may be statically or semi-statically configured with common or dedicated Radio Resource Control (RRC) messages from a gNB or with Open Mobile Alliance (OMA) configuration protocol from a gNB, or with other configuration protocols from a V2X service server in cloud or on internet via V2N interface; the communication occasion(s) may be semi-persistently allocated or scheduled by a gNB or gNB-like Road Side Unit (RSU) with Downlink Control Information (DCI) signaling and activating or deactivating on the Vehicle-to-Network (V2N) interface (e.g., for a gNB or gNB-like RSU) or Vehicle-to-Infrastructure (V2I) interface (e.g., for an RSU) respectively; the communication occasion(s) may be dynamically allocated or scheduled by a gNB or gNB-like RSU with DCI signaling on the V2N or V2I interface respectively.

Without the network control, the communication occasion(s) may be statically configured via the SideLink System Information (SL-SI) carried on or pointed by New Radio Physical Sidelink Broadcast Channel (NR-PSBCH) or semi-statically configured via SideLink RRC (SL-RRC) message, semi-persistently allocated or scheduled via SL-RRC indication or Sidelink Medium Access Control Control Element (SL-MAC CE) or Sidelink Control Information (SCI) activation and deactivation, or dynamically allocated or scheduled via SCI by a UE-like RSU as a coordinator in proximity or a group lead UE or a synchronization source UE or a scheduling UE in proximity on sidelink, e.g., PC5 interface.

Note that 15 kHz subcarrier spacing numerology is used in most illustrations, which has 14 symbols in a slot and 1 slot in a subframe. But for 30 kHz subcarrier spacing numerology, there are 14 symbols per slot and 2 slots in a subframe, therefore, the communication occasions may also be configured within a slot. Slot and subframe are interchangeable in the mechanisms disclosed herein.

The term "UE" may be generally used for vehicular UE herein.

Broadcast on Sidelink: To optimize broadcast on sidelink, a Broadcast Occasion (BO) on sidelink may be defined as a sidelink resource allocation in time, frequency, and space (e.g., directional antennas or panels or directional beams) for broadcasting in proximity.

Figure 2:
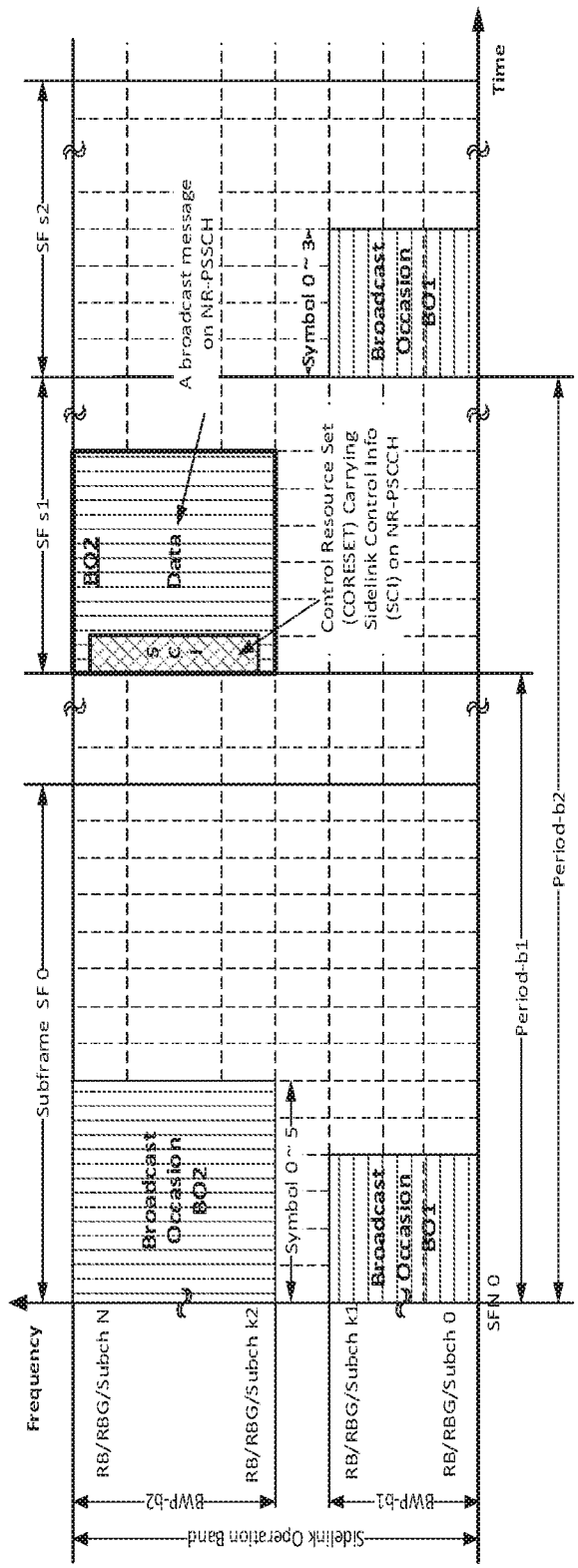
FIG. 2 illustrates exemplary broadcast occasions in symbols.

As shown in FIG. 2, different broadcast occasions may be defined in symbols in time as an example below. In FIG. 2, Broadcast Occasion BO1 may be allocated from symbol 0 to symbol 3 in every s2 subframes with a Band Width Part (BWP) (e.g., sidelink BWP, BWP-b1, within a sidelink operation band) from Resource Block (RB) 0 or Resource Block Group (RBG) (e.g., a group of contiguous RBs) 0 or Subchannel (e.g., a group of contiguous RBs or RBGs) 0 to RB k1 or RBG k1 or Subchannel k1. Broadcast Occasion BO2 is allocated from symbol 0 to symbol 5 in every s1 subframes in sidelink BWP, BWP-b2, with a BWP from RB k2 or RBG k2 or Subchannel k2 to RB N or RBGN or Subchannel N. Broadcast Occasion BO1, taking 4 OFDM symbols in a subframe with period of Period-b2 (e.g., s2 subframes), may be configured for small and low duty cycle broadcasting messages such as BAM or CAM. Broadcast Occasion BO2, taking 6 OFDM symbols in a subframe with period of Period-b1 (e.g., s1 subframes), may be configured for large and high duty cycle broadcasting messages such as trajectory or manoeuvre maps.

Also shown in the FIG. 2 that a broadcast transmission may include Sidelink Control Information (SCI) on New Radio Physical Sidelink Control Channel (NR-PSCCH) and broadcast message on New Radio Physical Sidelink Shared Channel (NR-PSSCH). The SCI allocated at Sidelink Control Resource Set (SL-CORESET) may be detected by blindly decoding the SL-CORESET configured in the common or dedicated broadcast search space on sidelink. Then the broadcast message data on NR-PSSCH may be decoded properly based on the information carried on SCI.

Figure 3:
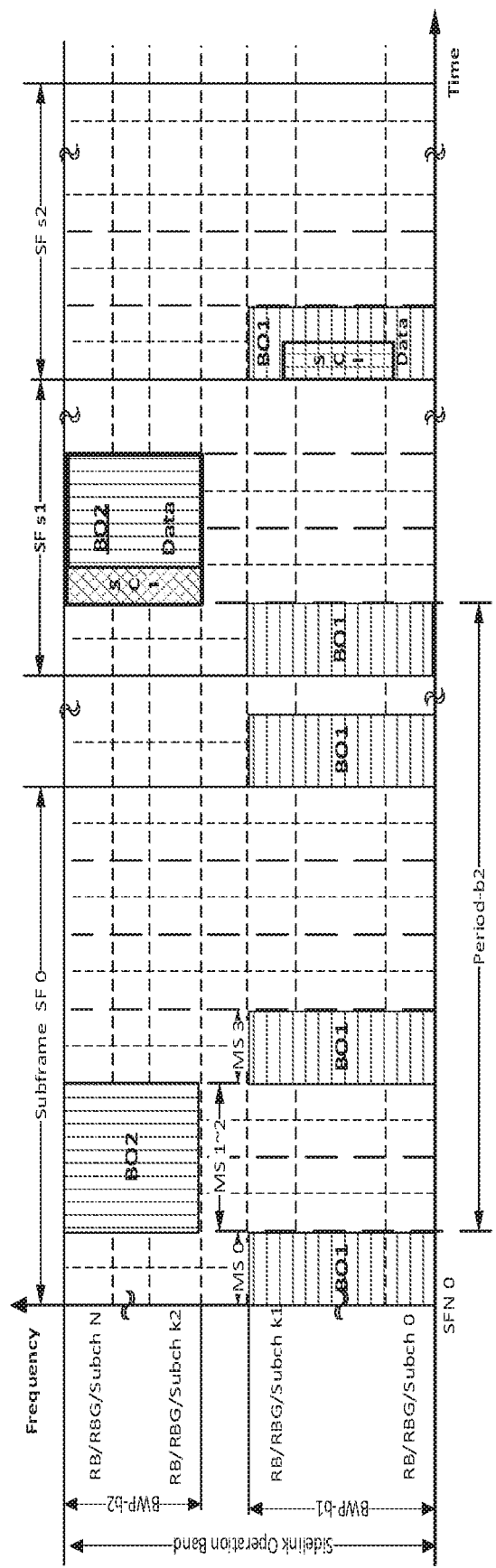
FIG. 3 illustrates exemplary broadcast occasions in mini-slot.

As illustrated in FIG. 3, different broadcast occasions may also be defined with mini-slot in time as an example below. In FIG. 3, Broadcast Occasion BO1, in sidelink BWP BWP-b1, may be allocated on mini-slot 0 and mini-slot 3 in every subframe with a BWP from RB 0 or RBG0 or Subchannel 0 to RB k1 or RBG k1 or Subchannel k1. Broadcast Occasion BO2, in sidelink BWP BWP-b2, may be allocated on mini-slot 1 and 2 in every s1 subframe with a BWP from RB k2 or RBG k2 or Subchannel k2 to RB N or RBG N or Subchannel N. Broadcast Occasion BO1, taking mini-slot 0 and 3 in every subframe, may be configured for very low latency broadcasting such as Sensor Data Sharing or Emergency Trajectory Alignment (EtrA). Broadcast Occasion BO2, taking mini-slot 1 and 2 in every s2 subframes with period of Period-b2 (e.g., s1 subframes), may be configured for latency tolerant broadcasting such as Collective Perception of Environment (CPE).

The broadcast occasions may be specified, such as pre-configured by manufacturer or service provider, among others.

With network control, the broadcast occasions on sidelink may be statically configured with SI or common or dedicated RRC message, semi-persistently allocated with DCI's indication and activation or deactivation, or dynamically indicated with scheduling DCI(s) via the V2N interface (e.g., the Uu interface) based on the road traffic conditions, data communications of V2X applications in proximity (e.g., for a communication range), and the capabilities and automation level of UEs in proximity, while the UE is connected to the network, such as gNB or gNB-like RSU via V2N or V2I interface respectively or V2X service server such as V2X cloud servers via V2N interface.

Without network control, the broadcast occasions on sidelink may also be statically or semi-statically configured locally, e.g., in proximity with certain service-range (e.g., communication range) for a V2X application, where the service-range may be configured or signaled by the application layer or higher layer. The broadcast occasions may be configured or indicated by a UE-like RSU as a coordinator in proximity, a platoon lead, a group lead in proximity, a synchronization source UE, or a scheduling UE via its New Radio Physical Sidelink Broadcast Channel (NR-PSBCH), e.g., carried by NR-PSBCH with the Sidelink Master Information Block (SL-MIB) or pointed by NR-PSBCH with the Sidelink System Information (SL-SI) on NR-PSSCH; or the New Radio Physical Sidelink Discovery Channel (NR-PSDCH) or the New Radio Physical Sidelink Shared Channel (NR-PSSCH), where the NR-PSDCH(s) and NR-PSSCH(s) are associated (e.g., Quasi-colocation (QCL) relationship) with a selected New Radio Sidelink Synchronization Signal (NR-SSS)/NR-PSBCH block or pointed by the NR-PSBCH of a selected NR-SSS/NR-PSBCH block, e.g., carrying the SL-SI or SL-RRC on NR-PSSCH. The default or fallback broadcast occasions may be pre-configured by manufacturer or service provider and may also be indicated by a UE-like RSU as a coordinator in proximity or a lead in proximity via its NR-PSBCH (e.g., SL-MIB), NR-PSDCH, or NR-PSSCH (e.g., SL-SI or SL-RRC) associated with a NR-SSS/NR-PSBCH block or pointed by NR-PSBCH of a selected NR-SSS/NR-PSBCH block on sidelink.

Without network control, the broadcast occasions on sidelink may also be semi-persistently allocated and activated or deactivated, or dynamically indicated by a UE-like RSU as a coordinator in proximity, a platoon lead, a group lead in proximity, a synchronization source UE or a scheduling UE via its scheduling SCI(s) on sidelink.

A broadcast occasion may be defined with $\{BO_{time\text{-}start}, BO_{time\text{-}length}, (BO_{time\text{-}period}), (BO_{time\text{-}span})\}$ in time, where a start point, e.g., $BO_{time\text{-}start}$, in symbols or in mini-slots of a slot or subframe or in subframes; a time duration or length, e.g., $BO_{time\text{-}length}$, in symbols or mini-slots or subframes; and a period for periodic broadcast, e.g., $BO_{time\text{-}period}$, in mini-slots or subframes or frames; and a time span for periodic broadcast, e.g., $BO_{time\text{-}span}$, in some subframes or frames. Broadcast timer(s) may be set according to the time duration(s) if needed. For a broadcast occasion unevenly distributed in time, a bitmap may be used, for example a mini-slot bitmap to indicate mini-slot(s) allocations, e.g., MSB for the first mini-slot and the LSB for the last mini-slot within a slot or a subframe or a time span allocated to the multicast occasion.

A broadcast occasion may be defined with $\{BO_{frequency\text{-}start}, BO_{frequency\text{-}range}, (BO_{frequency\text{-}gap}), (BO_{frequency\text{-}hop\text{-}flag}, BO_{frequency\text{-}hop\text{-}pattern})\}$ in frequency, where a start point, e.g., $BO_{frequency\text{-}start}$, in subcarrier, RB or RBG referenced to a frequency point, e.g., common subcarrier 0 or RB0 or RBG0 on sidelink or the first subcarrier or RB or RBG of a bandwidth part (BWP); a range, e.g., $BO_{frequency\text{-}range}$, in RBs or RBGs or subchannels; a gap maybe for evenly distributed frequency allocation, e.g., $BO_{frequency\text{-}gap}$, in RBs, RBGs or subchannels; or maybe frequency hopping pattern, e.g., $BO_{frequency\text{-}hop\text{-}pattern}$, if frequency hopping is enabled, e.g., $BO_{frequency\text{-}hop\text{-}flag}$ is "1". For a broadcast occasion unevenly distributed in frequency, a bitmap may also be used, for example a RB or RBG bitmap to indicate RB or RBG allocations, e.g., MSB for the first RB or RBG or subchannel and the LSB for the last RB or RBG or subchannel within a BWP or operation band allocated to the broadcast occasion.

Different V2X applications may have different Quality of Service (QoS) requirements, such as latency, reliability, data size, data rate, duty cycle, service range, periodic or aperiodic, etc., and may have different broadcast occasions accordingly in proximity.

Different V2X applications' broadcast occasions may be allocated at dedicated time resources, e.g., Time Division Multiplexed (TDMed), or dedicated frequency resources, e.g., Frequency Division Multiplexed (FDMed), or dedicated space resources, e.g., Space Division Multiplexed (SDMed) with directional antenna panels or directional beams pointing to different directions, or a combination of them. In this case, there is no overlap in time, frequency, or space, e.g., inter-application contention free broadcast.

For a UE receiving multiple V2X applications' broadcast messages in half duplex communication, TDMed broadcast occasions for the related V2X applications may avoid different messages colliding in time for the UE.

For contention free broadcast, the receiving UEs may search for one or more Scheduling Assignment (SA) SCIs at the Sidelink Control Resource Set(s) (SL-CORESET(s)) configured in different sidelink broadcast search spaces for different V2X applications or services' broadcast occasions, where the SA-SCI on a NR-PSCCH or the SL-CORESET may be associated with a selected NR-SSS/NR-PSBCH block or a reference signal such as Sidelink Channel State Information Reference Signal (SL-CSI-RS) or Sidelink Demodulation Reference Signal (SL-DMRS) of NR-PSBCH, NR-PSCCH or NR-PSSCH. After successfully decoding an SA-SCI carrying a Broadcast Indication (BI) indicating the broadcast message allocation, the UEs may decode the broadcast message carried on NR-PSSCH pointed by or associated with the decoded SCI.

One example is that a broadcast occasion includes only SCI(s) on NR-PSCCH(s). For example, a very short broadcast message (e.g., a few bits) may also be carried on a SCI if a short-message-flag in the SCI is "1" as an example, which may carry a source ID if needed.

Another example is that a broadcast occasion includes broadcast message(s) on NR-PSSCH(s) without scheduling SCI(s), where the NR-PSSCH is associated with a selected NR-SSS/NR-PSBCH block (e.g., QCLed) or configured with the NR-PSBCH of the selected NR-SSS/NR-PSBCH block. For example, the SL-SI or common SL-RRC carried on NR-PSSCH.

For contention free broadcast, a source ID, for example a sidelink broadcast application ID, e.g., SL-BA-RNTI, for indicating a V2X application, or a sidelink broadcast transmitter ID, e.g., SL-BT-RNTI, for indicating a transmitting UE. For example, the source ID, SL-BA-RNTI or SL-BT-RNTI, may be carried by the SCI for decoding the broadcast message on NR-PSSCH or to scramble the NR-PSSCH carrying the broadcast message for a specific V2X application, e.g., extended sensors application, or a specific broadcast transmitting UE, e.g., a RSU or a group lead in proximity.

A broadcast transmitter of multiple V2X applications or groups in proximity may be assigned different broadcast transmitter IDs or UE SL IDs for different V2X applications or groups in proximity during the procedure of group discovery and forming or joining the group or the procedure of peer discovery and pairing for different V2X applications or groups in proximity. A broadcast transmitter may also be assigned with a first broadcast transmitter ID or UE SL ID for the first V2X application or group in proximity during the first procedure of group discovery and forming or joining the group or the first procedure of peer discovery and pairing for the first V2X application or group in proximity, and then the broadcast transmitter may use the same broadcast transmitter ID or UE SL ID for other V2X applications or groups if it is validated during the later procedures of group discovery and forming or joining the group or the later procedures of peer discovery and pairing for other V2X applications or group in proximity.

A V2X application or group specific source ID may be released when the V2X application or group is released in the proximity.

A broadcast transmitter ID may be released when a UE stops broadcast transmitting role or when a UE leaves the proximity.

Different V2X applications' broadcast occasions may be allocated on sidelink at shared time, frequency or space resources, e.g., full or partial overlap in time, frequency or space. Different UEs broadcasting at different V2X applications' broadcast occasions with full or partial overlap in resources, e.g., inter-application contention based broadcast which may be indicated by for example a contention flag, e.g., contention, in the SCI, may need to conduct channel sensing first to avoid inter-application broadcast collisions. The sensing based channel accessing may be priority based for V2X applications with different QoS requirements. For example, the low-latency V2X application UE may have less or no back off time, and the latency tolerant V2X application UE may have long back off time.

The app-priority-flag and app-priority-level or app-priority-class for a V2X application or service in proximity may be initially configured by the application layer or higher layer, indicated by the application layer or higher layer during the application or service discovery in proximity with or without network control, and it may also be indicated dynamically by the application layer or higher layer, by a gNB via DCI(s) in broadcast common or dedicated search space if under network control, or by an RSU as a coordinator in proximity or a lead in proximity via SCI(s) in sidelink broadcast common or dedicated search space if without the network control, based on the situation in proximity such as road traffic condition, number of V2X applications in proximity, number of broadcasting UEs, etc.

A V2X application's broadcast occasions may be allocated on sidelink differently in time (e.g., TDMed), in frequency (e.g., FDMed), in space (e.g., SDMed) or combination of them for each transmitting UE in proximity for collision free broadcast. Especially the TDMed scheme for different UEs may be useful for half duplex communications to avoid broadcast messages colliding in time. In this scenario, the receiving UEs may search for the SL-CORESET configured in each transmitting UE's sidelink broadcast search spaces. After successfully decoding a SCI, the UEs may decode the broadcast message carried on NR-PSSCH pointed by or associated with the decoded SCI.

A V2X application's broadcast occasions may be allocated on sidelink at shared time, frequency, or space resources among different transmitting UEs in proximity, e.g., intra-application contention based broadcasting. To avoid intra-application broadcast collisions, the transmitting UEs may need to conduct channel sensing first at the fully or partially overlap broadcast occasions. The sensing based channel accessing may be random based, e.g., each UE has a random back off time. The sensing based channel accessing may be priority based, e.g., each transmitting UE has a back off time based on its priority right. For example, an RSU or a lead UE may have less or no back off time.

The ue-priority-flag and ue-priority-level or ue-priority-class for a broadcasting UE in proximity may be initially configured by the application layer or higher layer, indicated by the application layer or higher layer during the application or service discovery in proximity with or without network control, and it may also be indicated dynamically by the application layer or higher layer, or by a gNB via DCI(s) in broadcast common or dedicated search space if under network control, or an RSU as a coordinator in proximity or a lead in proximity via SCI(s) in sidelink broadcast common or dedicated search space if without the network control, based on the situation in proximity such as road traffic condition, number of V2X applications in proximity, number of broadcasting UEs, etc.

For inter-application and intra-application contention based broadcast, as described herein, a transmitting UE may keep sensing the channel till the channel is available, till the end of the current broadcast occasion time-interval, till reaching the maximum-sensing actions, or until the broadcast-timer is expired (e.g., the data is too old to broadcast). Once the broadcast-timer expires, the data buffer may be flushed or replenished with new data.

For contention based broadcast, a source ID, e.g., a sidelink broadcast application ID, SL-BA-RNTI, for indicating a V2X application or a sidelink broadcast transmitter ID, SL-BT-RNTI, for indicating a transmitting UE, may be needed for blind decoding the SCI(s) configured in different broadcast search spaces for different V2X applications or different V2X broadcasting UEs where the corresponding broadcasting occasions may share time, frequency or space resources. For example, the source ID, SL-BA-RNTI, may be used for a receiving UE to find the desired V2X application's SCI or to decode the desired V2X application's broadcast message, e.g., advanced driving application's broadcast. In another example, the source ID, SL-BT-RNTI, may be used for a receiving UE to find the desired broadcasting UE's SCI or to decode the desired broadcasting UE's broadcast message, e.g., an RSU or a lead's broadcast message.

Figure 4:
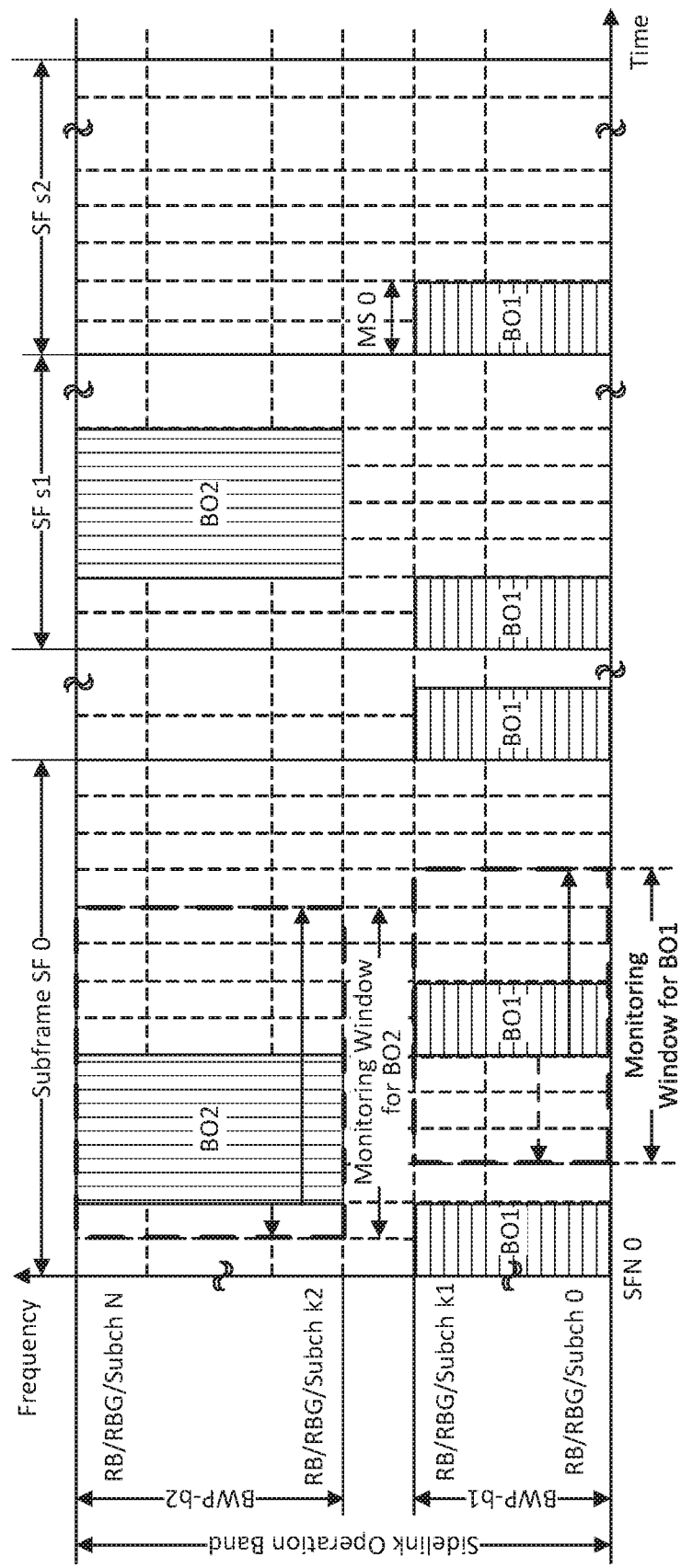
FIG. 4 illustrates exemplary window for monitoring a broadcast occasion.

For contention based broadcast, a window for monitoring the broadcast occasion(s), monitor-window, may also be configured or signaled from higher layer to a receiving UE and used to search for a broadcast message in a broadcast allocated within the window, as illustrated in FIG. 4.

The monitor-window may also be configured statically via common or dedicated RRC message from a gNB or a gNB-like RSU if with network control. The monitor-window may be configured statically via the NR-PSSCH associated with a selected NR-SSS/NR-PSBCH block or pointed by NR-PSBCH during synchronization and beam forming and selecting, or via NR-PSDCH during a V2X application or service discovery with a UE-like RSU as a coordinator in proximity or a group lead in proximity or a synchronization source UE, if without network control. The monitor-window may also be dynamically configured, activated, or deactivated by DCI(s) from a gNB or a gNB-like RSU if with network control, or by SCI(s) on sidelink from a UE-like RSU as a coordinator in proximity or a group lead in proximity or a synchronization source UE, if without network control. The SCI(s) may be scrambled with the source ID, e.g., SL-BA-RNTI for an application or SL-BT-RNTI for a transmitter.

The monitor-window in time may be defined in symbols or mini-slots or subframes, with {Window$_{start}$, Window$_{length}$} in symbols, slots or subframes, or combination of symbols, slots, or subframes.

Figure 5:
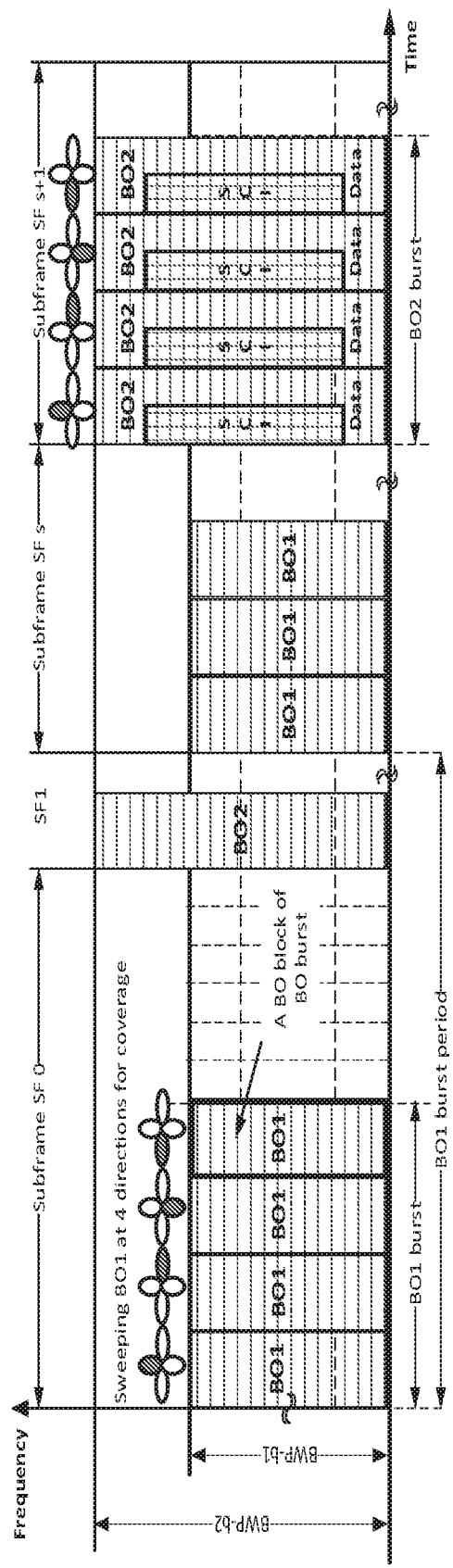
FIG. 5 illustrates exemplary beam sweeping at broadcast occasions.

When operating at mmWave spectrum, beam sweeping may be used for broadcast area coverage. An example of broadcast occasion sweeping burst with 4 BO blocks is illustrated in FIG. 5, where the UE sweeps the broadcast message at four different directions such as front, right, back and left. FIG. 5 provides an example of two different BO bursts.

Figure 6:
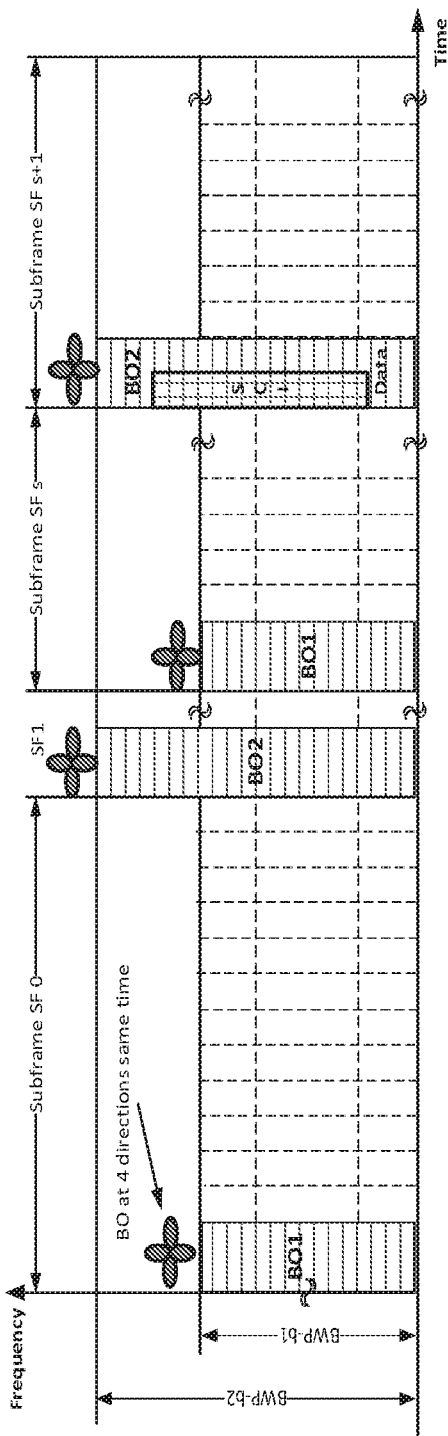
FIG. 6 illustrates exemplary multi-beam transmission at a broadcast occasion.

Another example of beam based broadcasting is multi-beam transmission concurrently for area coverage, e.g., using MU-MIMO. FIG. 6 is an example of a multi-beam transmission at broadcast occasions, e.g., a UE broadcasts in all four directions simultaneously.

For some V2X applications or services, the broadcast may be spatially confined or spatially augmented. For example, a UE on the far-left lane may need to broadcast its trajectory or maneuver to the UEs at front, right and back direction and not to the UEs at left direction on the road with a partitioning guard wall with the traffic on the opposite direction. Another example, a UE may be aware of the surrounding UEs' spatial location or direction derived from the sensor data from higher layer and therefore the UE may only broadcast to those spatial directions augmented by sensor data. Both confined beam sweeping based on the environment perceptions and augmented beam sweeping based on the sensor data may improve spatial reuse, reduce resources used for beam sweeping, or reduce interference in the proximity.

Both spatially confined and spatially augmented beam sweeping may be formed and tracked with spatial parameters, e.g., angle-of-arrival, angle-of-departure, QCL-type, etc., from higher layer.

Multicast on Sidelink: Multicasting is a group based broadcasting, e.g., to a group of more than two UEs, where the UEs may need to be qualified for joining the multicasting group and may receive an associated identification, e.g., SL-M-RNTI as a sidelink multicast ID or SL-G-RNTI as a sidelink group ID. This may be indicated by gNB or gNB-like RSU during attach procedure via the V2N interface or V2I interface respectively or by a V2X application server during registration procedure via the V2N interface if the UE is connected to the network or during joining a group procedure if the group discovery is under the network's management or assistance. This ensures the group ID uniqueness in the proximity. The ID may also be indicated by a RSU as a coordinator in proximity or a multicasting group lead during the group discovery procedure when a UE joins the group without the network's management or assistance.

If a group is formed in proximity under the network's management or assistance, the group lead may be qualified by gNB or gNB-like RSU via V2N or V2I interface respectively or V2X application server in cloud or on internet via V2N interface, this helps provide the uniqueness in proximity for the group ID assigned to a group when a group is formed.

If a group is formed in proximity without the network's coverage, a RSU may be the coordinator among different groups or UEs in proximity. The RSU as a coordinator in proximity may qualify a group lead and assign a proximity unique group ID to the lead.

If a group is formed in proximity without network control or without RSU as a cooperator in proximity, the group lead may form the group cooperatively in the proximity. For example, a UE may scan all group IDs in proximity if all the group leads in proximity broadcast their group IDs periodically, e.g., for group discover announcement, and then the UE may create a unique group ID in proximity for its group to be formed. For another example, a UE may broadcast its desired group ID based on certain rules or policies for group ID creation for its group to be formed during the group discover, e.g., announcement for to be discovered or to form a group, and listen to any acknowledgement or response from other group leads or UEs in proximity. If the group ID is acknowledged or not rejected, the UE may use this ID for announcing its group; otherwise the UE may need to adjust the group ID based on the rejection reasons. Another example, a UE may use its ID, e.g., UE sidelink (SL) ID, for the group to be formed under its full control, e.g., the group ID is the group lead's ID. Once the group ID is defined, the new group lead may make group announcement periodically for group discovery.

Sometimes, a group ID may be associated to a specific V2X application in proximity if the group is formed for the V2X application. In this case, a group ID may be derived from an application ID or a service ID which is passed from the higher layer, e.g., group_ID=(application_ID or service_ID) mod N, where N is the bitwidth of a group ID. Sometimes, the group ID may be associated to a group lead's ID if the group is formed around this group lead.

A lead of multiple V2X applications or groups in proximity may be assigned different lead IDs or UE SL IDs for different V2X applications or groups in proximity during different procedures of group discovery and forming or joining the group or different procedures of peer discovery and pairing for different V2X applications or groups in proximity. A lead may also be assigned with a first lead ID or UE SL ID for the first V2X application or group in proximity during the first procedure of group discovery and forming or joining the group or the first procedure of peer discovery and pairing for the first V2X application or group in proximity, and then the lead may use the same lead ID or UE SL ID for a second V2X application or group if it is validated during the second group discovery and forming or joining the group or the second peer discovery and pairing for other V2X applications or group in proximity.

A V2X application or group specific ID may be released when the V2X application or group is terminated in the proximity.

A lead ID may be released when a lead stops leading or when a lead leaves the group in proximity.

Like broadcast occasions, a Multicast Occasion (MO) on sidelink may be defined as a sidelink resource allocation in time, frequency, and space (e.g., directional antenna or panel or directional beam) for multicasting in proximity.

The multicast occasions may be specified, pre-configured by manufacturer or service provider.

With network control, the multicast occasions on sidelink may be statically configured with SI or common or dedicated RRC configurations, semi-persistently allocated with DCI's indication and activation or deactivation, or dynamically indicated with scheduling DCI(s) by a gNB or a gNB-like RSU via V2N (e.g., Uu interface) or V2I interface respectively, based on the road traffic conditions, data communications of V2X applications in proximity (e.g., for a communication range), or the capabilities or automation level of UEs in proximity, or by a V2X application server via the V2N interface.

Without network control, the multicast occasions on sidelink may be statically or semi-statically configured locally by an RSU as a coordinator in proximity, or by a group lead or by a synchronization source UE or by a scheduling UE on sidelink via its NR-PSBCH with the SL-MIB; its NR-PSDCH or NR-PSSCH during group discovery and joining the group, where the NR-PSDCH(s) and NR-PSSCH(s) are associated (e.g., QCL relationship) with a selected NR-SSS/NR-PSBCH block or pointed by the NR-PSBCH of the selected NR-SSS/NR-PSBCH block; or the NR-PSSCH pointed by the NR PSBCH (e.g., carrying SL-SI) or associated with the selected NR-SSS/NR-PSBCH block (e.g., carrying SL-RRC) or on its broadcast occasions or on the default broadcast occasions in proximity, which is associated with a selected NR-SSS/NR-PSBCH block or a reference signal such as CSI-RS or DMRS. The default or fallback multicast occasions in proximity may be pre-configured by manufacturer or service provider and may also be configured or indicated by a UE-like RSU as a coordinator in proximity or a lead in proximity via its NR-PSBCH (e.g., SL-MIB), NR-PSDCH, or NR-PSSCH (e.g., SL-SI or SL-RRC) associated with a NR-SSS/NR-PSBCH block or pointed by NR-PSBCH of a selected NR-SSS/NR-PSBCH block on sidelink.

Without network control, multicast occasions on sidelink may also be semi-persistently allocated and activated or deactivated, or dynamically indicated by a UE-like RSU as a coordinator in proximity, a platoon lead, a group lead in proximity, a synchronization source UE, or a scheduling UE via its scheduling SCI(s) on sidelink. The SCI(s) may carry the group ID, e.g., SL-M-RNTI or SL-G-RNTI, or the lead's SL ID, e.g., SL-L-RNTI for a lead or SL-C-RNTI for a UE which is also a lead.

A multicast occasion may be defined with $\{MO_{time\text{-}start}, MO_{time\text{-}length}, (MO_{time\text{-}period}), (MO_{time\text{-}span})\}$ in time, where a start point, e.g., $BO_{time\text{-}start}$, in symbols or in mini-slots of a slot or subframe or in subframes; a time duration or length, e.g., $MO_{time\text{-}length}$, in symbols or mini-slots or subframes; and a period for periodic broadcast, e.g., $MO_{time\text{-}period}$, in mini-slots or subframes or frames; or a time span for periodic broadcast, e.g., $MO_{time\text{-}span}$, in subframes or frames. Multicast timer(s) may be set according to the time duration(s) if needed. For a multicast occasion unevenly distributed in time, a bitmap may be used, for example a mini-slot bitmap to indicate mini-slot(s) allocations, e.g., MSB for the first mini-slot and the LSB for the last mini-slot within a slot or a subframe or a time span allocated to the multicast occasion.

A multicast occasion may be defined with $\{MO_{frequency\text{-}start}, MO_{frequency\text{-}range}, (MO_{frequency\text{-}gap}), (MO_{frequency\text{-}hop\text{-}flag}, MO_{frequency\text{-}hop\text{-}pattern})\}$ in frequency, where a start point, e.g., $MO_{frequency\text{-}start}$, in subcarrier, RB or RBG referenced to a frequency point, e.g., common subcarrier 0 or RB0 or RBG0 on sidelink or the first subcarrier or RB or RBG of a bandwidth part (BWP); a range, e.g., $MO_{frequency\text{-}range}$, in RBs or RBGs or subchannels; a gap for evenly distributed frequency allocation, e.g., $MO_{frequency\text{-}gap}$, in RBs, RBGs or subchannels; or frequency hopping pattern, e.g., $MO_{frequency\text{-}hop\text{-}pattern}$, if frequency hopping is enabled, e.g., $MO_{frequency\text{-}hop\text{-}flag}$ is "1". For a multicast occasion unevenly distributed in frequency, a bitmap may also be used, for example a RB or RBG bitmap to indicate RB or RBG allocations, e.g., MSB for the first RB or RBG or subchannel and the LSB for the last RB or RBG or subchannel within a BWP or operation band allocated to the multicast occasion.

Figure 7:
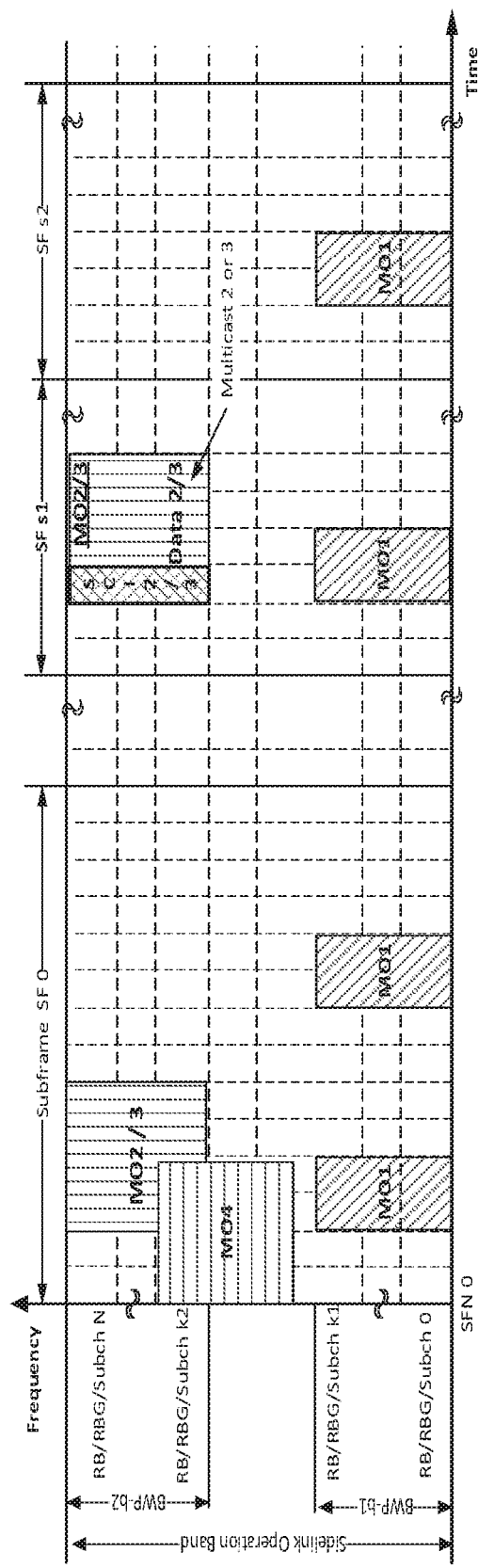
FIG. 7 illustrates exemplary multicast occasions over same or different sidelink resources.

Different multicast occasions may be configured for different QoS requirements of V2X services or applications or different multicast groups, e.g., latency, reliability, data size, data rate, duty cycle, service range or communication range, periodic or aperiodic, security requirement, etc. As illustrated in FIG. 7, different multicast occasions for different multicasting groups may be allocated over same or different sidelink resources as an example below. For example, dedicated sidelink resources for multicast occasion MO1 configured for a car platoon or for a high automation sensor data exchanging group for low latency and high reliable multicasting. Multicast occasion MO2 and MO3 over fully shared sidelink resources may be configured for two low automation UE groups to multicast the information such as BAM or CAM within each group respectively. Multicast occasion MO4 over partially shared sidelink resources with Multicast occasion MO2 and MO3 may be configured for map sharing such as Sensor and State Map Sharing (SSMS).

Also shown in FIG. 7, a multicast transmission may include SCI on NR-PSCCH and multicast message on NR-PSSCH associated with or indicated by the SCI. The SCI, allocated at a multicast SL-CORESET configured in the multicast occasion search space, may be detected by blindly decoding the SL-CORESET with SL-M-RNTI or SL-G-RNTI if needed. Then the multicast message data on NR-PSSCH may be decoded properly with SL-M-RNTI or SL-G-RNTI if they are used for NR-PSSCH based on the information carried on SCI. For multicast occasions sharing sidelink resources (e.g., resource pools), the multicast transmissions may be sensing based, e.g., if the resource is used then the transmitter must back off and try again. If the shared multicast resources are large enough, there may be multiple multicast messages from different multicasting transmitters of different groups. Therefore, at the receiver side, a UE may not know which message is from which multicasting transmitter over the shared resources. For example, at the multicast occasion MO4, UEs belong to MO4 multicasting group may use the assigned SL-M-RNTI4 or SL-G-RNTI4 to find the SL-CORESET carrying the SCI with Multicast Indication (MI) on NR-PSCCH which indicates a multicasting message carried on it (e.g., a few bits long short message) or carried on a NR-PSSCH, and may further decode the NR-PSSCH with SL-M-RNTI4 or SL-G-RNTI4 if needed based on the information carried by SCI. Similarly, UEs in MO2 or MO3 multicast groups, at MO2 or MO3, may use their assigned SL-M-RNTI2/SL-G-RNTI2 or SL-M-RNTI3/SL-G-RNTI3 to find the SL-CORESET carrying the SCI with multicast indication on NR-PSCCH respectively and decoding the NR-PSSCH with SL-M-RNTI2/SL-G-RNTI2 or SL-M-RNTI3/SL-G-RNTI3 respectively if needed. For security reason, UEs in a multicast group MO1 with dedicated sidelink resources may still use the assigned SL-M-RNTI1 or SL-G-RNTI1 to find the SL-CORESET carrying the multicast indication on NR-PSCCH and to decode the message on NR-PSSCH with SL-M-RNTI1 or SL-G-RNTI1 accordingly.

Different V2X applications' or service groups' multicast occasions may be allocated on sidelink at dedicated time resources, e.g., TDMed, or dedicated frequency resources, e.g., FDMed, or dedicated space resources, e.g., SDMed with directional antenna panels or directional beams pointing to different directions, without overlap in time, frequency, or space, e.g., inter-application contention free multicast.

For a UE receiving multiple V2X applications' multicast messages in half duplex communication, TDMed multicast occasions for the related V2X applications may avoid different messages colliding in time for the UE.

For contention free multicast, a receiving UE may detect the SCIs at different SL-CORESET corresponding to different V2X applications' or service groups' multicast occasions with the associated SL-M-RNTI or SL-G-RNTI if the SCIs carry them with it; otherwise the UE may detect the SCIs at different SL-CORESET corresponding different V2X applications' or service groups' multicast occasions configured in different search spaces for different V2X applications or service groups without the associated SL-M-RNTI or SL-G-RNTI, where the SCI on a PDCCH or the SL-CORESET may be associated with a selected NR-SSS/NR-PSBCH block or a reference signal such as SL-CSI-RS or SL-DMRS of a selected NR-PSBCH. Then UE may use SL-M-RNTI or SL-G-RNTI for decoding the multicast message on NR-PSSCH if they are used for the NR-PSSCH which is associated with or pointed by the decoded SCI.

One example is that a multicast occasion includes only SCI(s) on NR-PSCCH(s). For example, a very short multicast message (e.g., a few bits) may also be carried on a SCI if a short-message-flag in the SCI is "1" as an example, which may be scramble with a source ID if needed.

Another example is that a multicast occasion includes multicast message(s) on NR-PSSCH(s) without SCI(s), where the NR-PSSCH is associated with a selected NR-SSS/NR-PSBCH block (e.g., QCLed) or configured with the NR-PSBCH of the selected NR-SSS/NR-PSBCH block, e.g. NR-PSSCH caries SL-SIs or common SL-RRC.

Different V2X applications' or service groups' multicast occasions may be allocated on sidelink at shared time, frequency, or space resources, e.g., full or partial overlap in time, frequency or space. Different UEs multicasting at different V2X applications' or service groups' multicast occasions with full or partial overlap in resources, e.g., inter-group contention based multicast which may be indicated by for example a contention flag, e.g., contention, in the SCI, may need to conduct channel sensing first to avoid inter-group multicast collisions. The sensing based channel accessing may be priority based for V2X applications' or service groups' different QoS requirements. For example, the low-latency V2X application group's UE may have less or no back off time, and the latency tolerant V2X application group's UE may have long back off time.

The app-priority-flag and app-priority-level or app-priority-class for a V2X application or group-priority-level or group-priority-class for a proximity group may be initially configured by the application layer or higher layer, indicated by the application layer or higher layer during the application or service group discovery in proximity with or without network control, indicated by the group lead while joining the group discovered, and it may be indicated dynamically by the application layer or higher layer, by a gNB via DCI(s) in multicast common or dedicated search space if under network control, or by an RSU or the group lead based on the situation in proximity such as road traffic condition, number of V2X applications in proximity, number of broadcasting UEs, etc.

A V2X application or service group's multicast occasions may be allocated differently in time (e.g., TDMed), in frequency (e.g., FDMed), in space (e.g., SDMed) or combination of them for each transmitting member UE within a group for collision free multicast. Especially the TDMed scheme for different UEs is useful for half duplex communications to avoid multicast messages colliding in time. In this scenario, a receiving UE may detect the SCIs at the SL-CORESET corresponding to the transmitting UE's multicast occasions in the search spaces with the associated SL-M-RNTI or SL-G-RNTI if the SCIs carry them with it; otherwise the UE may detect the SCIs at the SL-CORESET corresponding to transmitting UE's multicast occasions configured in the search spaces without the associated SL-M-RNTI or SL-G-RNTI, and the UE may use SL-M-RNTI or SL-G-RNTI for decoding the multicast message on PDSSCH if they are used for the PDSCH which is associated with or pointed by the decoded SCI.

A V2X application or service group's multicast occasions may be allocated at shared time, frequency, or space resources among transmitting member UEs within a group, e.g., intra-group contention based multicasting. To avoid intra-group multicast collisions, the transmitting UEs may need to conduct channel sensing first at the fully or partially overlap multicast occasions. The sensing based channel accessing may be random based, e.g., each transmitting member UE has a random back off time. The sensing based channel accessing may be priority based, e.g., each transmitting UE has a back off time based on its priority right. For example, an RSU or a lead UE may have less or no back off time.

The ue-priority-flag and ue-priority-level or ue-priority-class for multicasting UEs within a group may be initially configured by the application layer or higher layer, indicated by the application layer or higher layer during the V2X application group discovery or V2X service device group discovery in proximity with or without network control, indicated by the group lead while joining the group discovered, and it may be indicated dynamically by the application layer or higher layer, by a gNB via DCI(s) in broadcast common or dedicated search space if under network control, or by an RSU or the group lead, based on the situation in proximity such as road traffic condition, number of V2X applications in proximity, number of broadcasting UEs, etc.

For inter-group or intra-group contention based multicasting, as described previously, a transmitting UE may keep sensing the channel till the channel is available, till the end of the current multicast occasion time-interval, till reaching the maximum-sensing actions, or till the multicast-timer is expired (e.g., the data is too old to multicast). Once the multicast-timer expires, the data buffer may be replenished with new data or flushed (e.g., removed).

Like contention based broadcast, a window for monitoring the multicast occasions, e.g., monitor-window-multicast, may also be configured or signaled from higher layer to a receiving UE to search for a multicast occasion if it is allocated within the window.

Like broadcast described previously, when operating at mmWave spectrum, beam sweeping may also be used for multicasting area coverage. Another option is multi-beam transmission, e.g., MU-MIMO, for multicasting area coverage.

Like broadcast described previously, the multicasting beam sweeping may be further spatially confined or spatially augmented, since each receiving UE is known to the multicasting UE.

Unicast on sidelink: Unicasting is between a pair of UEs where the UEs may need to be discovered and associated or paired with each other. For identifying each other, an identification, e.g., SL-C-RNTI as a UE's sidelink (SL) ID or SL-C-RNTI-p as a pair's ID, is needed for sidelink unicast communication.

With network control, a UE's SL ID, e.g., SL-C-RNTI or a pair ID, e.g., SL-C-RNTI-p, may be assigned by gNB or gNB-like RSU during attach procedure via V2N or V2I interface respectively or by a V2X application server during registration procedure via V2N interface. A UE's SL ID or a pair ID, may also be assigned by gNB or gNB-like RSU or V2X application server during group discovery and joining the group or during a peer discovery and pairing with the network's management or assistance. This may ensure the ID uniqueness in the proximity.

Without network control, a UE's SL ID or a pair ID may be assigned by an RSU, a group lead when a UE joins the group or by a synchronization source UE or by a scheduling UE during the discovery and pairing procedure. An RSU may be a coordinator among group leads or UEs in proximity and it may assign a proximity unique ID to a UE as the UE's SL ID or as the pair's ID. Since group lead is generally qualified by a gNB or a gNB-like RSU or a V2X application server while under network coverage, locally qualified by an RSU as a coordinator in proximity, or cooperatively qualified by the other group leads or UEs in proximity, if without network control and management as described previously.

Therefore, a group lead's ID may be unique in proximity. If a UE's SL ID or a pair ID is derived by the lead from its ID, e.g., using lead's ID as the root or lead's ID for hashing, then the UE's SL ID or the pair ID uniqueness in the proximity may be ensured. For pairing with a synchronization source UE, the UE's SL ID or the pair ID may be a device ID assigned by device manufacture or service provider or a peer ID assigned by V2X cloud server, to ensure the uniqueness in proximity. The UE may also create a ID for itself or the pair cooperatively in proximity. For example, a UE may scan UE's SL IDs or pair IDs in proximity if UEs in proximity broadcast their SL IDs or pair IDs periodically, e.g., for peer discovery announcement, and then the UE may create a unique SL ID or pair ID in proximity for itself. For another example, a UE may broadcast its desired SL ID or pair ID based on certain rules or policies for UE's SL ID or pair ID creation during peer discovery and listen to any acknowledgement from the other group leads or UEs in proximity. If the SL ID or pair ID is acknowledged or not rejected, the UE may use this SL ID or pair ID for itself; otherwise the UE may adjust the SL ID or pair ID based on the rejection reasons.

A UE may be assigned different SL IDs or pair IDs for different V2X applications or groups in proximity during the procedure of group discovery and joining the group or the procedure of peer discovery and pairing for different V2X applications or groups in proximity.

A UE may also be assigned with a first SL ID for the first V2X application or group in proximity during the first procedure of group discovery and joining the group or the first procedure of peer discovery and pairing for the first V2X application or group in proximity, and then the UE may use the same SL ID for a second V2X application or group if it is validated during the second procedures of group discovery and joining the group or the second procedures of peer discovery and pairing for other V2X applications or group in proximity.

A V2X application or pair specific ID may be released when a UE stops the V2X application or depaired.

A UE's proximity unique SL ID may be released when it leaves the current proximity, e.g., under the current RSU as a proximity coordinator or the current lead in proximity. Or, a UE's proximity unique SL ID may be reassigned or refreshed when it enters a new proximity, e.g., under a new RSU as a proximity coordinator or a new lead in proximity.

Comparing with broadcast occasions or multicast occasions on sidelink, Unicast Occasions (UOs) may be much more dynamic. However, the allocation mechanisms described herein with regard to broadcast or multicast sidelink discussions may still be applied to unicast occasions.

Like broadcast occasions and multicast occasions, a Unicast Occasion (UO) on sidelink may be defined as a sidelink resource allocation in time, frequency, or space (e.g., directional antenna or panel or directional beam) for unicasting in proximity.

Like broadcast occasions and multicast occasions, unicast occasions on sidelink may be specified, pre-configured by manufacturer or service provider, among others.

With network control, the unicast occasions on sidelink may be statically configured with SI or common or dedicated RRC configurations, semi-persistently allocated with DCI's configuration and activation or deactivation, or dynamically indicated with scheduling DCI(s) by a gNB or a gNB-like RSU via V2N or V2I interface respectively, based on the road traffic conditions, data communications of V2X applications in proximity (e.g., communication range), and the capabilities and automation level of UEs in proximity, or by a V2X application server via the V2N interface, Without network control, the unicast occasions on sidelink may be statically or semi-statically configured locally by an RSU as a coordinator in proximity or a group lead or a synchronization source UE on sidelink via its NR-PSBCH (e.g., SL-MIB); its NR-PSDCH or NR-PSSCH during group discovery and joining the group or peer discovery and pairing, where the NR-PSDCH and NR-PSSCH are associated (e.g., QCL relationship) with a selected NR-SSS/NR-PSBCH block or pointed by the NR-PSBCH of the selected NR-SSS/NR-PSBCH block; its NR-PSSCH pointed by or associated with NR-PSBCH (e.g., SL-SI) or on its broadcast or multicast occasions (e.g., SL-RRC) or on the default broadcast or multicast occasions in proximity. The default or fallback unicast occasions between a pair may be configured or indicated by a UE-like RSU as a coordinator in proximity or a lead in proximity via its NR-PSBCH, NR-PSDCH, or NR-PSSCH associated with a selected NR-SSS/NR-PSBCH block or pointed by the NR-PSBCH of the selected NR-SSS/NR-PSBCH block on sidelink.

Without network control, the unicast occasions on sidelink may also be semi-persistently allocated and activated or deactivated, or dynamically indicated by a UE-like RSU as a coordinator in proximity, a group lead in proximity, a synchronization source UE or a scheduling UE via its scheduling SCI(s) on sidelink. A unicast occasion may also be semi-persistently or dynamically scheduled by either UE of a pair via scheduling SCIs on its NR-PSCCH at the default occasion or current unicast occasion which may be the initial unicast occasion established during peer discovery and pairing or active unicast occasion enabled by its NR-PSCCH during unicasting. The SCI may carry transmitter and/or receiver UE's SL ID, e.g., SL-C-RNTI or the associated pair ID, e.g., SL-C-RNTI-p.

A unicast occasion may be defined with $\{UO_{time-start}, UO_{time-length}, (UO_{time-period}), (UO_{time-span})\}$ in time, where a start point, e.g., $UO_{time-start}$, in symbols or in mini-slots of a slot or subframe or in subframes; a time duration or length, e.g., $UO_{time-length}$, in symbols or mini-slots or subframes; a period for periodic broadcast, e.g., $UO_{time-period}$, in mini-slots or subframes or frames; or a time span for periodic broadcast, e.g., $UO_{time-span}$, in subframes or frames. Unicast timer(s) may be set according to the time duration(s) if needed. For a unicast occasion unevenly distributed in time, a bitmap may be used, for example a mini-slot bitmap to indicate mini-slot(s) allocations, e.g., MSB for the first mini-slot and the LSB for the last mini-slot within a slot or a subframe or a time span allocated to the unicast occasion.

A unicast occasion may be defined with $\{UO_{frequency-start}, UO_{frequency-range}, (UO_{frequency-gap}), (UO_{frequency-hop-flag}, UO_{frequency-hop-pattern})\}$ in frequency, where a start point, e.g., $UO_{frequency-start}$, in subcarrier, RB or RBG referenced to a frequency point, e.g., common subcarrier 0 or RB0 or RBG0 on sidelink or the first subcarrier or RB or RBG of a bandwidth part (BWP); a range, e.g., $UO_{frequency-range}$, in RBs or RBGs or subchannels; a gap for evenly distributed frequency allocation, e.g., $UO_{frequency-gap}$, in RBs, RBGs or subchannels; or frequency hopping pattern, e.g., $UO_{frequency-hop-pattern}$, if frequency hopping is enabled, e.g., $UO_{frequency-hop-flag}$ is "1". For a multicast occasion unevenly distributed in frequency, a bitmap may also be used, for example a RB or RBG bitmap to indicate RB or RBG allocations, e.g., MSB for the first RB or RBG or subchannel and the LSB for the last RB or RBG or subchannel within a BWP or operation band allocated to the unicast occasion.

Like broadcast occasions and multicast occasions, different unicast occasions on sidelink may be configured for different QoS requirements of V2X services or applications, e.g., latency, reliability, data size, data rate, duty cycle, service range or communication range, periodic or aperiodic, security requirement, among other things.

Like broadcast occasions and multicast occasions, different unicast occasions on sidelink for different V2X applications or unicast pairs may be allocated over dedicated or shared sidelink resources in time, frequency, or space. Unicast occasions may be semi-persistent or dynamically allocated on dedicated sidelink resources. An example is the unicast between two members in a car platoon for low latency and high reliable unicasting. Unicast occasions may be semi-persistent or dynamically allocated on shared sidelink resources. An example is the unicast between two UEs exchanging BAM or CAM. In this case, the reservation of the unicast occasion(s) need to be sensing based to avoid possible collisions with other communications sharing the sidelink resources.

Different V2X applications' or service groups' unicast occasions may be allocated on sidelink at dedicated time resources, e.g., TDMed, or dedicated frequency resources, e.g., FDMed, or dedicated space resources, e.g., SDMed with directional antenna panels or directional beams pointing to different directions, without overlap in time, frequency, or space, e.g., inter-application contention free unicast.

For a UE receiving multiple V2X applications' unicast messages in half duplex communication, TDMed unicast occasions for the related V2X applications may avoid different unicast messages colliding in time for the UE.

For contention free unicast, a receiving UE may detect the SCIs at different SL-CORESET corresponding to different unicast occasions configured in different unicast search space for different V2X applications or service groups with the paired first UE's SL ID, e.g., SL-C-RNTI-1 and/or second UE's SL ID, e.g., SL-C-RNTI-2, or the pair ID, e.g., SL-C-RNTI-p, if the SCIs carry them with it; otherwise the UE may detect the SCIs at different SL-CORESET corresponding different unicast occasions configured in different unicast search spaces for different V2X applications or service groups without the associated SL-C-RNTI-1 or SL-C-RNTI-2 or SL-C-RNTI-p. The SCI on a NR-PSCCH or the SL-CORESET may be associated with a selected NR-SSS/NR-PSBCH block or a reference signal such as SL-CSI-RS or SL-DMRS of a selected NR-PSBCH. Then the UE may use SL-C-RNTI-1 or SL-C-RNTI-2 or SL-C-RNTI-p for decoding the unicast message on NR-PSSCH if they are used for the NR-PSSCH which is associated with or pointed by the SCI decoded.

One example is that a unicast occasion includes only SCI(s) on NR-PSCCH(s). For example, a very short unicast message (e.g., a few bits) may also be carried on a SCI if a short-message-flag in the SCI is "1" as an example, which may be scramble with a source ID if needed.

Another example is that a unicast occasion includes multicast message(s) on NR-PSSCH(s) without SCI(s), where the NR-PSSCH is associated with a selected NR-SSS/NR-PSBCH block (e.g., QCLed) or configured with the NR-PSBCH of the selected NR-SSS/NR-PSBCH block, e.g. NR-PSSCH carries SL-SIs or common SL-RRC.

Different unicast occasions for different V2X applications or proximity groups may be allocated on sidelink at shared time, frequency and space resources, e.g., full or partial overlapping in time, frequency and space. Different UEs unicasting at different unicast occasions for different V2X applications or proximity groups with full or partial overlapping in resources, e.g., inter-application or inter-group contention based unicast which may be indicated by for example a contention flag, e.g., contention, in the SCI, may need to conduct channel sensing first to avoid inter-application or inter-group unicast collisions. The sensing based channel accessing may be priority based for different V2X application's or proximity group's QoS requirements. For example, the low latency V2X application group's UE may have less or no back off time, and the latency tolerant V2X application group's UE may have long back off time.

The app-priority-flag and app-priority-level or app-priority-class for a V2X application or group-priority-level or group-priority-class for a proximity group may be initially configured by the application layer or higher layer, indicated by the application layer or higher layer during the application or service group discovery or during the peer discovery in proximity with or without network control, indicated by the group lead while joining the group discovered or pairing with the peer discovered, and it may be indicated dynamically by the application layer or higher layer, by a gNB via DCI(s) in unicast common or dedicated search space if under network control, or by an RSU as a coordinator in proximity or a group lead based on the situation in proximity such as road traffic condition, number of V2X applications in proximity, number of broadcasting UEs, etc.

A V2X application or service group's unicast occasions may be allocated differently in time (e.g., TDMed), in frequency (e.g., FDMed), in space (e.g., SDMed), or combination of them for each member UE or each pair within a group for collision free unicast. Especially the TDMed scheme for different UEs is useful for half duplex communications. In this scenario, a receiving UE may detect the SCIs at the SL-CORESET corresponding to its or the pair's unicast occasions configured in its or the pair's unicast search space with the paired first UE's SL ID, e.g., SL-C-RNTI-1 or second UE's SL ID, e.g., SL-C-RNTI-2, or the pair ID, e.g., SL-C-RNTI-p, if the SCIs carry them with it; otherwise the UE may detect the SCIs at the SL-CORESET corresponding to its or the pair's unicast occasions configured in its or the pair's unicast search space without the associated SL-C-RNTI-1 or SL-C-RNTI-2 or SL-C-RNTI-p, and the UE may use SL-C-RNTI-1 or SL-C-RNTI-2 or SL-C-RNTI-p for decoding the unicast message on PDSSCH associated with or pointed by the SCI decoded.

A V2X application or service group's unicast occasions may be allocated at shared time, frequency, or space resources among member UEs within a group, e.g., intra-group contention based unicasting. To avoid intra-group unicast collisions, the transmitting UEs may conduct channel sensing first at the fully or partially overlap multicast occasions. The sensing based channel accessing may be random based, e.g., each member UE or pair has a random back off time. The sensing based channel accessing may be priority based, e.g., each UE or pair has a back off time based on its priority right. For example, an RSU or a lead UE may have less or no back off time.

The ue-priority-flag and ue-priority-level or ue-priority-class for unicasting UEs or pair-priority-level or pair-priority-class for unicasting pairs for the same application or within a group may be configured or indicated by the application layer or higher layer during the V2X application or group discovery or peer discovery, indicated by the group lead while joining the group discovered or by the peer UE while pairing. The priority level or priority class for unicasting UEs or pairs for the same application or within a group may be signaled dynamically by the application layer or higher layer or by the group lead or by the peer UE based on the situation in proximity such as road traffic condition, number of V2X applications in proximity, number of broadcasting UEs, etc.

For inter-application or inter-group and intra-application or intra-group contention based unicasting, as described previously, a transmitting UE may keep sensing the channel till the channel is available, till the end of the current unicast occasion time-interval, until reaching the maximum-sensing actions, or till the unicast-timer is expired (e.g., the data is too old to unicast). Once the unicast-timer expires, the data buffer may be replenished with new data or flushed.

Like contention based broadcast or multicast, a window for monitoring the unicast occasion(s), e.g., monitor-window-unicast, may also be configured or signaled from higher layer or from a gNB or gNB-like RSU, a V2X server, a RSU in proximity, a group lead or a peer UE to the receiving UE to search for a unicasting occasion if it is allocated within the window.

Unlike broadcast or multicast beam sweeping for coverage, unicast beams are point-to-point paired. With requirements of much shorter latency and much higher reliability for most advanced driving applications and with much more dynamics on a unicast beam pair link due to higher mobility, a unicast beam pair link needs to be established fast and maintained precisely. Sensor data may be used for augmenting the beam pairing and beam tuning, similar to augmented beam sweeping for broadcast and multicast discussed previously. The spatial information such as peer location, distance, direction, etc. may be derived from sensor data by the higher layer, and this spatial information may be used to augment the beam pairing and beam tracking, e.g., the angle-of-arrival, angle-of-departure, QCL-type, etc.

Unicast communications: Multiple kinds of unicast transmissions between a pair on sidelink are disclosed herein for reducing the signaling overhead and reducing the latency on sidelink, such as transmitter initiated and controlled transmission, e.g., a UE sends its trajectory or maneuver to a nearby UE, or receiver initiated and controlled transmission, e.g., an RSU as a coordinator in proximity or a lead in proximity pulls perception data or sensor data from a UE.

Figure 8A:
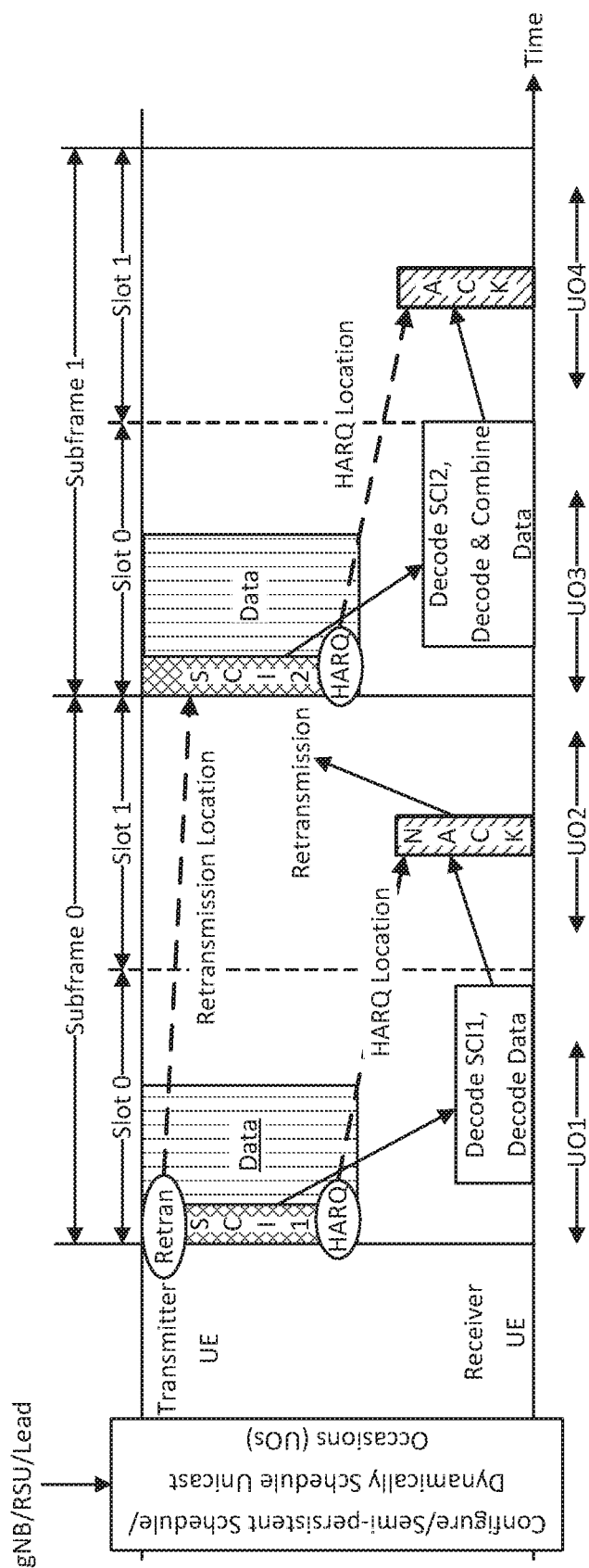
FIG. 8A illustrates exemplary transmitter initiated and controlled unicast transmission on sidelink.
Figure 8B:
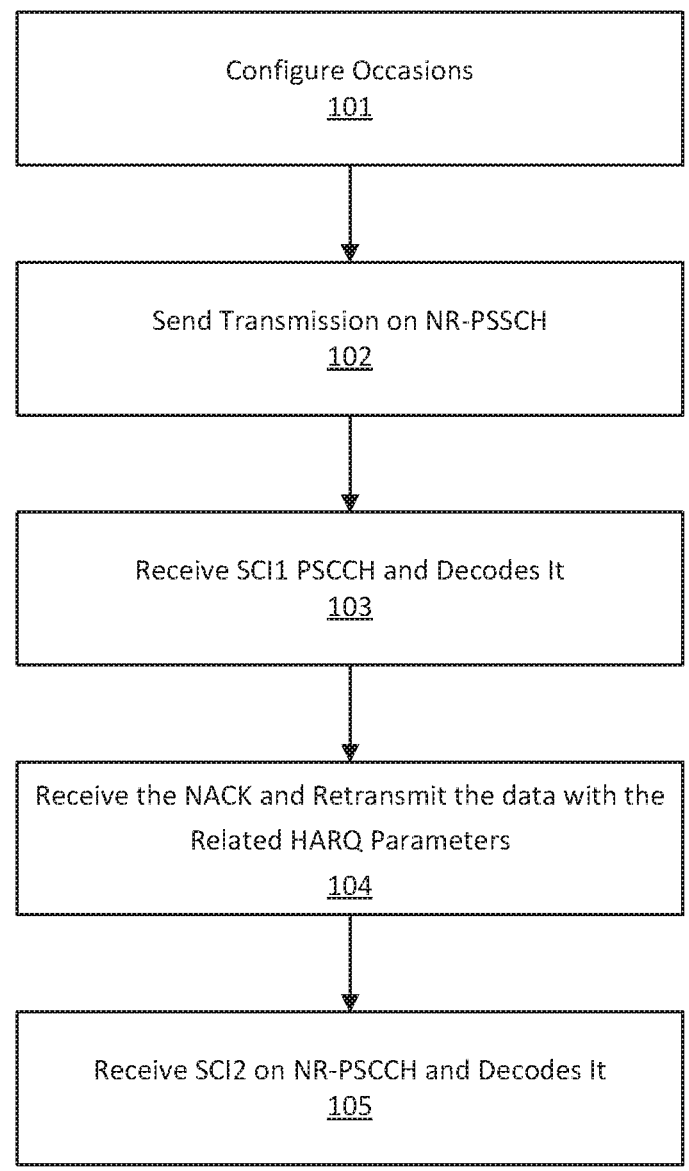
FIG. 8B illustrates exemplary steps for transmitter initiated and controlled unicast transmission on sidelink.

An example of a transmitter UE controlled unicast transmission on sidelink is illustrated in FIG. 8A, which may include the following steps (e.g., FIG. 8B).

Step 101: gNB or RSU or Lead statically configure via RRC message on Uu interface or SL-RRC on PC5 interface, semi-persistently schedule for the pair of transmitter UE and receiver UE via RRC indication and DCI activation or deactivation on Uu interface or SL-RRC indication and SCI activation or deactivation on PC5 interface, or dynamically schedule via DCI on Uu interface or SA-SCI on PC5 interface the unicast occasion(s) per the transmitter or receiver UE. The unicast occasion allocation may be one resource region as one big unicast occasion or multiple resource regions as multiple small unicast occasions, e.g., UO1~UO4 as illustrated in FIG. 8A.

Step 102: at a first unicast occasion (e.g., UO/), a transmitter UE may send an initial transmission of a data packet on NR-PSSCH to a receiver UE together with a first SCI (e.g., SCI1) on NR-PSCCH. The first SCI may carry control information for decoding the data, such as MCS, HARQ process number and RV, HARQ ID, repetition flag and number, precoding, Sidelink Demodulation Reference Signal (SL-DMRS) port and initial state, frequency hopping flag and pattern, etc. The first SCI may also carry resource reservations, such as a resource allocation at a second unicast occasion (e.g., UO2) for HARQ ACK/NACK feedback or other feedback such as SL-CSI feedback, a resource allocation at a third unicast occasion (e.g., UO3) for retransmission if needed, a resource allocation at one of the allocated unicast occasions for Sidelink Sound Reference Signal (SL-SRS) or SL-CSI_RS (not shown in figure), etc.

Step 103: the receiver UE may receive the first SCI (e.g., SCI1) on NR-PSCCH and may decode it successfully. Then receiver UE may use the information in the SCI (e.g., SCI1) to decode the initial transmitted data and may combine with the repetition data on NR-PSSCH(s) associated with or pointed by the first SCI (e.g., SCI1). Receiver may fail to decode the data and may transmit a NACK feedback at the sidelink resource as indicated by the first SCI (e.g., SCI1) at the second unicast occasion (e.g., UO2). The receiver may also send SRS if indicated. The receiver may also send Sidelink Channel State Information (SL-CSI) feedback if indicated by the first SCI, e.g., by SL-CSI request.

Step 104: the transmitter UE may receive the NACK and may retransmit the data with a second SCI (e.g., SCI2) containing the related decoding information such as HARQ parameters, e.g., Modulation and Coding Scheme (MCS), Redundancy Version (RV), and HARQ ID, repetition flag and number, precoding, Sidelink Demodulation Reference Signal (SL-DMRS) port and initial state, frequency hopping flag and pattern, etc., at the third unicast occasion (e.g., UO3) as indicated in the first SCI (e.g., SCI1). The second SCI (e.g., SCI2) may also contain further resource reservation, e.g., with resource allocation at a forth unicast occasion (e.g., UO4) for HARQ ACK/NACK feedback or other feedback may also be transmitted with the retransmission.

Step 105: the receiver UE may receive the second SCI (e.g., SCI2) on NR-PSCCH and decode it successfully. Then receiver UE may use the information in the second SCI (e.g., SCI2) to decode the data on NR-PSSCH. Receiver may decode the data successfully with combining under the same HARQ ID, if needed, and transmit an ACK at the resource at the forth unicast occasion (e.g., UO4) as indicated by the second SCI (e.g., SCI2). The receiver UE may also send SRS, if indicated. The receiver may also send CSI feedback, if available.

The example of transmitter UE controlled unicast transmission illustrates that a first SCI transmitted together with NR-PSSCH may carry decoding control information such as MCS, HARQ parameters, etc. for decoding the associated data carried on NR-PSSCH, and may carry resource reservation information such as resource allocations for HARQ ACK/NACK feedback, repetition, retransmission, and SL-CSI respectively.

Figure 9A:
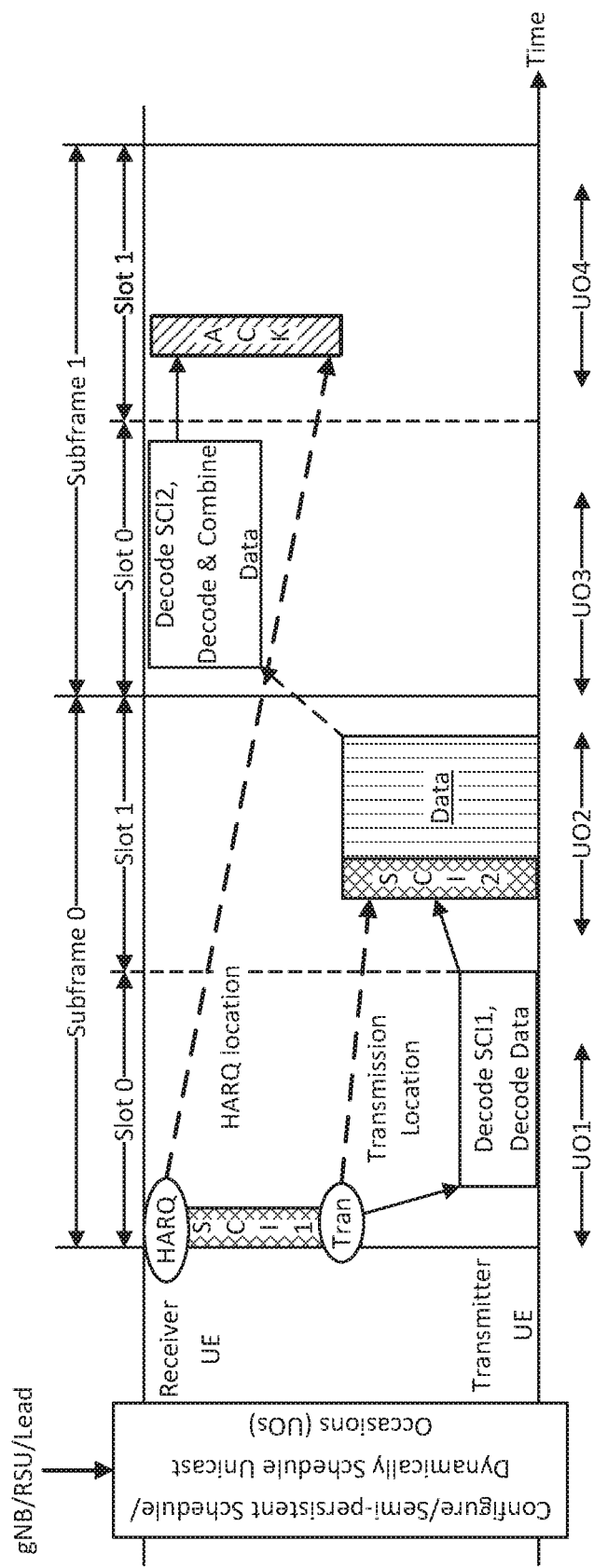
FIG. 9A illustrates exemplary receiver initiated and controlled unicast transmission on sidelink.
Figure 9B:
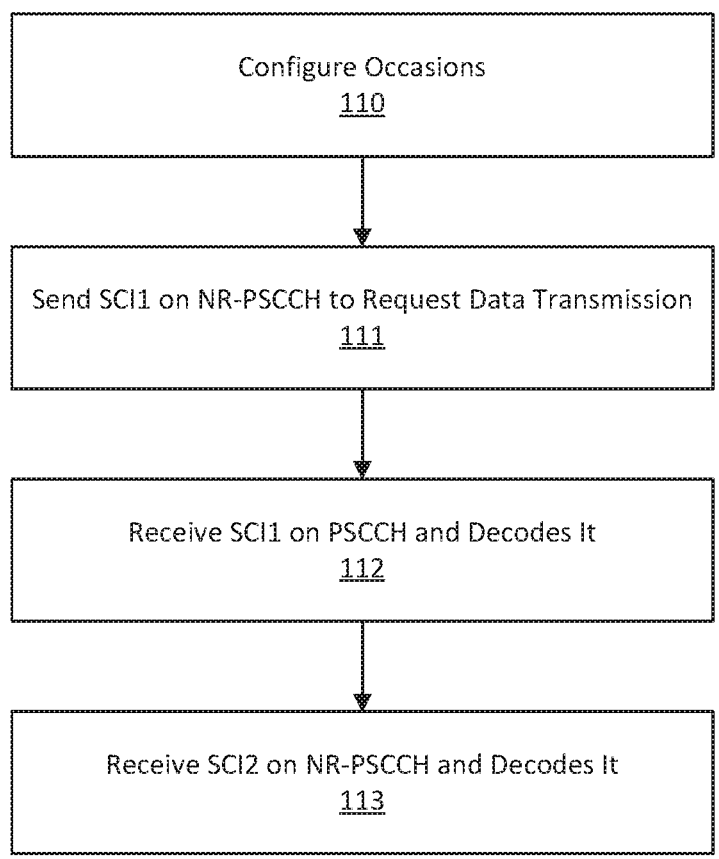
FIG. 9B illustrates exemplary steps for receiver initiated and controlled unicast transmission on sidelink.

An example of a receiver UE controlled unicast transmission on sidelink is illustrated in FIG. 9A, which may include the following steps (e.g., FIG. 9B).

Step 110: gNB or RSU or Lead statically configure, or semi-persistently schedule the unicast occasion(s) for the pair of transmitter UE and receiver UE, or dynamically schedule the unicast occasion(s) per the transmitter or receiver UE. The unicast occasion allocation may be one resource region as one big unicast occasion or multiple resource regions as multiple small unicast occasions, e.g., UO1~UO4 as illustrated in FIG. 9A.

Step 111: at a first unicast occasion (e.g., UO1), receiver UE sends a first SCI (e.g., SCI1) on NR-PSCCH to request or reserving a data transmission, e.g., pulling data. The first SCI (e.g., SCI1) may carry resource allocations at a second unicast occasion (e.g., UO2) for initial data transmission with repetition transmission if enabled respectively, resource allocation at a fourth unicast occasion (e.g., UO4) for HARQ ACK/NACK feedback or other feedback such as SL-CSI, and resource allocation at a fifth unicast occasion (e.g., UO5) (not shown in FIG. 9A) for retransmission if needed.

Step 112: the transmitter UE may receive the first SCI (e.g., SCI1) on NR-PSCCH requesting or for data with reserved resources and may decode it successfully. Then transmitter UE may use the reserved resource information in the first SCI (e.g., SCI1) to process the data to be carried on NR-PSSCH. Transmitter UE may transmit the initial data or repetition data if indicated together with a second SCI (e.g., SCI2) at the resource indicated by the first SCI (e.g., SCI1). The second SCI (e.g., SCI2) may include control information for decoding the data, or for other resource resourvation such as SL-CSI.

Step 113: the receiver UE may receive the second SCI (e.g., SCI2) on NR-PSCCH and decodes it successfully. Then receiver UE may use the information in the second SCI (e.g., SCI2) to decode the initial data on NR-PSSCH or repetition data if indicated. Receiver may decode the data successfully and transmits an ACK at the resource at the forth unicast occasion (e.g., UO4) as indicated by the first SCI (e.g., SCI1).

The example of receiver UE controlled unicast transmission illustrates that a first SCI transmitted alone may initiate or reserve a data transmission with reserved resources for initial transmission, repetition transmission, HARQ feedback, SL-CSI, etc., and a second SCI may be transmitted together with the data containing data decoding information for the associated data.

Note: the frame structure with 30 kHz subcarrier spacing numerology are used in the example of FIG. 8A or FIG. 9A.

If the unicast occasions are on shared time, frequency, or space resources with other UEs, then the transmitting may be sensing based and the receiving may be monitoring window based, e.g., using monitor-window for detecting the SCIs in the SL-CORESET as described previously for contention based unicast.

Transmitter UE controlled transmissions or receiver UE controlled transmissions may be dynamically adjusted. For example, at step 112 in FIG. 9A, the transmitter UE may also allocate the resources for HARQ ACK/NACK or other parameters in the second SCI (e.g., SCI02).

The transmitter UE initiated and controlled unicast example illustrated in FIG. 8A may also be applicable to a transmitter UE initiated and controlled multicast. The receiver UE initiated and controlled unicast example illustrated in FIG. 9A may also be applicable to a receiver UE initiated and controlled many-to-one communication in a proximity. For multicast, the HARQ feedback or SL-CSI feedback may be from all the receiving UEs or some of the receiving UEs.

Communications in a Car Platoon: Mixture of broadcast, multicast and unicast communications may be required in a car platoon. For example, the platoon lead or platoon member(s) may broadcast to all UEs in the proximity for exchanging cooperative driving information. The platoon lead or platoon member(s) may also multicast to member UEs within the platoon for trajectory or maneuver map. The platoon lead or platoon member(s) may further unicast to a UE for joining or leaving the platoon. The platoon lead may unicast to an RSU for exchanging perception data as an example. Overall, optimizing the resources for mixed communications on sidelink may be conducted by the platoon lead as an example.

Figure 10A:
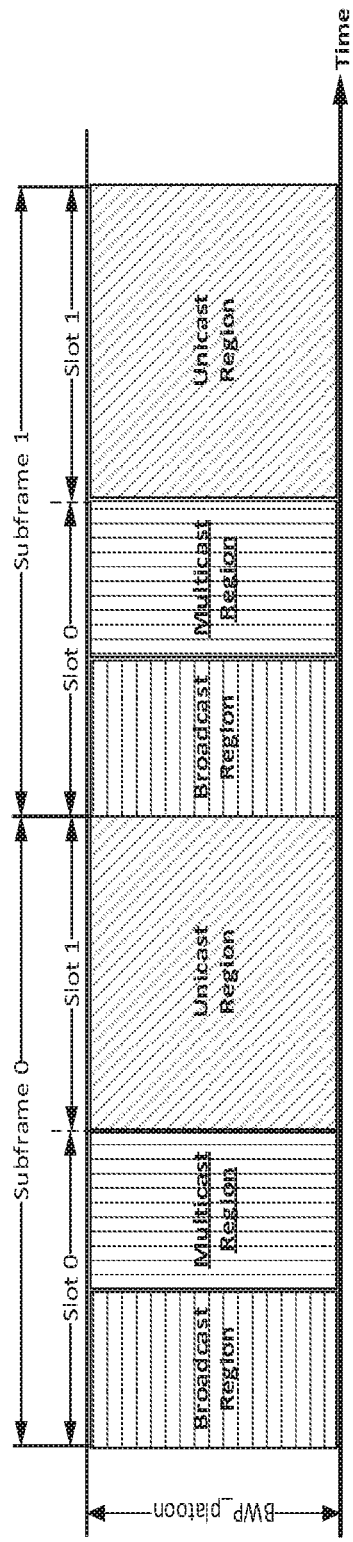
FIG. 10A illustrates exemplary communication occasions for Platooning.

An example is illustrated in FIG. 10A, which shows the sidelink resources may be allocated by a platoon lead for more efficient communications in the platoon. Broadcast Region: may include one or multiple Broadcast Occasions (BOs). For multiple BOs, they may be FDMed or TDMed as shown in FIG. 10A or combination of both. BOs may be allocated at dedicated resources for each member UE (e.g., contention free broadcast) or BOs may be allocated over shared resources for all the member UEs (e.g., full contention based broadcast). An example of hybrid broadcast (e.g., mixed contention free and contention based broadcast) may have a first set of BOs dedicated to the lead and a second set of BOs shared by the rest of member UEs. Another example of hybrid broadcast may have a first set of BOs dedicated to the lead and a second set of BOs dedicated to each relay UE and a third set of BOs shared by the rest of member UEs. For full contention based broadcast, the lead may have the highest priority for broadcasting at any BO and it may have the least or zero back off time. A platoon member UE may sense channel on sidelink first, if the channel is occupied, then it may back off for some time related to priority (e.g., a relay member may have higher priority than the other members) and may sense the channel later for broadcasting. The broadcast may be for all UEs in the proximity, including non-platoon-member UEs.

With reference to FIG. 10A, Multicast Region: may include one or multiple Multicast Occasions (MOs). For multiple MOs, they may be FDMed or TDMed as shown in FIG. 10A or combination of both. MOs may be allocated at dedicated resources for each member UE (e.g., contention free multicast) or MOs may be allocated over shared resources for all the member UEs (e.g., full contention based multicast). An example of hybrid multicast (e.g., mixed contention free and contention based multicast) may have a first set of MOs dedicated to the lead and a second set of MOs shared by the rest of member UEs. Another example of hybrid multicast may have a first set of MOs dedicated to the lead and a second set of MOs dedicated to each relay UE and a third set of MOs shared by the rest of member UEs. For full contention based broadcast, the lead may have the highest priority for multicasting at any MO and it may have the least or zero back off time. A platoon member may sense channel on sidelink first, if the channel is occupied, then it may back off for some time related to priority (e.g., a relay member may have higher priority than the other members) and may sense the channel later for multicasting. The multicast may be for all platoon members.

In further reference to FIG. 10A, Unicast Region: may include one or multiple Unicast Occasions. For multiple UOs, they may be FDMed or TDMed as shown in FIG. 10A or combination of both. UOs may be allocated at dedicated resources for each member UE (e.g., contention free unicast) or MOs may be allocated over shared resources for all the member UEs (e.g., full contention based unicast). An example of hybrid unicast (e.g., mixed contention free and contention based unicast) may have a first set of UOs dedicated to the lead and a second set of UOs shared by the rest of member UEs. Another example of hybrid multicast may have a first set of UOs dedicated to the lead and a second set of UOs dedicated to each relay UE and a third set of UOs shared by the rest of member UEs. For full contention based unicast, the lead may have the highest priority for multicasting at any UO and it may have the least or zero back off time. A platoon member may sense channel on sidelink first, if the channel is occupied, then it may back off for some time related to priority (e.g., a relay member may have higher priority than the other members) and may sense the channel later for unicasting. The unicast may be for each member in the platoon.

Broadcast Region, Multicast Region and Unicast region may be allocated on dedicated time resources (e.g., TDMed as shown in FIG. 10A), frequency resources (e.g., FDMed) or space resources (e.g., SDMed) or combination of them on sidelink. Broadcast Region, Multicast Region, or Unicast region may be allocated on shared sidelink time, frequency or space resources. In this case, partial overlap or full overlap, the lead may set priority rules among communication regions, e.g., a broadcast or multicast has higher priority than a unicast. One example is Broadcast Region and Multicast Region are allocated on shared resources and Unicast Region is allocated on different resources.

Communications in a proximity: mixture of broadcast, multicast and unicast of different V2X applications may be collocated in a proximity. Optimizing the resources for mixed communications among different V2X applications on sidelink may be conducted by an RSU as a coordinator for all the group leads or UEs in the proximity.

Figure 10B:
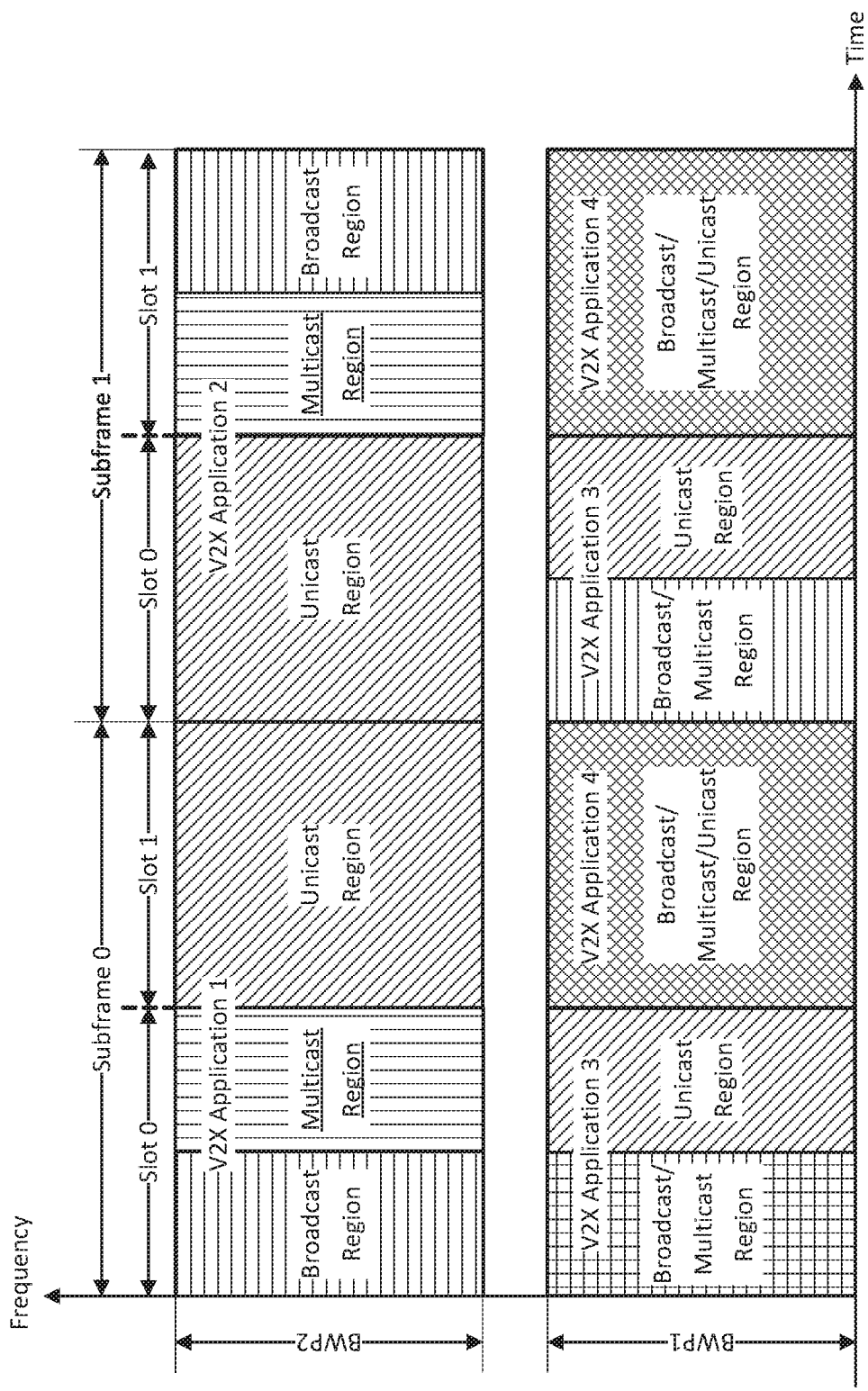
FIG. 10B illustrates exemplary communication occasions in proximity.

An example is illustrated in FIG. 10B, which shows that different V2X applications' communications may be allocated differently in frequency, e.g., FDMed in different operation band, or allocated differently in time, e.g., TDMed in different time interval.

Feedback for Multicast:

For a V2X application requiring reliable multicast, HARQ ACK/NACK feedback may be adapted to ensure that the message is decoded properly by the receivers within a group; link adaptation may also be implemented to optimize the link quality for each receiver within a group. However, the feedback for multicast is many-to-one communication and the radio resource cost may be very high and the latency may be increased for collecting feedback from all the receivers within a large multicast group, especially with the Sidelink Channel State Information (SL-CSI) report which requires much more radio resources for feedback comparing with the HARQ feedback. Therefore, certain trade-off among reliability, resource cost and latency should be taken into multicast feedback design.

Different V2X applications may require different levels of reliability or performance. For example, for V2X applications with very high automation level, the guaranteed reliability and performance may be required, e.g., each receiver within the group decodes the packet successfully within a required latency. For example, for V2X applications with low automation level, the best effort reliability and performance may be required, e.g., over a high percentage (e.g., 60 percent to 70 percent) of receivers within the group decode the packet successfully within a required latency. For example, for V2X applications with a human driver, the least effort reliability and performance may be good enough, e.g., over a low percentage (e.g., 30 percent to 40 percent) of receivers within the group decode the packet successfully within a required latency.

Based on the different level of reliability or performance requirement, the feedback from receiver UEs may be implemented with the tradeoff among reliability, resource cost, and delay. For guaranteed performance, e.g., within a minimum required communication range for a V2X service, the transmitter needs to receive HARQ ACK/NACK feedbacks from all receivers, e.g., 100 percent or full count of receiver UEs; the transmitter should receive SL-CSI measurements from all receivers and adapt the link for the worst measurement within the minimum required range. In this case, the transmitter may be indicated with the receiver count value, e.g., rx_count, by the higher layer, for example, the transmitter needs to receive HARQ ACK/NACK from number of rx_count receiver UEs. For best-effort performance, e.g., out of a minimum required communication range for a V2X service, the transmitter should receive ACK feedbacks from over certain percentage (less than 100 percent) of receiver UEs, e.g., only from some UEs; the transmitter should receive SL-CSI measurements from over certain percentage or some count of receivers (less than 100 percent) and adapt the link for the worst or averaged measurement. In this case, the transmitter may be indicated with the percentage value, e.g., percent, or the receiver count value, e.g., rx_count, may be from the by the higher layer. For least-effort performance, e.g., out of a max communication range for a V2X service, the transmitter should receive ACK feedbacks from a low or zero percentage or one or zero count of receiver UEs, e.g., no ACK feedback if zero percent or zero receiver UE count, and the transmitter should receive CSI measurements from zero percentage or zero count of receivers and adapt the link without the SL-CSI feedback, e.g., no CSI measurement and report, where the percentage value, e.g., percent, or the receiver count value, e.g., rx_count, may be from the higher layer.

The threshold, e.g., threshold-perform, for performance levels derived from QoS requirement of a V2X service, for example corresponding to the performance level of guaranteed, good, best effort, poor, least effort, may be configured and indicated by the higher layer and may also be dynamically indicated in the SCI associated with the data transmitted, so that for example a receiver UE may decide to feedback HARQ ACK/NACK or not after decoding the received data.

For multiple receiver UEs or all receiver UEs within a group to send HARQ ACK/NACK or CSI measurement reports, the group lead may configure, semi-persistently or dynamically allocate dedicated time (e.g., TDMed resources), frequency (FDMed resources) or space (SDMed resources) resources to each UE (e.g., each UE may send HARQ ACK/NACK at different resource allocations in time, frequency, or space) or shared time, frequency, or space resources among the UEs (e.g., the UEs may send HARQ feedback at the same resource allocation in time, frequency, or space). Another example for shared resources, a UE may sense the channel first and then send the feedback if the channel is available. A UE may back off with a randomly generated back off time if the channel is not available and then sense the channel again, or back off without sending any feedback.

For TDMed and FDMed feedback resources, receiver UEs should adjust the Time Advance properly, so that the feedbacks from different UEs are aligned properly at the multicast transmitter side. However, the UEs are generally very close to each other within a V2X application group in proximity and the signal propagation delay variance among the group members may not be significant if the receivers are fully synchronized with the reference signal sent from the multicast transmitter.

For a V2X application group in proximity, the group lead may collect the member UE's context such as size and height, antenna height and location (e.g., front bumper, back bumper, or roof), storage and computation power, etc. during the "joining the group" procedure. The group lead may also have the location mapping for all member UEs at the group's communication network topology by for example the trajectory exchange. In this case, the group lead may reduce the resource or latency for many-to-one feedbacks by dynamically managing a list of member UEs for HARQ feedback (e.g., list-UE-HARQ) and a list of member UEs for SL-CSI measurement and report (e.g., list-UE-CSI) based on the situation in proximity such as road traffic condition, V2X applications in proximity, number of member UEs, size and shape of the group network topology, communication range, etc. The group lead may statically configure the lists (e.g., list-UE-HARQ and list-UE-CSI) (e.g., SL-RRC message to the group members) and may semi-statically (e.g., SL-MAC CE) or dynamically (e.g., SL-SCI) indicate the changes to them as well as the resource allocations for the listed UEs' feedback.

For example, for guaranteed service, the group lead (e.g., a transmitter for multicast in the group) may enlist all member UEs for HARQ feedback, and enlist the member UEs behind a big car or member UEs at the outer edge positions (e.g., in the required communication range) of the group network topology for HARQ feedback or SL-CSI measurement and report. Also, the group lead may pick one or two UEs (e.g., small percentage) at an area where multiple UEs are very close to each other for HARQ feedback or SL-CSI measurement and report. Furthermore, the group lead may alter the UEs subgroups (e.g., subset 1 and subset 2 of list-UE-CSI) for HARQ feedback or SL-CSI measurement and report at different times.

For car platooning, the distance between member UEs may be very small, and the group network topology may be very special, e.g., a line of closely positioned UEs, which is very stable for long time. This may allow a platoon lead to further optimize the many-to-one feedback mechanisms. For example, pick the furthest UE on the line which has direct radio link with the platoon lead (e.g., the required communication range) for HARQ feedback or SL-CSI measurement and report.

In addition to reduce the overhead of multicast many-to-one feedback, the resource reserved for retransmission may also be reused by the transmitter or other UEs nearby if the initial transmission is successfully decoded.

After indicated by the receiver UE(s) a successful (e.g., ACKed) or none-failed (e.g., not NACKed) transmission of a first data, the transmitter UE may reuse the reserved retransmission resource for a second data if the data is ready.

After detected the indication(s) from the receiver UE(s) a successful (e.g., ACKed) or none-failed (e.g., not NACKed) transmission of a first data, the other UEs in the proximity may reuse the reserved retransmission resource for a data if a data is ready to transmit. For example, if a NACK-only HARQ feedback resource is shared among all the receiver UEs, a UE in proximity may detect if any NACK has been sent at this resource allocation, by for example energy based measurement (e.g., SL-RSSI at the NACK feedback resource), and therefore decide if the reserved retransmission resource can be reused or not.

For semi-persistent reserved resources, e.g., reserved resources for the next data packet(s), an unused re-transmission resource by the first transmitting UE may be sensed by a second transmitting UE and therefore possibly reserves the same resource(s) reserved already for next data packet(s). In this case, the first transmitting UE needs to check the reserving SCI if make sure if its reserved resource(s) for next data packet(s) is still available.

HARQ Feedback Channel

HARQ feedback channel: For one or two bits HARQ ACK/NACK feedback signal carried on Sidelink Feedback Control Information (SFCI) carried on Physical Sidelink Feedback Control Channel (PSFCCH), a low Peak-to-Average Power Ratio (PAPR) sequence based design is disclosed here as an example with the following sequence design.

$$\gamma_{u,v}^{(\alpha,\delta)}(n) = e^{j\alpha n}\bar{\gamma}_{u,v}(n), 0 \leq n \leq N_{ZC},$$

where $\bar{\gamma}_{u,v}(n)$ is a Zadoff-Chu sequences of length $N_{ZC}$ with u as the sequence group, v as the sequence number and α as the cyclic shift. The cyclic shift α may be a function of an initial cyclic shift value, $m_0$, HARQ ACK/NACK bit(s), m, and a sequence c with $c_{init}=n_{ID}^{Tx}$, as shown in the following equation.

$$\alpha=f(m_0,m,c(n_{slot},n_{symbol},n_{RB}))),$$

where the sequence c is a function of $n_{slot}$ as the slot number within a frame, $n_{symbol}$ as the symbol number within a slot, and $n_{RB}$ as the RB index.

For different receiving UEs to send HARQ ACK/NACK feedbacks at different HARQ feedback resources (e.g., different symbol and/or RB locations), the receiving UE's ID (e.g., $n_{ID}^{Rx}$) may be used to implicitly or explicitly mapped to $n_{symbol}$ or $n_{RB}$. For example of mapping, $n_{RB}=n_{ID}^{Rx}$ mod $N_{RB}$, where $N_{RB}$ is number of RBs for HARQ feedbacks. For another example of mapping, the first receiving UE is mapped to the first $n_{RB}$, the second receiving UE is mapped to the second $n_{RB}$, and so on. Similarly, the mapping to $n_{symbol}$ for the receiving UEs. Or a combination of ($n_{symbol}$, $n_{RB}$) for mapping the receiving UEs if multiple symbols and RBs are used for multi-receiving UE feedbacks.

For different HARQ processes, similar mapping schemes may also be used for mapping HARQ IDs with $n_{symbol}$ or $n_{RB}$ respectively or with a combination of ($n_{symbol}$, $n_{RB}$). Another example to map receiving UEs or HARQ processes is by using the initial cyclic shift value, $m_0$. For example, different receiving UEs or HARQ processes may be mapped with different values of $m_0$.

The initial cyclic shift value, $m_0$, may be configured by gNB via RRC or by an RSU or lead via SL-RRC. The HARQ ACK/NACK bit(s),), m, may be mapped to, for example $\{m_2/m_1\}$ for 1-bit ACK/NACK, or $\{m_4/m_3, m_2/m_1\}$ for 2-bit ACK/NACK, where the first ACK/NACK is corresponding to the first received data and the second ACK/NACK is corresponding to the second received data, or vice versa. The $c_{init}$ may be assigned to a transmitter ID or a source ID to identify the transmitter or the source of the data ACKed/NACKed as an example.

The resource for HARQ ACK/NACK feedback may be reserved by the transmitter UE and indicated in the SA-SCI or SCI associated with the data.

A resource set for HARQ ACK/NACK feedback carried on PSFCCH, PSFCCH_resourceSet_ID, may be configured via RRC bug NB or SL-RRC by an RSU or a lead in proximity or a lead of a group and dynamically indicated by the transmitter UE with the resource index or ID, PSFCCH_resourceID, indicated in the SCI associated to the data transmitted.

The resource for HARQ ACK/NACK feedback carried on PSFCCH may also derived from the PSCCH carrying the SCI associated with the data transmitted or from the PSSCH carrying the data transmitted. For example, the time allocation of the starting symbol may be derived as $S_1$ symbols from the last symbol of the PSCCH carrying the SCI associated with the data or $S_2$ symbols from the last symbol of the PSSCH carrying the SCI associated with the data; the frequency allocation with starting RB or RBG or subchannel may be derived from the first RB or RBG or subchannel of the PSCCH carrying the SCI associated with the data with a offset, e.g., $RB_{PSCCH0}/RBG_{PSCCH0}/Subchannel_{PSCCH0}+RBP_{PSCCHoffset}/RBG_{PSCCHoffset}/Subchannel_{PSCCHoffset}$, or derived from the first RB or RBG or subchannel of the PSSCH carrying the data with a offset, e.g., $RB_{PSCCH0}/RBG_{PSCCH0}/Subchannel_{PSCCH0}+RBP_{PSCCHoffset}/RBG_{PSCCHoffset}/Subchannel_{PSCCHoffset}$; the spatial filter or association is derived from the PSCCH carrying the SCI associated with the data or the PSSCH carrying the data.

An example of RRC configuration for a Physical Sidelink Feedback Channel (PSFCH) carrying HARQ ACK/NACK SFCI is exemplified as follows.

```
psfch_Config
  setup
    resourceSetToAddModList
      psfch_ResourceSetID = 0
      resourceList
      {
        0, // these are the psfcch-ResourceId in resourceToAddModList.
        1, // example : {0,1,2,3,4,5,6,7}
        2,
        ...
      }
      maxPayloadMinus1
    resourceToAddModList
    {
      psfch_ResourceId = 0
      startingRB = 0 // starting RB or RB offset
      intraSlotFrequency Hopping = Omitted
      secondHopRB = 0
      format = format0 // assuming format 0 is for HARQ ACK/NACK
        format 0
        {
          initialCyclicShift = 0 // m0 = 0
          nrofSymbols = 1
          startingSymbolIndex = 13 // end of the slot
        }
    }
    {
      psfch_ResourceId = 1
      startingRB = 0
      intraSlotFrequency Hopping = Omitted
      secondHopRB = 0
      format = format0
        format 0
        {
          initialCyclicShift = 1 // m0 = 1
          nrofSymbols = 1
```

```
                    startingSymbolIndex = 13
                  {
              }
          }
          {
              psfch_ResourceId = 2
              startingRB = 0
              intraSlotFrequency Hopping = Omitted
              secondHopRB = 0
              format = format0
                format 0
                {
                    initialCyclicShift = 3 // m0 = 3
                    nrofSymbols = 1
                    startingSymbolIndex = 13
                }
          }
      ........
```

HARQ ACK/NACK Transmission

HARQ ACK/NACK transmission: To avoid too many PSFCCH transmitted for HARQ ACK/NACK, it's disclosed herein that a UE may not be expected to send more than one PSFCCH to a transmitter in a slot. A UE may use $\{m_2/m_1\}$ to ACK/NACK one received Transport Block (TB) and $\{m_4/m_3, m_2/m_1\}$ to ACK/NACK two received TBs respectively to a transmitter at an FSFCH resource allocation.

For sensing based resource selection, two UEs may select the same resource(s) as the same time. If two transmitters select the same resource(s) for a receiver UE to ACK/NACK, e.g., the receiver UE has two PSFCCH allocated at the same resource to ACK/NACK two data TBs respectively, the UE may multiplexing PSFCCH at the same resource with different transmitter IDs in $c_{init}=n_{ID}^{Tx}$. e.g., $\gamma_{u,v}^{(\alpha 1,\delta)}(n)$ with $c_{init1}=n_{ID}^{Tx1}$ to ACK/NACK to transmitter 1 and $\gamma_{u,v}^{(\alpha 2,\delta)}(n)$ with $c_{init2}=n_{ID}^{Tx2}$ to transmitter 2.

For sensing based resource selection, two UEs may select the same resource(s) as the same time. If two transmitters select the same resource(s) to ACK/NACK two TBs transmitted to each other respectively, e.g., a UE transmits a PSFCCH to ACK/NACK a TB received at the same resource as the UE receives a PSFCCH to ACK/NACK a TBs transmitted by the UE. This is a half duplex issue and may be treated as an error. To avoid such half duplex issue, it's disclosed that the HARQ ACK/NACK time line, e.g., the starting symbol, is derived from the PSCCH carrying the SCI associated to the data or PSSCH carrying from the data. Since a UE is not expected to transmit or receive PSCCH or PSSCH in the same slot.

Some of the communications over sidelink are broadcast to all UEs in the proximity, some of the communications are groupcast among a group of UEs in the proximity, and some of the communications are unicast between a pair of UEs in the proximity. Different communications may require different configurations, control signalling, as well as UE procedures.

Different schemes for broadcast, groupcast, and unicast on sidelink are described below with details.

Note that the 15 kHz subcarrier spacing numerology may be used in most illustrations, which has 14 symbols in a slot and 1 slot in a subframe. But for 30 kHz subcarrier spacing numerology, there are 14 symbols per slot and 2 slots in a subframe, therefore, the communication occasions may also be configured within a slot. Also note that some terms may be used interchangeably, such as UE and vehicle UE, multicast and groupcast.

Configuration for Broadcast, Groupcast, or Unicast

Resource Pool and Resource Configurations—To support advanced V2X services, UE may be required to support broadcast, groupcast, or unicast communications in proximity, where the radio resource pool(s) or radio resources for different communications may be shared as shown in FIG. 13 or dedicated as shown in FIG. 14.

As illustrated in in FIG. 13, resources for a UE's NR-V2X sidelink communications such as broadcast, groupcast, or unicast may be configured over one or multiple resource pools within a sidelink bandwidth part, e.g., SL-BWP as shown in the figures, where the resources may be configured over dedicated resources or shared resources.

Figure 13A:
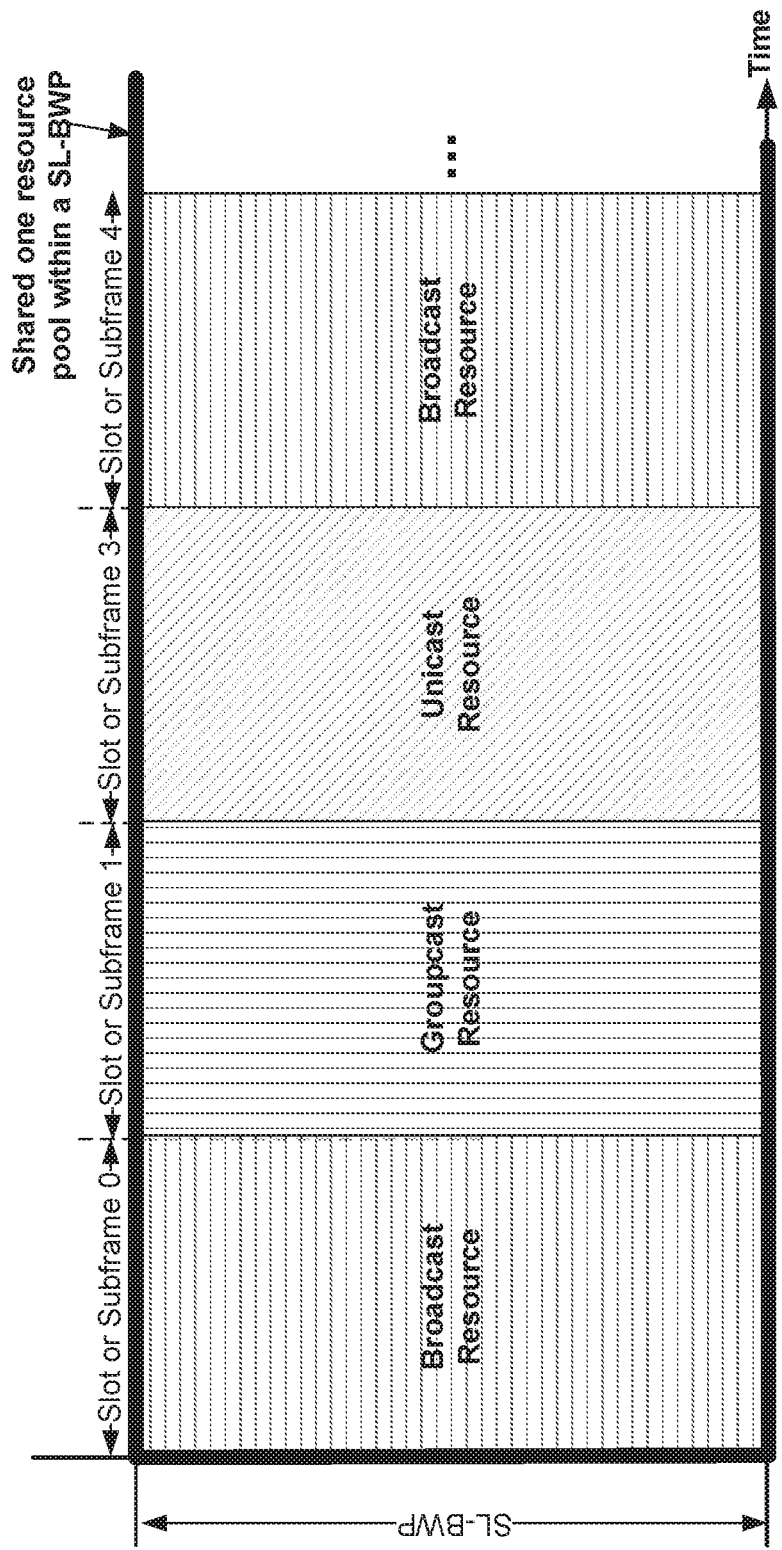
FIG. 13A illustrates exemplary Shared Resource Pools for Broadcast, Groupcast, and Unicast-TDMed over One Shared Resource Pool within a SL-BWP.
Figure 13B:
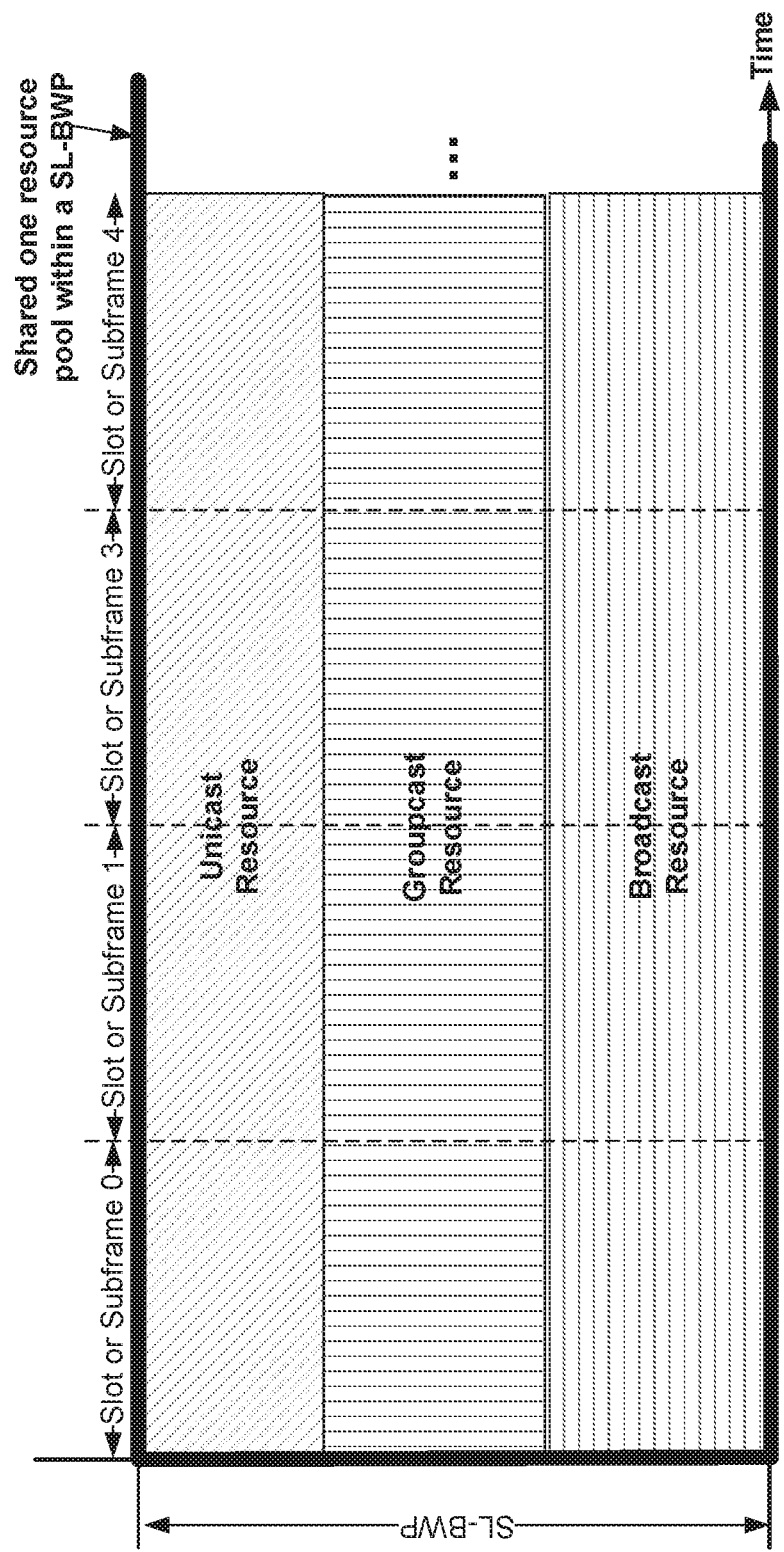
FIG. 13B illustrates exemplary Shared Resource Pools for Broadcast, Groupcast, and Unicast-FDMed over One Shared Resource Pool within a SL-BWP.

For example, dedicated resources may be configured for broadcast, groupcast, or unicast respectively at different time allocation, e.g., Time Division Multiplexed (TDMed) over a shared resource pool within SL-BWP as shown in FIG. 13A, or at different frequency allocation, e.g., Frequency Division Multiplexed (FDMed) over a shared resource pool within SL-BWP as shown in FIG. 13B.

Figure 13C:
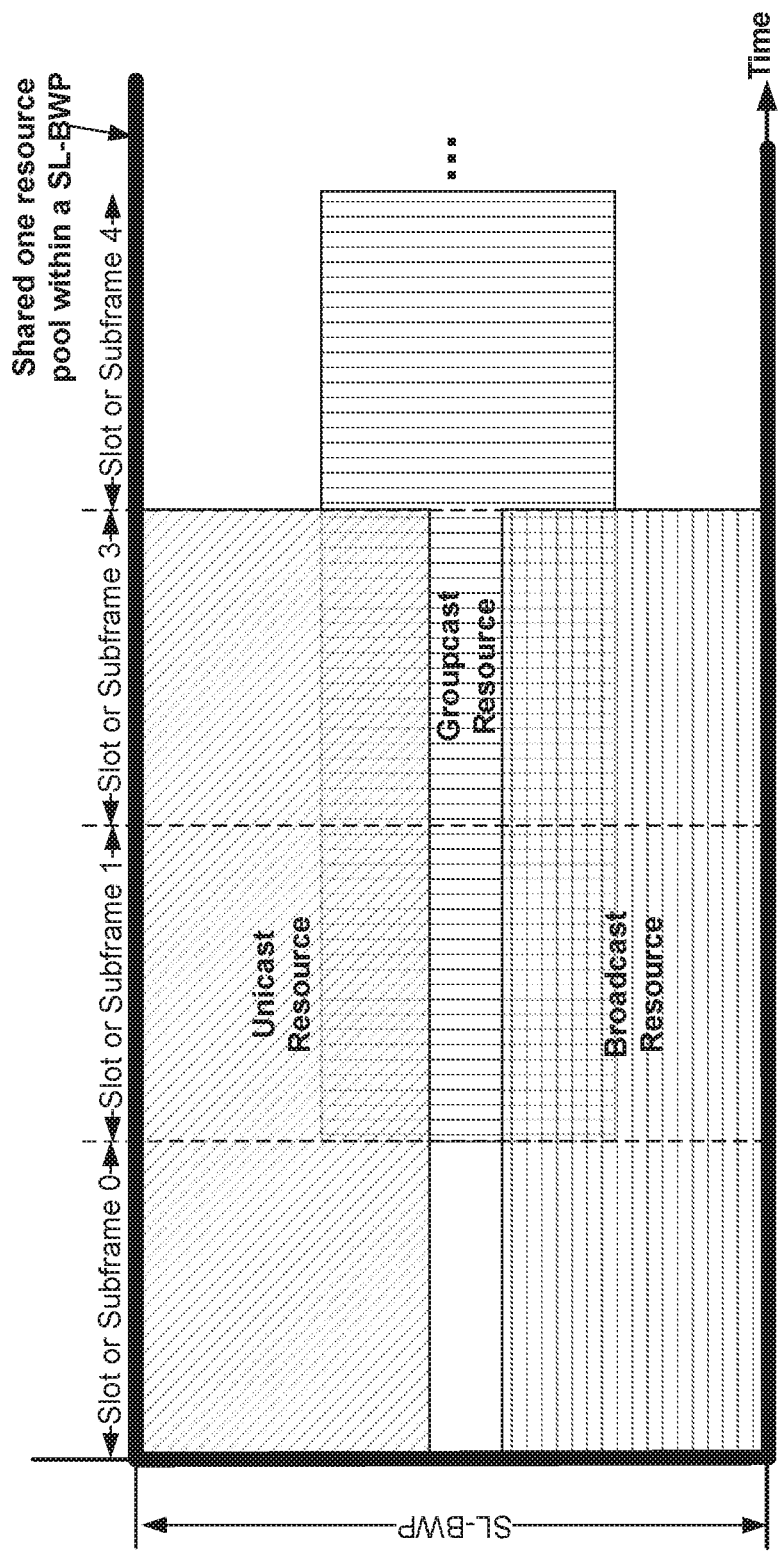
FIG. 13C illustrates exemplary Shared Resource Pools for Broadcast, Groupcast, and Unicast-Overlapped in Time and Frequency over One Shared Resource Pool within a SL-BWP.
Figure 13D:
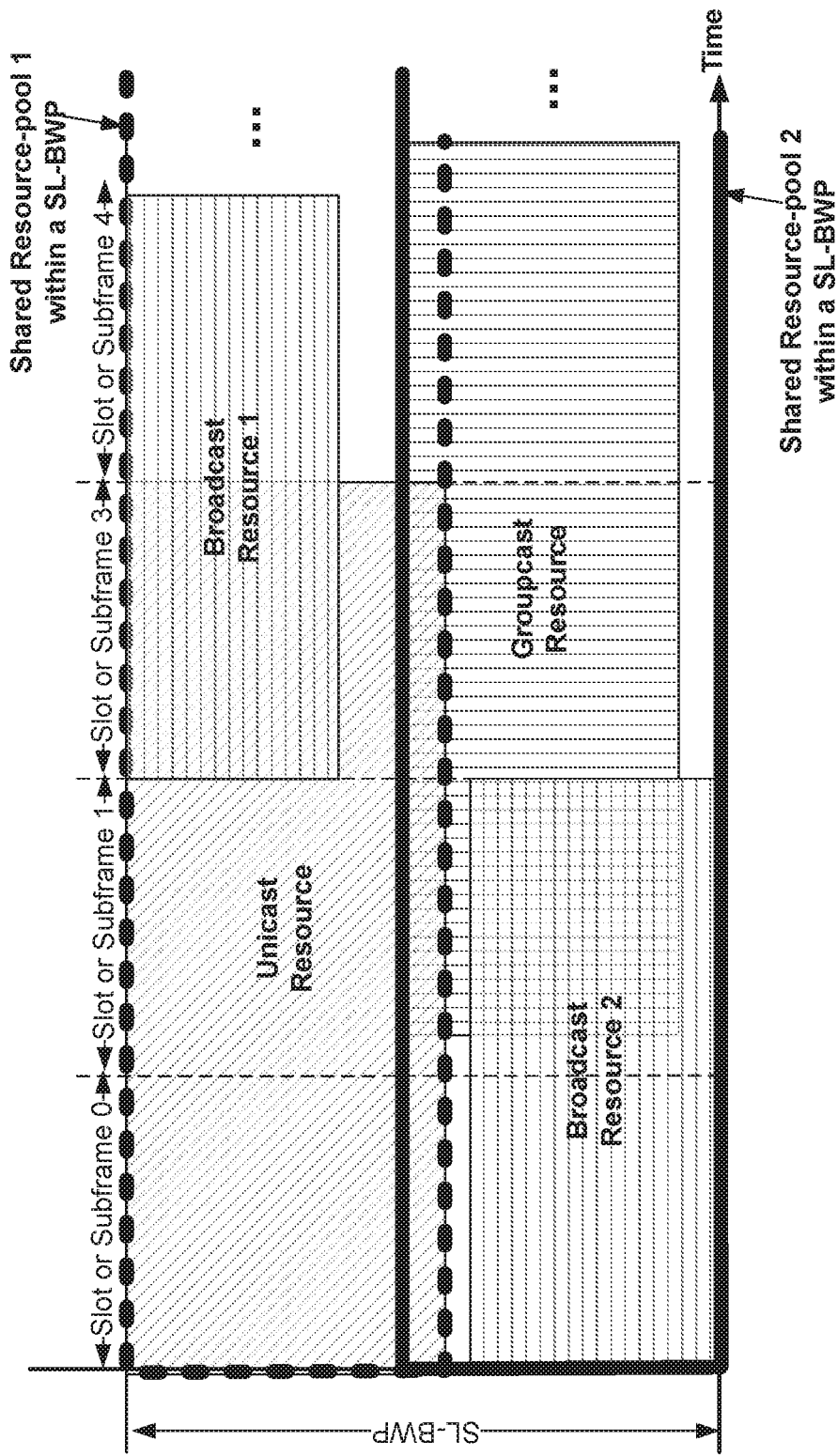
FIG. 13D illustrates an exemplary Shared Resource Pools for Broadcast, Groupcast, and Unicast-Overlapped over Two Shared Resource Pools within a SL-BWP.

For another example, shared resources may also be configured for broadcast, groupcast, or unicast respectively over one or multiple resource pools within SL-BWP with overlapping in time or frequency as shown in FIG. 13C with one resource pool within SL-BWP and FIG. 13D with two overlapped resource pools, e.g., Resource-pool 1 and Resource-pool 2 within SL-BWP.

As illustrated in FIG. 14, resources for a UE's NR-V2X sidelink communications such as broadcast, groupcast, or unicast may be configured over dedicated resource pools respectively within one or multiple sidelink bandwidth parts.

Figure 14A:
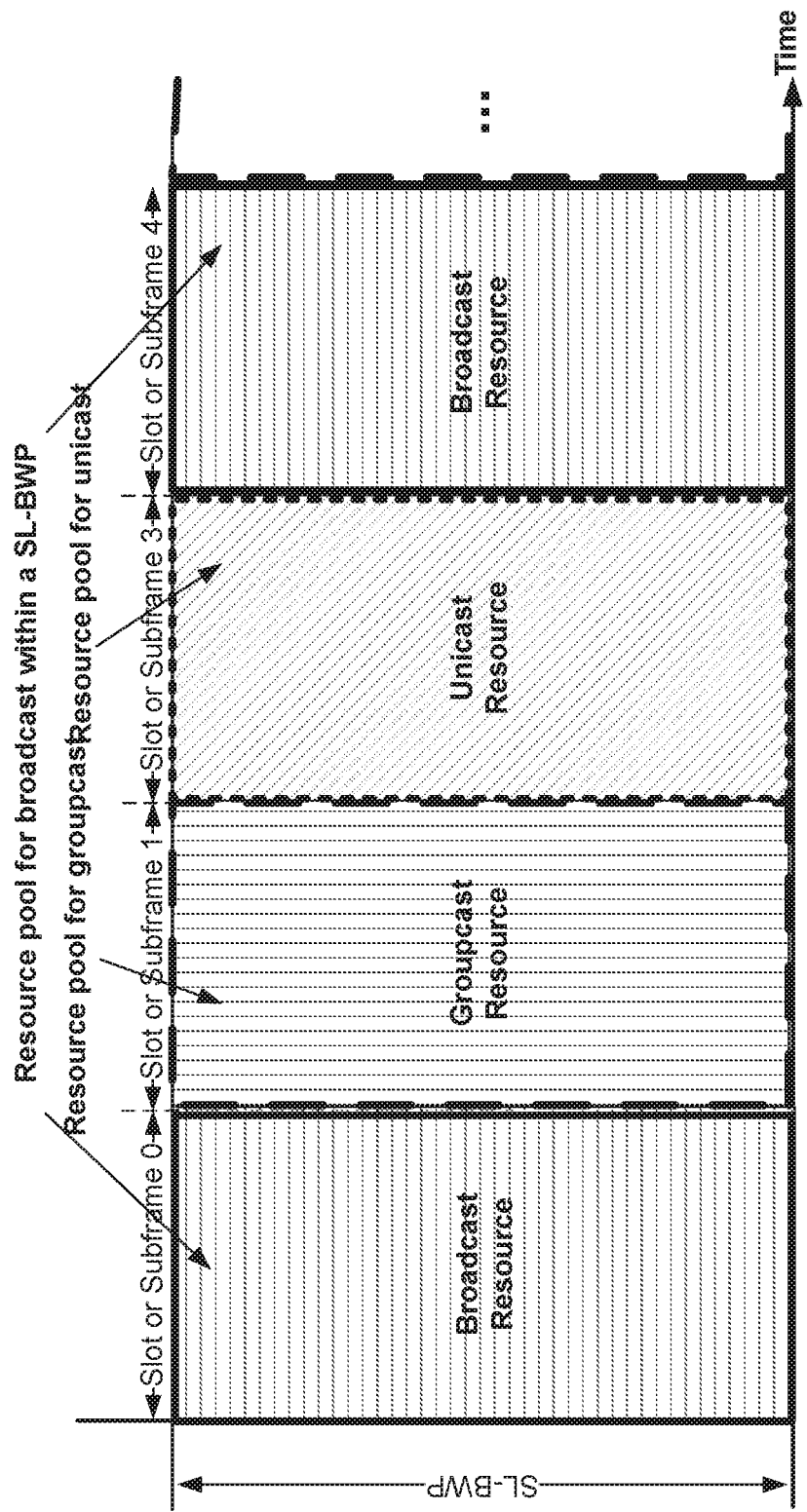
FIG. 14A illustrates an exemplary Dedicated Resource Pools for Broadcast, groupcast, and unicast-Dedicated Resource Pools TDMed within a SL-BWP.
Figure 14B:
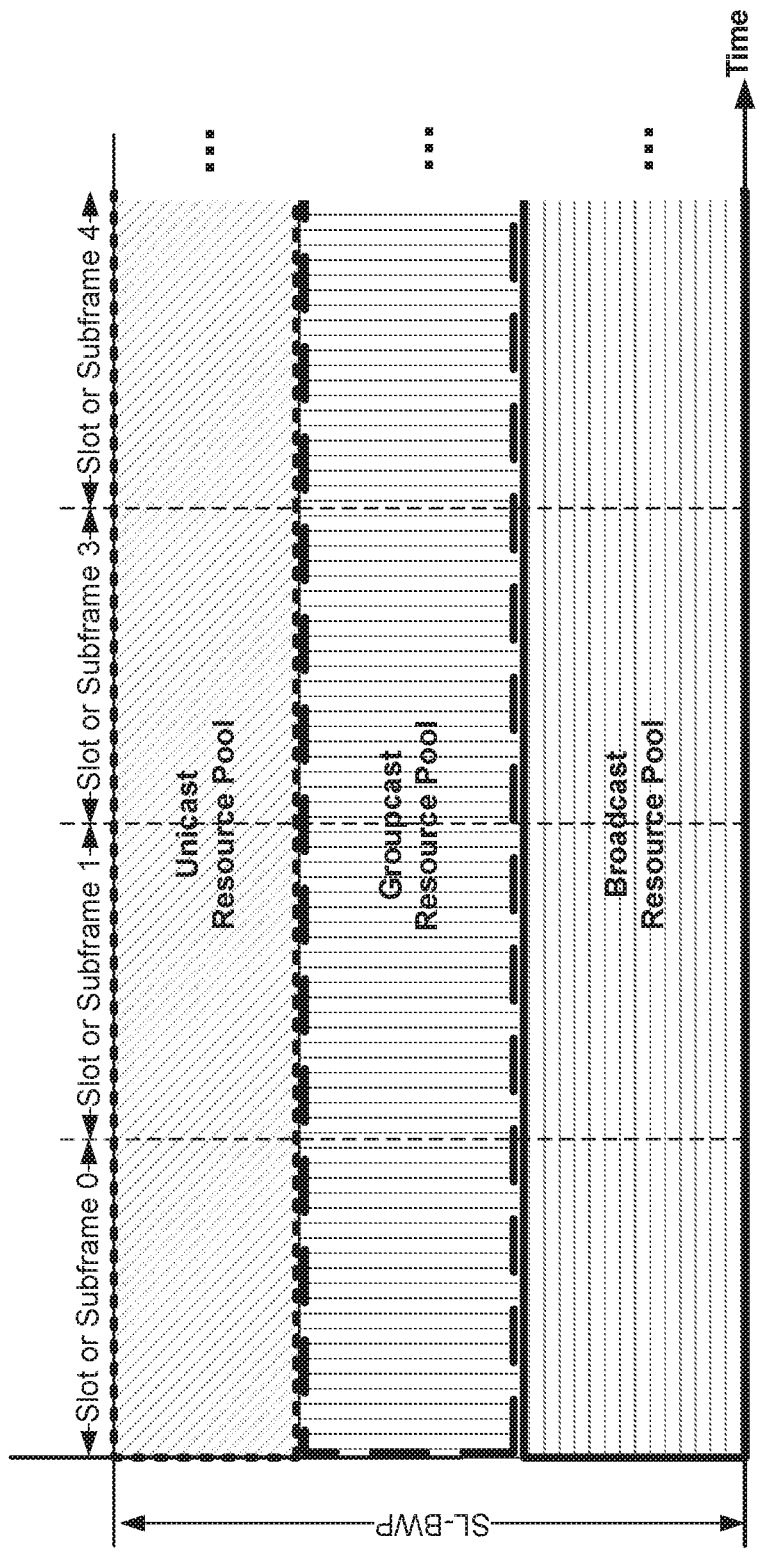
FIG. 14B illustrates an exemplary Dedicated Resource Pools for Broadcast, Groupcast, and Unicast-Dedicated Resource Pools FDMed within a SL-BWP.

For example, dedicated resources may be configured for broadcast, groupcast, or unicast respectively at each dedicated resource pools, where the respective resource pools may be TDMed within SL-BWP as shown in FIG. 14A, or FDMed within SL-BWP as shown in FIG. 14B.

Figure 14C:
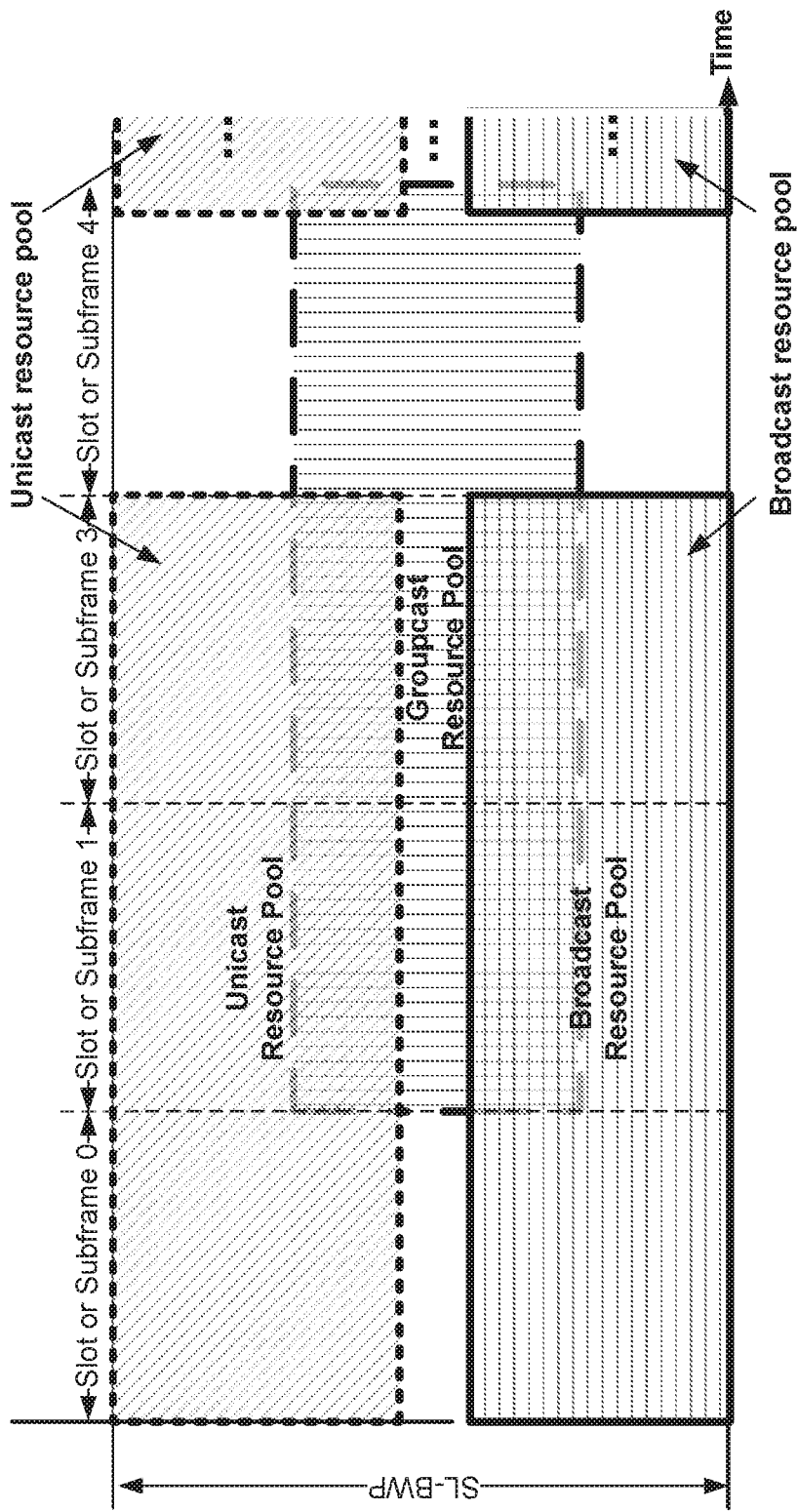
FIG. 14C illustrates exemplary Dedicated Resource Pools for Broadcast, Groupcast, and Unicast-Dedicated Resource Pools Overlapped within a SL-BWP.
Figure 14D:
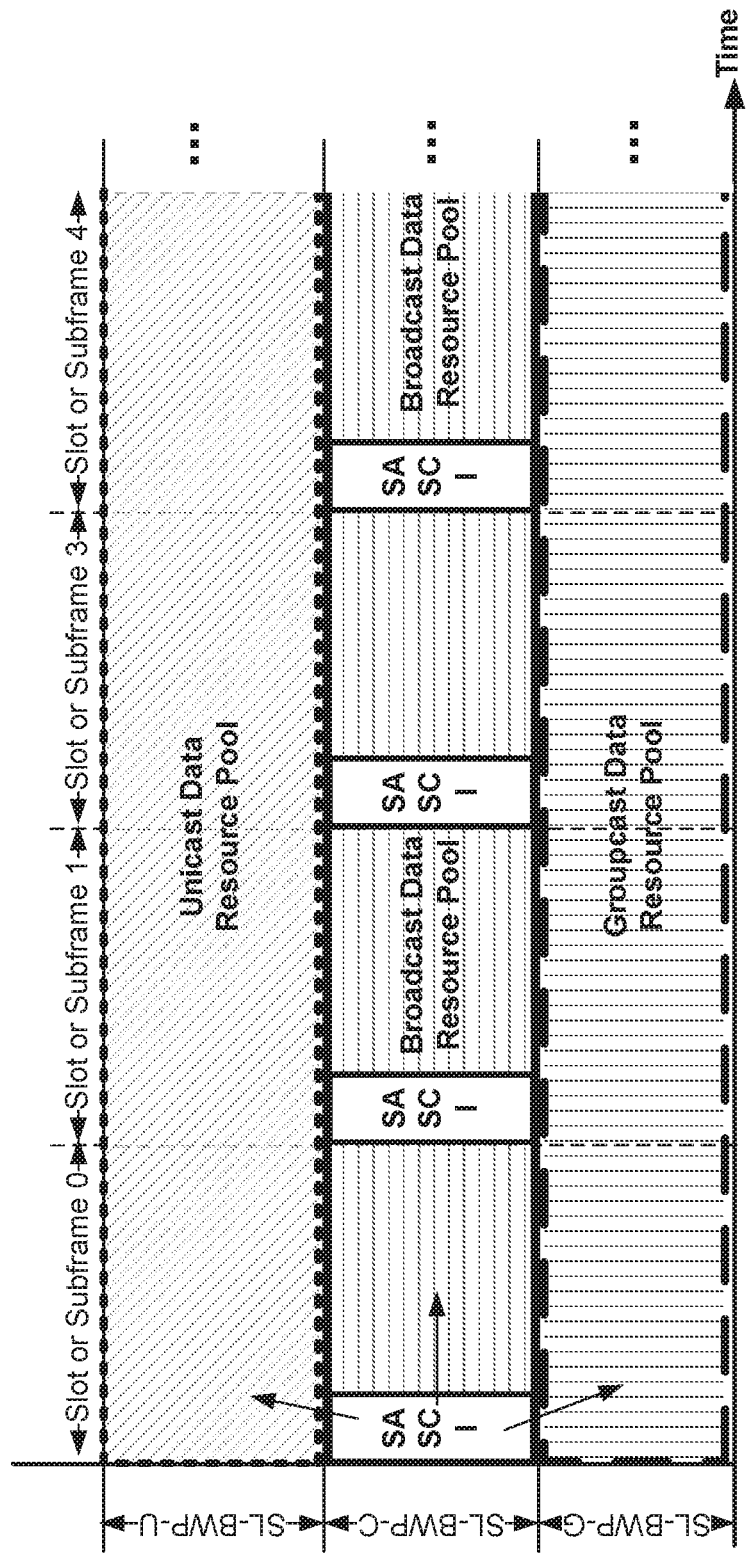
FIG. 14D illustrates exemplary Dedicated Resource Pools for Broadcast, Groupcast, and Unicast-Dedicated Resource Pools within Different SL-BWPs.

For another example, dedicated resources may be configured for broadcast, groupcast, or unicast respectively at each dedicated resource pools, where the respective resource pools may be within the same bandwidth part as shown in FIG. 14C or different bandwidth part as shown in FIG. 14D. For example, the resources for broadcast and Scheduling Assignment Sidelink Control Information (SA SCI) may be configured within a common bandwidth part, e.g., SL-BWP-C as shown in the figure, shared by all UEs, the resources for unicast data or feedback may be configured within a dedicated bandwidth part, SL-BWP-U for unicast data as shown, and the resources for groupcast data or feedback may be configured within a dedicated bandwidth part, SL-BWP-G as shown in the figure.

In this case, a UE receiving unicast or groupcast message may need to automatically switch sidelink bandwidth part accordingly. For example, a UE monitors the SA SCI for unicast in the control resource pool at the unicast monitoring occasions defined by the unicast Sidelink Control Resource Set (SL-CORESET) within the common sidelink bandwidth part, e.g., SL-BWP-C. After successfully decoding an SA SCI pointing a unicast data allocated in a dedicated sidelink bandwidth part, e.g., SL-BWP-U, the UE may automatically switch to the bandwidth part indicated in the SA SCI based on an SA SCI decoding timer. Once the UE switches to the dedicated sidelink bandwidth part, SL-BWP-U, for unicast data, it may decode the data successfully and sends an Acknowledgement (ACK) HARQ feedback at the resource indicated by the SA SCI within the same bandwidth part, SL-BWP-U, then the UE may automatically switch back to the common sidelink part, SL-BWP-C, based on a feedback timer and continues monitoring SA SCI for broadcast, groupcast, or unicast based on the monitoring occasions defined by the broadcast SL-CORESET, groupcast SL-CORESET, or unicast SL-CORESET respectively. Similarly, a UE may automatically switch its bandwidth part for groupcast if the groupcast transmission and feedback are allocated in a dedicated bandwidth part, e.g., SL-BWP-G.

Radio Resource Control Information Elements

The Radio Resource Control (RRC) information elements related to sidelink resource pool or resource configurations are detailed below.

SL-BWP: The SL-BWP IE may be used to configure generic parameters of a sidelink bandwidth part, e.g., the numerology of a sidelink BWP.

For each serving cell the network configures at least a common sidelink bandwidth part (e.g., cell specific, used for broadcast and scheduling assignment as an example). Furthermore, the network may configure additional sidelink bandwidth parts (e.g., carrier specific) for a serving cell.

The sidelink bandwidth part (SL-BWP) configurations may be divided into common and dedicated parameters. A typical SL-BWP configuration for both common SL-BWP or dedicated SL-BWP configurations is exemplified with Table 1 and Table 2.

TABLE 1

SL-BWP information element

```
-- ASN1START
-- TAG-SL-BWP-START
SL-BWP ::=                    SEQUENCE {
    sl-locationAndBandwidth        INTEGER (0..37949),
```

TABLE 1-continued

SL-BWP information element

```
    sl-subcarrierSpacing           SubcarrierSpacing,
    sl-cyclicPrefix                ENUMERATED { extended }
OPTIONAL -- Need R
}
-- TAG-SL-BWP-STOP
-- ASN1STOP
```

TABLE 2

SL-BWP field descriptions sl-cyclicPrefix

Indicates whether to use the extended cyclic prefix for this sidelink bandwidth part. If not set, the UE uses the normal cyclic prefix. Normal CP is supported for the subcarrier spacings and slot formats.

sl-location AndBandwidth

Frequency domain location and bandwidth of this sidelink bandwidth part. The value of the field shall be interpreted as resource indicator value (RIV).

sl-subcarrierSpacing

Subcarrier spacing to be used in this BWP for all channels and reference signals unless explicitly configured elsewhere.

SL-NRV2X-BWP: The IE SL-NRV2X-BWP may be used to configure an additional sidelink NR-V2X bandwidth part (not for the common sidelink BWP). The field sl-bwp-Id in this IE does not take the value 0 since that is reserved for the common sidelink BWP. The additional sidelink NR-V2X bandwidth part(s) may be set for different NR-V2X resource allocation mode (e.g., mode 1 where NR sidelink scheduled by NR Uu and LTE Uu, or mode 2 where sensing and resource selection procedures conducted by a UE based on sidelink preconfiguration and configuration by NR Uu and LTE Uu), or for different types of communications (e.g., unicast or groupcast).

TABLE 3

SL-NRV2X-BWP information element

```
-- ASN1START
-- TAG-SL-NRV2X-BWP-START
SL-NRV2X-BWP ::=              SEQUENCE {
    sl-bwp-Id                      SL-BWP-Id,
    sl-nrv2x-bwp-Common            SL- NRV2X-BWP-Common
OPTIONAL, -- Cond SetupOtherBWP
    sl-nrv2x-bwp-Dedicated         SL- NRV2X-BWP-Dedicated
OPTIONAL, -- Need M
    ...
}
-- TAG- SL-NRV2X-BWP-STOP
-- ASN1STOP
```

TABLE 4

SL-NRV2X-BWP field descriptions sl-bwp-Id
An identifier for this sidelink NR V2X bandwidth part.
Other parts of the RRC configuration use the SL-NRV2X-BWP-Id
to associate themselves with a particular sidelink NR V2X
bandwidth part.

SL-BWP-Id: The IE SL-BWP-Id may be used to refer to sidelink Bandwidth Parts (BWP). The common sidelink BWP is referred to by "SL-BWP-Id 0". The other sidelink NR-V2X BWPs are referred to by "SL-BWP-Id 1 to maxNrofSLBWPs".

TABLE 5

SL-BWP-Id information element

-- ASN1START
-- TAG-SL-BWP-ID-START
SL-BWP-Id ::=           INTEGER (0..maxNrofBWPs)

TABLE 5-continued

SL-BWP-Id information element

-- TAG-SL-BWP-ID-STOP
-- ASN1STOP

SL-NRV2X-BWP-Common: The IE SL-NRV2X-BWP-Common may be used to configure the common parameters of a sidelink NR-V2X BWP. They are "cell specific". The common parameters of the common sidelink bandwidth part of the PCell are also provided via system information. For all other serving cells, the network provides the common parameters via dedicated signaling such as RRC message.

TABLE 6

SL-NRV2X-BWP-Common information element

```
-- ASN1START
-- TAG-SL-NRV2X-BWP-COMMON-START
SL- NRV2X-BWP-Common ::=           SEQUENCE {
    genericParameters              SL-BWP,
    pscch-ConfigCommon             SetupRelease { PSCCH-ConfigCommon }
OPTIONAL, -- Need M
    psfcch-ConfigCommon            SetupRelease { PSFCCH-ConfigCommon }
OPTIONAL, -- Need M
    pssch-ConfigCommon             SetupRelease { PSSCH-ConfigCommon }
OPTIONAL, -- Need M
    ...
}
-- TAG-SL-NRV2X-BWP-COMMON-STOP
-- ASN1STOP
```

TABLE 7

SL-NRV2X-BWP-Common field descriptions pscch-ConfigCommon
Cell specific parameters for the PSCCH (physical sidelink control channel, e.g., scheduling assignment) of this sidelink NR-V2X BWP
psfcch-ConfigCommon
Cell specific parameters for the PSFCCH (physical sidelink feedback control channel, e.g., HARQ ACK/NACK) of this sidelink NR-V2X BWP
pssch-ConfigCommon
Cell specific parameters for the PSSCH (physical sidelink shared channel, e.g., discovery, data, CQI feedback) of this sidelink NR-V2X BWP SL-NRV2X-BWP-Dedicated: The IE SL-NRV2X-BWP-Dedicated may be used to configure the dedicated (UE specific) parameters of a sidelink NR-V2X BWP, e.g., dedicated for a groupcast or unicast.

TABLE 8

SL-NRV2X-BWP-Dedicated information element

```
-- ASN1START
-- TAG-SL-NRV2X-BWP-DEDICATED-START
SL-NRV2X-BWP-DEDICATED ::=           SEQUENCE {
pscch-Config          SetupRelease { PSCCH-ConfigCommon }         OPTIONAL,
-- Need M
psfcch-Config         SetupRelease { PSFCCH-ConfigCommon }        OPTIONAL,
-- Need M
pssch-Config          SetupRelease { PSSCH-ConfigCommon }         OPTIONAL,
-- Need M
sl-configuredGrantConfig    SetupRelease { SL-ConfiguredGrantConfig }   OPTIONAL,
-- Need M
sl-sps-Config         SetupRelease { SL-SPS-Config }              OPTIONAL,
-- Need M
sl-csi-rs-Config      SetupRelease { SL-CSI-RS-Config }           OPTIONAL,
-- Need M
sl-radioLinkMonitoringConfig    SetupRelease { SL-RadioLinkMonitoringConfig }
OPTIONAL,
```

TABLE 8-continued

SL-NRV2X-BWP-Dedicated information element

-- Need M
    ...
-- TAG-BWP-DOWNLINKDEDICATED-STOP
-- ASN1STOP

TABLE 9

SL-NRV2X BWP-Dedicated field descriptions pscch-Config
UE specific PSCCH configuration for one sidelink NR-V2X BWP
psfcch-Config
UE specific PSFCCH configuration for one sidelink NR-V2X BWP
pssch-Config
UE specific PSSCH configuration for one sidelink NR-V2X BWP
sl-configuredGrantConfig
A Configured-Grant of typ1-like or type2-like for sidelink NR-V2X.
sl-sps-Config
UE specific SPS (Semi-Persistent Scheduling) configuration for one sidelink NR-V2X BWP.
sl-rs-Config
UE specific SL-RS (sidelink reference signal, e.g., SL-CSI-RS as the sidelink channel state
information reference signal) configuration for one sidelink NR-V2X BWP.
sl-radioLinkMonitoringConfig
UE specific configuration of sidelink radio link monitoring for detecting AS (access stratum)
level radio link failure occasions.

SL-NRV2XCommResourcePool: The IE SL-NRV2XCommResourcePool configures the configuration information for an individual pool of resources for NR-V2X sidelink communication. The IE covers the configuration of both the sidelink control information and the data and the feedback if enabled. This pool may be shared by different UEs for different sidelink NR-V2X communication such as broadcast, groupcast and unicast, or for different NR-V2X services with different QoS requirements.

TABLE 10

SL-NRV2XCommResourcePool information element

```
-- ASN1START
-- TAG-SL-NRV2XCommResourcePool-START
SL-NRV2XCommTxPoolList ::=      SEQUENCE (SIZE (1..maxSL-NRV2X-TxPool)) OF
SL-NRV2XCommResourcePool
SL-NRV2XCommRxPoolList ::=      SEQUENCE (SIZE (1..maxSL-NRV2X-RxPool)) OF
SL-NRV2XCommResourcePool
SL-NRV2XCommResourcePool ::=    SEQUENCE {
   sl-nrv2xSubframe-slot              NRV2X-SubframeSlotBitmapSL,
   sl-nrv2xadjacencyPSCCH-PSSCH       BOOLEAN,
   sl-nrv2x sizeSubchannel            ENUMERATED {
                                      n4, n5, n6, n8, n9, n10, n12, n15, n16, n18, n20, n25,
n30,
                                      n48, n50, n72, n75, n96, n100, spare13, spare12,
spare11,
                                      spare10, spare9, spare8, spare7, spare6, spare5, spare4,
                                      spare3, spare2, spare1 },
   sl-nrv2xnumSubchannel              ENUMERATED {n1, n3, n5, n8, n10, n15, n20,
spare1},
   sl-nrv2xstartRB-Subchannel         INTEGER (0..99),
   sl-nrv2xstartRB-PSCCH-Pool         INTEGER (0..99)                 OPTIONAL,
   -- Need OR
   sl-nrv2xrxParametersNCell          SEQUENCE {
      sl-nrv2xtdd-Config              TDD-Config                      OPTIONAL,
   -- Need OP
      sl-nrv2xsyncConfigIndex         INTEGER (0..15)
   }                                                                  OPTIONAL,
   -- Need OR
   sl-nrv2xdataTxParameters           SL-NRV2X-TxParameters           OPTIONAL,
   -- Cond Tx
   sl-nrv2xzoneID                     INTEGER (0..7)                  OPTIONAL,
   -- Need OR
   sl-nrv2xthreshS-RSSI-CG            INTEGER (0..45)                 OPTIONAL,
   -- Need OR
   sl-nrv2xpoolReportId               SL-NRV2XSL-NRV2XSL-NRV2X-
TxPoolReportIdentity     OPTIONAL,
   -- Need OR
```

TABLE 10-continued

SL-NRV2XCommResourcePool information element

```
sl-nrv2xcg-pssch-TxConfigList         SL-CG-PSSCH-TxConfigList          OPTIONAL,
-- Need OR
...,
[[ sl-nrv2xMinWin ValueList           SL- NRV2X-MinWinValueList
OPTIONAL, -- Need OR
    Sl-nrv2xcg-pssch-TxConfigList     SL- NRV2X-CG-PSSCH-TxConfigList
OPTIONAL -- Need OR
]]
}
SL-NRV2X-TxPoolReportIdentity ::=     INTEGER (1..maxSL-PoolToMeasure)
SL- NRV2X-MinWinValueList ::= SEQUENCE (SIZE (1..maxSL-Prio)) OF SL- V2X-
MinWinValue
SL- NRV2X-MinWinValue ::=             SEQUENCE {
  sl-nrv2xpriority List           SL-NRV2XSL-NRV2XSL-NRV2X-PriorityList,
  sl-nrv2xmin WinValue            INTEGER (10..20)
}
-- TAG-SL-NRV2XCommResourcePool-STOP
-- ASN1STOP
```

TABLE 11

SL-NRV2XCommResourcePool field descriptions sl-nrv2xadjacencyPSCCH-PSSCH
Indicates whether a UE shall always transmit PSCCH and PSSCH in adjacent symbols
(indicated by TRUE) or in non-adjacent symbols (indicated by FALSE).
sl-nrv2x-cg-pssch-TxConfigList
Indicates the mapping for congestion measurement ranges by using indexes of the entry in
sl-nrv2xcg-RangeCommonConfigList, and PSSCH transmission parameters and CR limit
by using indexes of the entry in sl-CG-PSSCH-TxConfigList.
sl-nrv2xmin WinValue
Indicates the minimum value of sensing window, included in sl-nrv2xpriorityList.
sl-nrv2xnumSubchannel
Indicates the number of subchannels in the corresponding resource pool for sidelink NR
V2X resource allocation in frequency.
sl-nrv2xpoolReportId
The identity of the transmission resource pool used for channel congestion (CGCC)
measurement reporting, which is corresponding to the sl-nrv2xpoolIdentity reported in sl-
nrv2xmeasResultListCG.
sl-nrv2xrestrictResourceReservationPeriod
If configured, the field sl-nrv2xrestrictResourceReservationPeriod configured in sl-nrv2x-
ResourceSelectionConfig shall be ignored for transmission on this pool.
sl-nrv2xsizeSubchannel
Indicates the number of NR PRBs or NR PRGs of each subchannel in the corresponding
resource pool for sidelink NR-V2X.
sl-nrv2xmin WinValueList
Indicates a list of minimum value sets for the parameter Window which may be used for
UE autonomous resource selection with sensing this resource pool.
sl-nrv2xadjacencyPSCCH-PSSCH
Indicates whether a UE shall always transmit PSCCH and PSSCH in adjacent symbols
(indicated by TRUE) or in non-adjacent symbols (indicated by FALSE).
sl-Subframe or sl-nrv2xSlot
Indicates the bitmap of the resource pool in subframe or in slot, which is repeated within a
SFN cycle.
sl-nrv2xstartRB-PSCCH-Pool
Indicates the lowest RB index of the PSCCH pool if applicable. This field is absent when a
pool is (pre)configured such that a UE always transmits scheduling control information and
data in adjacent symbols in the same pool.
sl-nrv2xstartRB-Subchannel
Indicates the lowest RB index of the subchannel with the lowest index.
sl-nrv2xthreshS-RSSI-CG
Indicates the S-RSSI threshold for determining the contribution of a sub-channel to the CG
measurement.
sl-nrv2xzoneID
Indicates the zone ID for which the UE may use this resource pool for NR V2X if
applicable.

SL-NRV2XCommResourcePoolDedicate: The IE SL-NRV2XCommResourcePoolDedicate configures the configuration information for an individual pool of resources for NR-V2X sidelink communication. The IE covers the dedicated configuration of both the sidelink control information and the data and the feedback if enabled. This pool may be shared by different UEs for dedicated sidelink NR-V2X communication such as broadcast, groupcast, orunicast, or for different NR-V2X services with different QoS requirements such as priority, latency, reliability, or communication range or zone. The parameters are similar as shown in above exemplified Table 10 and Table 11.

SL-CommTxPoolSensingConfig: The IE SL-CommTx-PoolSensingConfig specifies sidelink NR-V2X communication configurations used for UE autonomous resource selection based on sensing, e.g., resource allocation mode 1 with configured grant type 1-like while sharing the resource pool with resource allocation mode 2, resource allocation mode 2, etc.

TABLE 12

SL-NRV2X-CommTxPoolSensingConfig information element

```
-- ASN1START
-- TAG-SL-NRV2X-CommTxPoolSensing-START
SL-NRV2X-CommTxPoolSensing ::=  SEQUENCE {
    sl-nrv2xpssch-TxConfigList        SL-NRV2X-PSSCH-TxConfigList,
    sl-nrv2xthresPSSCH-RSRP-List      SL-NRV2XThresPSSCH-RSRP-List,
}
-- TAG-SL-NRV2X-CommTxPoolSensing-STOP
-- ASN1STOP
```

TABLE 13

SL-CommTxPoolSensingConfig field descriptions sl-nrv2xpssch-TxConfigList
Indicates NR-V2X PSSCH TX parameters such as MCS, PRB number, retransmission number, associated to different UE absolute speeds and different synchronization reference types for UE autonomous resource selection.
sl-nrv2xthresPSSCH-RSRP-List
Indicates a list of thresholds, and the threshold should be selected based on the priority in the decoded SCI and the priority in the SCI to be transmitted.

SL-CommTxPoolSensingConfigDedicated: The IE SL-CommTxPoolSensingConfigDedicated specifies sidelink NR-V2X communication configurations used for UE autonomous resource selection, e.g., resource allocation mode 1 with configured grant type 1-like while sharing the resource pool with resource allocation mode 2, resource allocation mode 2, etc. dedicated for different NR-V2X communications, such as broadcast, groupcast or unicast or for different NR-V2X services with different QoS requirements.

SL-NRV2XControlResourceSet: The IE SL-NRV2XControlResourceSet may be used to configure a sidelink control resource set (SL-CORESET) for sidelinksl-nrv2x NR-V2X communications in which to search for sidelink control information, e.g., scheduling SCI. A UE may be configured with different SL-NRV2XControlResourceSet for different NR-V2X communications or for different NR-V2X services with different QoS requirements.

TABLE 14

NRV2X-ControlResourceSet information element

```
-- ASN1START
-- TAG- SL-NRV2X-CONTROLRESOURCESET-START
ControlResourceSet ::=           SEQUENCE {
    sl-nrv2xcontrolResourceSetId        SL-NRV2X-ControlResourceSetId,
    sl-nrv2xfrequency DomainResources   BIT STRING (SIZE (45)),
    sl-nrv2xduration                    INTEGER (1..maxCoReSetDuration),
    sl-nrv2xcce-REG-MappingType          CHOICE {
        sl-nrv2xinterleaved              SEQUENCE {
            sl-nrv2xreg-BundleSize           ENUMERATED {n2, n3, n6},
            sl-nrv2xinterleaverSize          ENUMERATED {n2, n3, n6},
            sl-nrv2xshiftIndex
INTEGER(0..maxNrofSLNRV2XPhysicalResourceBlocks-1) OPTIONAL -- Need S
        },
        sl-nrv2xnonInterleaved           NULL
    },
    sl-nrv2xprecoderGranularity          ENUMERATED {sameAsREG-bundle,
allContiguousRBs},
    sl-nrv2xtci-StatesPSCCH-ToAddList    SEQUENCE(SIZE (1..maxNrofSLNRV2XTCI-
StatesPSCCH)) OF SLNRV2XTCI-StateId     OPTIONAL, --
    ...
}
-- TAG-SL-NRV2X-CONTROLRESOURCESET-STOP
-- ASN1STOP
```

TABLE 15

ControlResourceSet field descriptions sl-nrv2xcce-REG-MappingType

Mapping of sidelink Control Channel Elements (CCE) to sidelink Resource Element Groups (REG).

sl-nrv2xcontrolResourceSetId

Value 0 identifies the common SL-CORESET configured in SL-MIB and in SL-ServingCellConfigCommon (SL-controlResourceSetZero). The sl-nrv2xcontrolResourceSetId is unique among the SL-NRV2X-BWPs of a ServingCell.

sl-nrv2xduration

Contiguous time duration of the SL-CORESET in number of symbols.

sl-nrv2xfrequencyDomain Resources

Frequency domain resources for the SL-CORESET.

sl-nrv2xinterleaverSize

Interleaver-size if applicable.

sl-nrv2xprecoderGranularity

Precoder granularity in frequency domain if applicable.

sl-nrv2xreg-BundleSize

Resource Element Groups (REGs) can be bundled to create SL-REG bundles.

sl-nrv2xshiftIndex

When the field is absent the UE applies the value of the physCellId configured for this serving cell.

sl-nrv2xtci-StatesPSCCH-ToAddList

A subset of the TCI states defined in pscch-Config. They are used for providing QCL relationships between the SL RS(s) in one RS Set (TCI-State) and the PSCCH DMRSports.

SL-NRV2X-ControlResourceSetId: The SL-NRV2X-ControlResourceSetId IE concerns a short identity, used to identify a sidelink NR-V2X control resource set within a serving cell. The SL-NRV2X-ControlResourceSetId=0 identifies the SL-NRV2XControlResourceSet#0 configured via PSBCH (SL-MIB) and in SLcontrolResourceSetZero (SLServingCellConfigCommon). The ID space may be used across the SL-NRV2X-BWP(s) of a Serving Cell. For a UE configured with different NR-V2X communications, different SL-NRV2X-ControlResourceSetId may be used, for example pointing to broadcast, groupcast and unicast monitoring occasions, or for different NR-V2X services with different QoS requirements.

TABLE 16

SL-NRV2X-ControlResourceSetId information element

```
-- ASN1START
-- TAG-SL-NRV2X-CONTROL-RESOURCE-SET-ID-START
sl-nrv2xControlResourceSetId ::=     INTEGER (0..maxNrofControlResourceSets-1)
-- TAG- SL-NRV2X-CONTROL-RESOURCE-SET-ID-STOP
-- ASN1STOP
```

SL-NRV2X-TxPoolIdentity: The IE SL-NRV2X-TxPoolIdentity identifies an individual pool entry configured for sidelink NR-V2X transmission, used for communication and discovery. For a UE configured with different pools for different communications such as broadcast, groupcast and unicast, or different NR-V2X services with different QoS requirements, multiple SL-NRV2X-TxPoolIdentity may be configured accordingly.

TABLE 17

SL-NRV2X-TxPoolIdentity information element

```
-- ASN1START
-- TAG- SL-NRV2X-TXPOOLIDENTITY-START
```

TABLE 17-continued

SL-NRV2X-TxPoolIdentity information element

```
Sl-nrv2xTxPoolIdentity ::=
sl-nrv2xTxPoolIdentity ::=    INTEGER (1..maxSL-NRV2X-TxPool)
-- TAG- SL-NRV2X-TXPOOLIDENTITY-STOP
-- ASN1STOP
```

SL-NRV2X-InterFreqInfoList: The IE SL-NRV2X-InterFreqInfoListV2X indicates synchronization and resource allocation configurations of the neighboring frequency for NR-V2X sidelink communication.

TABLE 18

SL-NRV2X-Inter FreqInfoList information element

```
-- ASN1START
SL-NRV2X-InterFreqInfoList :=       SEQUENCE (SIZE (0..maxFreqV2X-1)) OF SL-
NRV2X-InterFreqInfo
SL-NRV2X-InterFreqInfo ::=          SEQUENCE {
    plmn-Identity List                      PLMN-Identity List
    OPTIONAL,                   -- Need OP
    sl-nrv2x-CommCarrierFreq                ARFCN-ValueNR,
    sl-MaxTxPower                           P-Max
    OPTIONAL,                   -- Need OR
    sl-Bandwidth                ENUMERATED {n6, n15, n25, n50, n75, n100}
    OPTIONAL,       -- Need OR
    sl-nrv2x-SchedulingPool                 SL-NRV2X-CommResourcePool
            OPTIONAL,           -- Need OR
    sl-nrv2x-UE-ConfigList                  SL-NRV2X-UE-ConfigList OPTIONAL, --
Need OR
    ...,
    [[      additionalSpectrumEmissionV2X                   CHOICE {
                additionalSpectrumEmission
AdditionalSpectrumEmission,
                additionalSpectrumEmission              AdditionalSpectrumEmission-
v10l0
        }                       OPTIONAL             -- Need ON
    ]],
    [[      sl-nrv2x-FreqSelectionConfigList SL-NRV2X-FreqSelectionConfigList
    OPTIONAL        -- Need OR
    ]]
}
-- ASN1STOP
```

TABLE 19

SL-InterFreqInfoListV2X field descriptions plmn-Identity List
Indicates PLMN identities of this frequency for reception of NR-V2X sidelink communication. If this field is not present, the UE considers this frequency for reception of NR-V2X sidelink communication concerns the first PLMN entry in the plmn-IdentityList in SystemInformationBlock
sl-MaxTxPower
Indicates the maximum transmission power for transmitting NR-V2X sidelink communication on the corresponding frequency.
additionalSpectrumEmissionV2X
Indicates the additionalSpectrumEmission value.
sl-nrv2x-FreqSelectionConfigList
Indicates the configuration information for the carrier selection for NR-V2X sidelink communication transmission. The configuration applies to the carrier frequency identified by slnrv2x-CommCarrierFreq (e.g., carrier specific configuration).
sl-nrv2x-SchedulingPool
Indicates the resource pool for inter-carrier scheduled resource allocation. This field is configured in RRC dedicated signalling only when scheduled is configured in IE SL-NRV2X-ConfigDedicated.
sl-nrv2x-UE-ConfigList
Indicates the inter-carrier resource configuration. If there is only one entry in the list without physCellId configured, the configuration is applied to the frequency identified by sl-nrv2x-CommCarrierFreq (e.g., carrier specific configuration); if the entry of this field includes physCellIdList, the configuration is applied to the cell(s) identified by physCellIdList (e.g., cell specific configuration).

SL-NRV2X-CommConfigDedicated: The IE SL-NRV2X-CommConfig specifies the dedicated configuration information for sidelink NR-V2X communication. In particular, it includes the transmission resource configuration for NR-V2X sidelink communication on the primary frequency dedicated for different NR-V2X communications such ad broadcast, groupcast or unicast.

SL-NRV2X-Preconfiguration: The IE SL-NRV2XSL-NRV2XSL-NRV2X-Preconfiguration includes the pre-configured parameters used for NR-V2X sidelink communication.

TABLE 20

SL-NRV2X-Preconfiguration information elements

```
-- ASN1START
SL-NRV2X-Preconfiguration ::=       SEQUENCE {
    Sl-nrv2x-PreconfigFreqList              SL-NRV2X-PreconfigFreqList,
```

TABLE 20-continued

| SL-NRV2X-Preconfiguration information elements |

```
anchorCarrierFreqList            SL-AnchorCarrierFreqList-V2X
   OPTIONAL,
CG-PreconfigList                 SL-CG-PreconfigTxConfigList
   OPTIONAL,
...,
[[ v2x-PacketDuplicationConfig   SL-NRV2X-PacketDuplicationConfig
   OPTIONAL,
   syncFreqList                  SL-NRV2X-SyncFreqList         OPTIONAL,
   slss-TxMultiFreq              ENUMERATED {true}             OPTIONAL,
   sl-nrv2x-TxProfileList        SL-NRV2X-TxProfileList        OPTIONAL
]]
}
SL-CG-PreconfigTxConfigList ::=  SEQUENCE {
   CG-RangeCommonConfigList         SEQUENCE (SIZE (1..maxSL-NRV2X-
CGConfig2)) OF SL-CG-Levels-Config,
   sl-CG-PSSCH-TxConfigList         SEQUENCE (SIZE (1..maxSL-NRV2X-TxConfig2)) OF
SL-CG-PSSCH-TxConfig
}
SL-NRV2X-PreconfigFreqList ::=   SEQUENCE (SIZE (1..maxFreqV2X)) OF SL-NRV2X-
PreconfigFreqInfo
SL-NRV2X-PreconfigFreqInfo ::=      SEQUENCE {
   Sl-nrv2x-CommPreconfigGeneral    SL-PreconfigGeneral-r12,
   Sl-nrv2x-CommPreconfigSync       SL-PreconfigV2X-Sync          OPTIONAL,
   Sl-nrv2x-CommRxPoolList          SL-PreconfigV2X-RxPoolList,
   Sl-nrv2x-CommTxPoolList          SL-PreconfigV2X-TxPoolList,
   Sl-nrv2x-ResourceSelectionConfig SL-CommTxPoolSensingConfig
   OPTIONAL
   zoneConfig                    SL-ZoneConfig                 OPTIONAL,
   syncPriority                     ENUMERATED {gnss, enb},
   thresSL-TxPrioritization      SL-Priority-r13               OPTIONAL,
   offsetDFN                     INTEGER (0..1000)             OPTIONAL,
   ...,
   [[    sl-nrv2x-FreqSelectionConfigList SL-NRV2X-FreqSelectionConfigList
   OPTIONAL
   ]]
}
SL-PreconfigV2X-RxPoolList ::=   SEQUENCE (SIZE (1..maxSL-NRV2X-
RxPoolPreconf)) OF SL-NRV2X-PreconfigCommPool
SL-PreconfigV2X-TxPoolList ::=   SEQUENCE (SIZE (1..maxSL-NRV2X-
TxPoolPreconf)) OF SL-NRV2X-PreconfigCommPool
SL-NRV2X-PreconfigCommPool ::=   SEQUENCE {
-- This IE is same as SL-CommResourcePoolV2X with rxParametersNCell absent
   sl-nrv2x-OffsetIndicator      SL-OffsetIndicator-r12
   OPTIONAL,
   sl-nrv2xSubframe/slot         SubframeBitmapSL (or SlotBitmap),
   adjacency PSCCH-PSSCH            BOOLEAN,
   sizeSubchannel E                 NUMERATED {
                                    n4, n5, n6, n8, n9, n10, n12, n15, n16,
n18, n20, n25, n30,
                                    n48, n50, n72, n75, n96, n100, spare13,
spare12, spare11, spare10, spare9, spare8, spare7, spare6, spare5, spare4, spare3, spare2,
spare1},
   numSubchannel                    ENUMERATED {n1, n3, n5, n8, n10,
n15, n20, spare1 },
   startRB-Subchannel               INTEGER (0..99),
   startRB-PSCCH-Pool               INTEGER (0..99)               OPTIONAL,
   dataTxParameters                 P0-SL-r12,
   zoneID                           INTEGER (0..7)                OPTIONAL,
   threshS-RSSI-CG                  INTEGER (0..45)               OPTIONAL,
   CG-pssch-TxConfigList         SL-CG-PC5QoS-TxPreconfigList
   OPTIONAL,
   resourceSelectionConfigP2X    SL-P2X-ResourceSelectionConfig
   OPTIONAL,
   syncAllowed                   SL-SyncAllowed                OPTIONAL,
   restrictResourceReservationPeriod   SL-RestrictResourceReservationPeriodList
   OPTIONAL,
   ...,
   [[    sl-MinT2ValueList       SL-MinT2ValueList             OPTIONAL,
         CG-pssch-TxConfigList-v1530   SL-CG-PC5QoS-TxPreconfigList-v1530
   OPTIONAL
   ]]
}
}
SL-PreconfigV2X-Sync ::=         SEQUENCE {
   syncOffsetIndicators          SL-NRV2X-SyncOffsetIndicators,
   syncTxParameters              P0-SL-r12,
   syncTxThreshOoC               RSRP-RangeSL3-r12,
   filterCoefficient             FilterCoefficient,
```

TABLE 20-continued

| SL-NRV2X-Preconfiguration information elements | |
|---|---|
| syncRefMinHyst | ENUMERATED {dB0, dB3, dB6, dB9, dB12}, |
| syncRefDiffHyst | ENUMERATED {dB0, dB3, dB6, dB9, dB12, dBinf}, |
| ..., | |
| [[   slss-TxDisabled | ENUMERATED {true}           OPTIONAL |
| ]] | |
| } | |
| SL-NRV2X-SyncOffsetIndicators ::= | SEQUENCE { |
| syncOffsetIndicator1 | SL-OffsetIndicatorSync, |
| syncOffsetIndicator2 | SL-OffsetIndicatorSync, |
| syncOffsetIndicator3 | SL-OffsetIndicatorSync           OPTIONAL |
| } | |
| SL-CG-PC5QoS-TxPreconfigList ::= | SEQUENCE (SIZE (1..8)) OF SL-PC5QoS-TxPreconfigIndex |
| SL-PC5QOS-TxPreconfigIndex ::= | SEQUENCE { |
| priority Threshold | SL-Priority-r13, |
| defaultTxConfigIndex | INTEGER(0..maxCG-Level-1), |
| CG-ConfigIndex | INTEGER(0..maxSL-NRV2X-CGConfig2-1), |
| tx-ConfigIndexList | SEQUENCE (SIZE (1..maxCG-Level)) OF Tx-PreconfigIndex |
| } | |
| Tx-PreconfigIndex ::= | INTEGER(0..maxSL-NRV2X-TxConfig2-1) |
| SL-CG-PC5QoS-TxPreconfigList-v1530 ::= | SEQUENCE (SIZE (1..8)) OF SL-PC5QoS-TxPreconfigIndex-v1530 |
| SL-PC5QoS-TxPreconfigIndex-v1530 ::= | SEQUENCE { |
| mcs-PSSCH-Range | SEQUENCE (SIZE (1..maxCG-Level)) OF MCS-PSSCH-Range   OPTIONAL |
| } | |
| SL-NRV2X-TxProfileList ::= | SEQUENCE (SIZE (1..256)) OF SL-NRV2X-TxProfile |
| SL-NRV2X-TxProfile ::= | ENUMERATED { |
|  | rel14, rel15, spare6, spare5, spare4, |
|  | spare3, spare2, sparel, ... } |
| END | |
| -- ASN1STOP | |

Control Signal for Broadcast, Groupcast and Unicast

Control Signal for Broadcast, Groupcast, or Unicast: Different formats of SCI are disclosed for different sidelink communications are exemplified below.

There are several ways to design the SCI with the trade-off between the useful bits (size) and blind decoding overhead.

One approach is packing different formatted SCI into one size, e.g., SCI Format 1 for broadcast, SCI Format 2A for groupcast and SCI Format 2B into one size and use 2-bit Format field to indicate the format.

Another approach is packing different format SCI with similar sizes into one size, e.g., SCI Format 1 for broadcast as a short SCI, and SCI Format 2A for groupcast and 2B for unicast as a long SCI.

NR-V2X SCI Format 1 may be used for the scheduling of broadcast PSSCH. The following information may be transmitted by means of the SCI format 1:

Format—1 or 2 bits. 1 bit for broadcast or not; 2 bits for broadcast, groupcast, or unicast respectively Priority/Preemption—3 bits, "111" or "000" for preemption indication" where the preserved resources are pre-empted by a higher priority transmission. Transmitting UE pre-empted needs to reserve the resource for the transmission and may also indicates this to the receiver UE.

Another example is using a dedicated 1-bit pre-emption indication independent of the priority bit values.

Resource reservation—4 bits

Time resource location of initial transmission and retransmission—8~10 bits.

Frequency resource location of initial transmission and retransmission—$\lceil \log_2(N_{subchannel}^{SL}(N_{subchannel}^{SL}+1)/2) \rceil$ bits.

Frequency hopping—1 bit

Time gap between initial transmission and retransmission—4 bits.

Number of retransmission—2~3 bits

Retransmission index—2~3 bit.

Modulation and coding scheme—5 bits.

Transmission format—1 bit, where value 1 indicates a transmission format including rate-matching and TBS scaling, and value 0 indicates a transmission format including puncturing and no TBS-scaling.

Padding bits are added until the size of SCI format 1 is equal to X bits for format 1. The padding bits are set to zero.

NR-V2X SCI Format 2 may be used for the scheduling of groupcast (e.g., Format A) or unicast (e.g., Format B)PSSCH, e.g., same size but different fields. The following information may be transmitted by means of the SCI format 2:

Format—1 or 2 bits. 1 bit for broadcast or not; 2 bits for broadcast, groupcast, and unicast respectively Sidelink Bandwidth part indicator—2 bits. This may be used for dedicated SL BWP for different sidelink communications such as groupcast or unicast.

Priority/Pre-emption—3 bits, "111" or "000" for preemption indication". Another example is using a dedicated 1-bit pre-emption indication independent of the priority bit values.

Source ID/Transmitter ID/Pair ID—6~8 bits, Source ID is group ID for groupcast, Pair ID is for unicast.

Destination ID/Receiver ID—6~8 bits, for groupcast and unicast.

Resource reservation—4 bits

Time resource location of initial transmission and retransmission—8~10 bits.

Frequency resource location of initial transmission and retransmission—$\lceil \log_2(N_{subchannel}^{SL}(N_{subchannel}^{SL}+1)/2) \rceil$ bits.

Frequency hopping—1 bit
Time resource location of feedback—8~10 bits.
Frequency resource location of feedback—8~10 bits
Time gap between initial transmission and retransmission—4 bits.
Number of retransmission—2~3 bits
Retransmission index—2~3 bit.
Modulation and coding scheme—5 bits.
HARQ enable—1 bits, enable HARQ feedback or not
HARQ process/Number of retransmission—2~3 bits, HARQ process number if HARQ is enabled.
Redundancy version (RV)/Retransmission index—2~3 bits, RV if HARQ is enabled.
HARQ ID/HARQ resource index—4~6 bits, if HARQ is enabled.
New data indicator (NDI)—1 bit, if HARQ is enabled
Transmission format—1 bit, where value 1 indicates a transmission format including rate-matching and TBS scaling, and value 0 indicates a transmission format including puncturing and no TBS-scaling.
DMRS (port and initialization)—8~12 bit.
SL-RS resource indicator—2 bit, e.g. for SL-CSI-RS.
TCI state—4~8 bit
Padding bits are added until the size of SCI format 2 is equal to Y bits for format 2. The padding bits are set to zero.

Procedures for Broadcast, Groupcast, or Unicast: Apparatus procedures are disclosed in detail below for sidelink broadcast, groupcast, or unicast.

Resource pool or resource configurations may be broadcasted by System Information (SI) to UEs at RRC-Idle, RRC-Inactive, or RRC-CONNECTED state. For example, NRSystemInformationBlockTypeX1, NRSystemInformationBlockTypeX2, or NRSystemInformationBlockTypeX3 from a gNB via Uu interface are used for exemplifying the procedure. But SL-NRV2X-SystemInformationBlockTypeY1, SL-NRV2X-SystemInformationBlockTypeY2, etc., from the Synchronization source UE, an RSU UE, a Scheduling UE, a group lead, or a proximity lead via PC5 interface may also be applied for resource allocation schemes not managed by a gNB. To simplify the illustration purpose, the signalling over Uu interface is mostly used in the examples, but the mechanisms are also applicable to the signalling over PC5 interface without repeating them herein.

NRSystemInformationBlockTypeX1 or SL-NRV2X-SystemInformationBlockTypeY1 may include resource configurations with s1-NRV2X-ConfigCommon, which includes s1-nrv2x-CommRxPool, s1-nrv2x-CommTxPoolNormalCommon, s1-nrv2x-CommTxPoolNormal, s1-nrv2x-CommTxPoolNormalDedicated, or s1-nrv2x-CommTxPoolFallback.

NRSystemInformationBlockTypeX2 or SL-NRV2X-SystemInformationBlockTypeY2 may include resource configurations with, and NRSystemInformationBlockTypeX3 or SL-NRV2X-SystemInformationBlockTypeY3 may include resource configurations with s1-nrv2x-CommTxPoolNormal, s1-nrv2x-CommTxPoolNormalDedicated, or s1-nrv2x-CommTxPoolFallback.

NRSystemInformationBlockTypeX3 or SL-NRV2X-SystemInformationBlockTypeY3 may include resource configurations with s1-nrv2x-CommTxPoolNormalDedicated or s1-nrv2x-CommTxPoolFallback.

Resource pool or resource configurations may also be indicated to a UE by dedicated RRC message while the UE is at RRC-CONNECTED state. For example, RRCConnectionReconfiguration (on Uu) may be used for exemplifying the procedure. However, SL-RRCConnectionReconfiguration (on PC5) may also be applied for the case where a scheduling UE or a lead or an RSU manages the resource pools or resource selections via PC5 RRC signalling.

Sensing used below includes both sensing based on decoding the SCI and sensing based on measurement, such as SL-RSRP, SL-RSSI, or LBT (listen-before-talk), e.g., energy based or Reference Signal Received Power (RSRP) based.

A NR-V2X transmission described below may be a broadcast, a groupcast, or a unicast using shared resource pool(s) or dedicated resource pool(s), therefore the resource pool indicated by s1-nrv2x-CommTxPoolNormalCommon or s1-nrv2x-CommTxPoolNormal may be shared or resource pool(s) for broadcast, groupcast, and unicast within a sidelink bandwidth part, e.g., common SL-BWP for at least scheduling SCIs or broadcast, dedicated SL-BWP for groupcast or unicast data transmissions if configured.

Initiation of Sidelink NR-V2X Communication

A UE capable of sidelink NR-V2X communication in RRC-CONNECTED mode with a gNB if under the network coverage or connected or associated to a group lead, a proximity lead such as Road Side Unit (RSU), or a scheduling UE, which is capable to configure and manage a UE's resource allocation on sidelink NR-V2X with or without network coverage, may initiate the procedure to indicate that it is interested in NR-V2X sidelink communication (e.g., discovery, transmitting or receiving initially) in several cases including upon successful connection establishment, upon change of interest, upon change to a PCell broadcasting NRSystemInformationBlockTypeX1 or NRSystemInformationBlockTypeX2 or NRSystemInformationBlockTypeX3 from the gNB, or SL-NRSystemInformationBlockTypeY1 or SL-NRSystemInformationBlockTypeY2 or SL-NRSystemInformationBlockTypeY3 from the group lead, proximity lead, or scheduling UE, including s1-NRV2X-ConfigCommon, s1-nrv2x-CommTxPoolNormalCommon, s1-nrv2x-CommTxPoolNormal, s1-nrv2x-CommTxPoolNormalDedicated, or s1-nrv2x-CommTxPoolNormalFallback.

A UE capable of NR-V2X sidelink discovery may initiate the procedure to request assignment of dedicated resources for discovery announcements or NR-V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

Upon initiating the sidelink NR-V2X procedure, the UE may proceed as follows:
1> if NRSystemInformationBlockTypeX1 including s1-NRV2X-ConfigCommon is broadcast by the PCell:
2> ensure having a valid version of NRSystemInformationBlockTypeX1 and NRSystemInformationBlockTypeX2, if broadcast, for the PCell;
2> if configured by upper layers to receivesl-nrv2x sidelink communication on a primary frequency or on one or more frequencies included insl-nrv2x-InterFreqInfoList, if included in NRSystemInformationBlockTypeX1 or NRSystemInformationBlockTypeX2 of the PCell:
3> if the UE did not transmit a Sidelink-NRV2X-UEInformation message since last entering RRC-CONNECTEDstate; or 3> if since the last time the UE transmitted a Sidelink-NRV2X-UEInformation message the UE connected to a PCell not broadcasting NRSystemInformationBlockTypeX1 including s1-NRV2X-ConfigCommon; or 3> if the last transmission of the Sidelink-NRV2X-UEInformation message did not includesl-nrv2x-CommRxInterestedFreqList; or if the frequency (ies) configured by upper layers to receivesl-nrv2x sidelink communication on has changed since the last transmission of the Sidelink-NRV2X-UEInformation message:

4> initiate transmission of the Sidelink-NRV2X-UEInformation message to indicate the s1-nrv2x sidelink communication reception frequency(ies) of interest;

2> else:

3> if the last transmission of the Sidelink-NRV2X-UEInformation message included s1-nrv2x-CommRxInterestedFreqList:

4> initiate transmission of the Sidelink-NRV2X-UEInformation message to indicate it is no longer interested in s1-nrv2x sidelink communication reception;

2> if configured by upper layers to transmitsl-nrv2x sidelink communication on a primary frequency or on one or more frequencies included in s1-nrv2x-InterFreqInfoList, if included in NRSystemInformationBlockTypeX1 or NRSystemInformationBlockTypeX2 of the PCell:

3> if the UE did not transmit a Sidelink-NRV2X-UEInformation message since last entering RRC-CONNECTEDstate; or 3> if since the last time the UE transmitted a Sidelink-NRV2X-UEInformation message the UE connected to a PCell not broadcasting NRSystemInformationBlockTypeX1 including s1-NRV2X-ConfigCommon; or 3> if the last transmission of the Sidelink-NRV2X-UEInformation message did not includesl-nrv2x-CommTxResourceReq; or if the information carried by thesl-nrv2x-CommTxResourceReq has changed since the last transmission of the Sidelink-NRV2X-UEInformation message:

4> initiate transmission of the Sidelink-NRV2X-UEInformation message to indicate the s1-nrv2x sidelink communication transmission resources required by the UE;

2> else:

3> if the last transmission of the Sidelink-NRV2X-UEInformation message included s1-nrv2x-CommTxResourceReq:

4> initiate transmission of the Sidelink-NRV2X-UEInformation message to indicate it no longer requiressl-nrv2x sidelink communication transmission resources;

The above procedure may also apply to initiation sidelink communication with SL-NRSystemInformationBlockTypeY1, SL-NRSystemInformationBlockTypeY2, and SL-NRSystemInformationBlockTypeY3 over PC5 interface.

Resource Configuration Acquisition via NR System Information

1> if the UE is capable of NR-V2X sidelink communication and is configured by upper layers to receive NR-V2X sidelink communication on a frequency, which is not primary frequency:

2> if neither NRSystemInformationBlockX1 nor NRSystemInformationBlockX2 nor NRSystemInformationBlockX3 . . . of the serving cell/PCell provide reception resource pool for NR-V2X sidelink communication for the concerned frequency; and 2> if the cell used for NR-V2X sidelink communication on the concerned frequency meets the Syncronization Source criteria 3> if NRV2XschedulingInfoList on the concerned frequency indicates that SystemInformationBlockTypeX1 is present and the UE does not have stored a valid version of this system information block:

4> acquire NRSystemInformationBlockTypeX1 from the concerned frequency;

3> if NRV2XschedulingInfoList on the concerned frequency indicates that SystemInformationBlockTypeX2 is present and the UE does not have stored a valid version of this system information block:

4> acquire NRSystemInformationBlockTypeX2 from the concerned frequency;

3> if NRV2XschedulingInfoList on the concerned frequency indicates that SystemInformationBlockTypeX3 is present and the UE does not have stored a valid version of this system information block:

4> acquire NRSystemInformationBlockTypeX3 from the concerned frequency;

3> if NRV2XschedulingInfoList

1> if the UE is capable of V2X sidelink communication and is configured by upper layers to transmit NR-V2X sidelink communication on a frequency, which is not primary frequency and is not included in nrv2x-InterFreqInfoList in NRSystemInformationBlockTypeX1 nor NRSystemInformationBlockTypeX2 nor NRSystemInformationBlockTypeX3 of the serving cell/PCell:

2> if the cell used for NR-V2X sidelink communication on the concerned frequency meets the Syncronization Source criteria:

3> if NRV2XschedulingInfoList on the concerned frequency indicates that NRSystemInformationBlockTypeX1 is present and the UE does not have stored a valid version of this system information block:

4> acquire NRSystemInformationBlockTypeX1 from the concerned frequency;

3> if NRV2XschedulingInfoList on the concerned frequency indicates that NRSystemInformationBlockTypeX2 is present and the UE does not have stored a valid version of this system information block:

4> acquire NRSystemInformationBlockTypeX2 from the concerned frequency;

3> if NRV2XschedulingInfoList

Above procedure may also apply to acquiring system information with SL-NRSystemInformationBlockTypeY1, SL-NRSystemInformationBlockTypeY2, and SL-NRSystemInformationBlockTypeY3 over PC5 interface.

Upon receiving NRSystemInformationBlockTypeX1, the UE may proceed as follows:
1> if NRSystemInformationBlockTypeX1 message includes s1-NRV2X-ConfigCommon:
  2> if configured to receive NR-V2X sidelink communication:
    3> use the resource pool indicated by s1-nrv2x-CommRxPool in s1-NRV2X-ConfigCommon for NR-V2X sidelink communication monitoring;
  2> if configured to transmit NR-V2X sidelink communication:
    3> use the resource pool indicated by s1-nrv2x-CommTxPoolNormalCommon, s1-nrv2x-CommTxPoolNormal, or by s1-nrv2x-CommTxPoolFallback for NR-V2X sidelink communication transmission;
    3> perform channel congestion measurement on the transmission resource pool(s) indicated by s1-nrv2x-CommTxPoolNormalCommon, s1-nrv2x-CommTxPoolNormal and s1-nrv2x-CommTxPoolFallback for NR-V2X sidelink communication transmission;

Upon receiving NRSystemInformationBlockTypeX2, the UE may proceed as follows:
1> if configured to receive NR-V2X sidelink communication:
  2> use the resource pool indicated by s1-nrv2x-CommRxPool for NR-V2X sidelink communication monitoring;
1> if configured to transmit NR-V2X sidelink communication:
  2> use the resource pool indicated by s1-nrv2x-CommTxPoolNormal, or bysl-nrv2x-CommTxPoolFallback forsl-nrv2x sidelink communication transmission;
  2> perform channel congestion measurement on the transmission resource pool(s) indicated by s1-nrv2x-CommTxPoolNormal and s1-nrv2x-CommTxPoolFallback for NR-V2X sidelink communication transmission;

Above procedure may also apply to receiving system information with SL-NRSystemInformationBlockTypeY1, SL-NRSystemInformationBlockTypeY2, and SL-NRSystemInformationBlockTypeY3 over PC5 interface.

Resource Configuration via RRC or SL-RRC Message
The UE may proceed as follows:
1> if the RRCConnectionReconfiguration or SL-RRCConnectionReconfiguration message includes the s1-NRV2X-ConfigDedicated:
  2> if s1-nrv2xcommTxResources is included and set to setup:
    3> use the resources indicated by s1-nrv2xcommTxResources for NR-V2X sidelink communication transmission;
    3> perform channel congestion measurement on the transmission resource pool indicated in s1-nrv2xcommTxResources for NR-V2X sidelink communication transmission;
  2> else if s1-nrv2xcommTxResources is included and set to release:
    3> release the resources allocated for NR-V2X sidelink communication transmission previously configured by s1-nrv2xcommTxResources;
  2> if s1-nrv2x-InterFreqInfoList is included:
    3> use the synchronization configuration and resource configuration parameters for NR-V2X sidelink communication on frequencies included in s1-nrv2x-InterFreqInfoList;
    3> perform channel congestion measurement on the transmission resource pool indicated in s1-nrv2x-InterFreqInfoList for NR-V2X sidelink communication transmission;
1> if the RRCConnectionReconfiguration or SL-RRCConnectionReconfiguration message includes the s1-nrv2xmobilityControlInfo:
  2> if s1-nrv2x-CommRxPool is included:
    3> use the resources indicated by s1-nrv2x-CommRxPool for NR-V2X sidelink communication reception;
  2> ifsl-nrv2x-CommTxPoolFallback is included:
    3> use the resources indicated by s1-nrv2x-CommTxPoolFallback for NR-V2X sidelink communication transmission;
    3> perform channel congestion measurement on the transmission resource pool indicated by s1-nrv2x-CommTxPoolFallback for NR-V2X sidelink communication transmission;

UE Assistance Info
The UE may set the contents of the s1-nrv2xUEAssistanceInformation message (e.g., RRC or SL-RRC message) for UE assistance information:
1> if configured to provide UE assistance information:
  2> if there is any traffic for NR-V2X sidelink communication which needs to report UE assistance information:
    3> include s1-nrv2xtrafficPatternInfoList, s1-nrv2xtrafficLocation, s1-nrv2xTxRxDIstance, or s1-nrv2xtrafficSpeed, etc., in the UEAssistanceInformation message;

NR-V2X Sidelink Communication Monitoring
A UE capable of NR-V2X sidelink communication that is configured by upper layers to receive NR-V2X sidelink communication shall:
1> if the conditions for sidelink operation are met:
  2> if in coverage on the frequency used for NR-V2X sidelink communication:
    3> if the frequency used to receive NR-V2X sidelink communication is included in s1-nrv2x-InterFreqInfoList within RRCConnectionReconfiguration or SL-RRCConnectionReconfiguration in s1-nrv2x-InterFreqInfoList within NRSystemInformationBlockTypeX1 or NRSystemInformationBlockTypeX2 or NRSystemInformationBlockTypeX3 of the serving cell/Pcell, and s1-nrv2x-CommRxPool is included in SL-NRV2X-InterFreqUE-Config within s1-nrv2x-UE-ConfigList in the entry of s1-nrv2x-InterFreqInfoList for the concerned frequency:
      4> configure lower layers to monitor sidelink control information and the corresponding data using the pool of resources indicated in s1-nrv2x-CommRxPool;
    3> else:
      4> if the cell chosen for NR-V2X sidelink communication reception broadcasts NRSystemInformationBlockTypeX1 including s1-nrv2x-CommRxPool in s1-nrv2x-ConfigCommon or,
      4> if the UE is configured with s1-nrv2x-CommRxPool included in s1-nrv2xmobilityControlInfo in RRCConnectionReconfiguration or SL-RRCConnectionReconfiguration:

5> configure lower layers to monitor sidelink control information and the corresponding data using the pool of resources indicated in s1-nrv2x-CommRxPool;
2> else (e.g., out of coverage on the frequency used for NR-V2X sidelink communication):
3> if the frequency used to receive NR-V2X sidelink communication is included in s1-nrv2x-InterFreqInfoList within RRCConnectionReconfiguration or SL-RRCConnectionReconfiguration or in s1-nrv2x-InterFreqInfoList within NRSystemInformationBlockTypeX1 or NRSystemInformationBlockTypeX2 or NRSystemInformationBlockTypeX3 of the serving cell/PCell, and s1-nrv2x-CommRxPool is included in SL-NRV2X-InterFreqUE-Config within s1-nrv2x-UE-ConfigList in the entry of s1-nrv2x-InterFreqInfoList for the concerned frequency:
4> configure lower layers to monitor sidelink control information and the corresponding data using the pool of resources indicated in s1-nrv2x-CommRxPool;
3> else:
4> configure lower layers to monitor sidelink control information and the corresponding data using the pool of resources that were preconfigured (e.g., s1-nrv2x-CommRxPoolList in SL-NRV2X-Preconfiguration);
Above procedure may also apply to receiving monitoring with SL-NRSystemInformationBlockTypeY1, SL-NRSystemInformationBlockTypeY2, and SL-NRSystemInformationBlockTypeY3 over PC5 interface.

Transmission of NR-V2X Sidelink Communication

A UE capable of NR-V2X sidelink communication that is configured by upper layers to transmit NR-V2X sidelink communication and has related data to be transmitted shall:
1> if the conditions for sidelink operation are met:
2> if in coverage on the frequency used for NR-V2X sidelink communication; or
2> if the frequency used to transmit NR-V2X sidelink communication is included in sl-nrv2x-InterFreqInfoList in RRCConnectionReconfiguration or SL-RRCConnectionReconfiguration or in sl-nrv2x-InterFreqInfoList within NRSystemInformationBlockTypeX1 or NRSystemInformationBlockTypeX2 or NRSystemInformationBlockTypeX3:
3> if the UE is in RRC-CONNECTED and uses the PCell or the frequency included in sl-nrv2x-InterFreqInfoList in RRCConnectionReconfiguration for NR-V2X sidelink communication:
4> if the UE is configured, by the current PCell with sl-nrv2xcommTxResources set to scheduled:
5> if T310 or T311 is running; and if the PCell at which the UE detected physical layer problems or radio link failure broadcasts NRSystemInformationBlockTypeX1 including sl-nrv2x-CommTxPoolFallback in SL-NRV2X-ConfigCommon, or sl-nrv2x-CommTxPoolFallback is included in sl-nrv2x-InterFreqInfoList for the concerned frequency in NRSystemInformationBlockTypeX1 or NRSystemInformationBlockTypeX2 or NRSystemInformationBlockTypeX3 or RRCConnectionReconfiguration: or
5> if T301 is running and the cell on which the UE initiated connection re-establishment broadcasts NRSystemInformationBlockTypeX1 including sl-nrv2x-CommTxPoolFallback in SL-NRV2X-ConfigCommon, or sl-nrv2x-CommTxPoolFallback is included in sl-nrv2x-InterFreqInfoList for the concerned frequency in NRSystemInformationBlockTypeX1 or NRSystemInformationBlockTypeX2 or NRSystemInformationBlockTypeX3 or RRCConnectionReconfiguration: or
5> if T304 is running and the UE is configured with sl-nrv2x-CommTxPoolFallback1 included in sl-nrv2xmobility ControlInfo in RRCConnectionReconfiguration or in sl-nrv2x-InterFreqInfoList for the concerned frequency in RRCConnectionReconfiguration:
6> configure lower layers to transmit the sidelink control information and the corresponding data based on random selection using the pool of resources indicated by sl-nrv2x-CommTxPoolFallback:
5> else:
6> configure lower layers to request gNB to assign transmission resources for NR-V2X sidelink communication:
4> else if the UE is configured with sl-nrv2x-CommTxPoolNormalDedicated or sl-nrv2x-CommTxPoolNormal in the entry of sl-nrv2x-InterFreqInfoList for the concerned frequency in SL-NR-V2X-ConfigDedicated in RRCConnectionReconfiguration:
5> if the UE is configured to transmit NR-V2X sidelink communication and a result of sensing on the resources configured in sl-nrv2x-CommTxPoolNormalDedicated or sl-nrv2x-CommTxPoolNormal in the entry of sl-nrv2x-InterFreqInfoList for the concerned frequency in RRCConnectionReconfiguration is not available: or
6> if sl-nrv2x-CommTxPoolFallback is included in sl-nrv2xmobility ControlInfo in RRCConnectionReconfiguration (e.g., handover case); or
6> if sl-nrv2x-CommTxPoolFallback is included in the entry of sl-nrv2x-InterFreqInfoList for the concerned frequency in RRCConnectionReconfiguration: or
6> if the PCell broadcasts NRSystemInformationBlockTypeX1 including sl-nrv2x-CommTxPoolFallback in SL-NRV2X-ConfigCommon or sl-nrv2x-CommTxPoolFallback insl-nrv2xsl-nrv2x-InterFreqInfoList for the concerned frequency or broadcasts NRSystemInformationBlockTypeX2 including sl-nrv2x-CommTxPoolFallback in sl-nrv2x-InterFreqInfoList or broadcasts NRSystemInformationBlockTypeX3 including sl-nrv2x-CommTxPoolFallback in sl-nrv2x-InterFreqInfoList for the concerned frequency:
7> configure lower layers to transmit the sidelink control information and the corresponding data based on random selection using the pool of resources indicated by sl-nrv2x-CommTxPoolFallback:

3> else://not RRC_CONNECTED
    4> if the cell chosen for NR-V2X sidelink communication transmission broadcasts NRSystemInformationBlockTypeX1 or NRSystemInformationBlockTypeX2 or NRSystemInformationBlockTypeX3:
        5> if the UE is configured to transmit NR-V2X sidelink communication, and if NRSystemInformationBlockTypeX1 includes sl-nrv2x-CommTxPoolNormal Common or sl-nrv2x-CommTxPoolNormal in sl-nrv2x-InterFreqInfoList for the concerned frequency, or NRSystemInformationBlockTypeX2 includes sl-nrv2x-CommTxPoolNormal in sl-nrv2x-InterFreqInfoList for the concerned frequency or NRSystemInformationBlockTypeX3 includes sl-nrv2x-CommTxPoolNormalDedicated in sl-nrv2x-InterFreqInfoList for the concerned frequency, and if a result of sensing on the resources configured in sl-nrv2x-CommTxPoolNormalCommon or sl-nrv2x-CommTxPoolNormal or sl-nrv2x-CommTxPoolNormalDedicated in sl-nrv2x-InterFreqInfoList for the concerned frequency is available:
            6> configure lower layers to transmit the sidelink control information and the corresponding data based on sensing using one of the resource pools indicated by s1-nrv2x-CommTxPoolNormalCommon or sl-nrv2x-CommTxPoolNormal in sl-nrv2x-InterFreqInfoList for the concerned frequency selected:
        5> else if NRSystemInformationBlockTypeX1 includes sl-nrv2x-CommTxPoolFallback in SL-NRV2X-ConfigCommon or sl-nrv2x-CommTxPoolFallback in sl-nrv2x-InterFreqInfoList for the concerned frequency, or NRSystemInformationBlockTypeX2 includes sl-ncv2x-CommTxPoolFallback in sl-nrv2x-InterFreqInfoList, or NRSystemInformationBlockTypeX2 includes sl-ncv2x-CommTxPoolFallback in sl-nrv2x-InterFreqInfoList for the concerned frequency:
            6> from the moment the UE initiates connection establishment until receiving an RRCConnectionReconfiguration including SL-NRV2XSL-NRV2XSL-NRV2X-ConfigDedicated, or until receiving an RRCConnectionRelease or an RRCConnectionReject: or
            6> if the UE is in RRC_IDLE and a result of sensing on the resources configured in sl-nrv2x-CommTxPoolNormalCommon or sl-nrv2x-CommTxPoolNormal in sl-nrv2x-InterFreqInfoList for the concerned frequency in NRSysteminformationblocktypeX1 or sl-nrv2x-CommTxPoolNormal in sl-nrv2x-InterFreqInfoList for the concerned frequency in NRSysteminformationblocktypeX2 or sl-nrv2x-CommTxPoolNormalDedicated in sl-nrv2x-InterFreqInfoList for the concerned frequency in NRSysteminformationblocktypeX3 is not available:
2> else://out of coverage-Mode 2
    3> configure lower layers to transmit the sidelink control information and the corresponding data based on sensing using one of the resource pools indicated by s1-nrv2x-CommTxPoolList in SL-NRV2XSL-NRV2XSL-NRV2X-Preconfiguration in case of NR-V2X sidelink communication:

Above procedure may also apply to sidelink communication procedure with SL-NRSystemInformationBlockTypeY1, SL-NRSystemInformationBlockTypeY2, SL-NRSystemInformationBlockTypeY3, or SL-RRCConnectionReconfiguration over PC5 interface.

NR-V2X Sidelink Communication Transmission Pool Selection: For a frequency used for V2X sidelink communication, if zoneConfig or priorityConfig is not ignored (e.g., zone based or priority based resource pool selection is enabled), the UE configured by upper layers for NR-V2X sidelink communication may only use the pool which corresponds to geographical coordinates of the UE or corresponds to NR V2X service priority, if zoneConfig or priorityConfig is included in NRSystemInformationBlockTypeX1 or NRSystemInformationBlockTypeX2 or NRSystemInformationBlockTypeX3 of the serving cell (RRC_IDLE)/PCell (RRC_CONNECTED) or in RRCConnectionReconfiguration or SL-RRCConnectionReconfiguration for the concerned frequency, and the UE may be configured to use resource pools provided by RRC or SL-RRC signaling for the concerned frequency; or if zoneConfig or priorityConfig is included in SL-NRV2X-Preconfiguration for the concerned frequency, and the UE is configured to use resource pools in SL-NRV2X-Preconfiguration for the frequency. The UE may only use the pool which is associated with the synchronization reference source selected.

1> if zoneConfig or priorityConfig is not included in NRSystemInformationBlockTypeX1 and the UE is configured to transmit on s1-nrv2x-CommTxPoolNormalCommon or s1-nrv2x-CommTxPoolNormalDedicated; or
    1> if zoneConfig or priorityConfig is not included in the entry of s1-nrv2x-InterFreqInfoList for the concerned frequency and the UE is configured to transmit on s1-nrv2x-CommTxPoolNormal in s1-nrv2x-InterFreqInfoList in s1-nrv2x-InterFreqInfoList in RRCConnectionReconfiguration or SL-RRCConnectionReconfiguration; or
    1> if zoneConfig or priorityConfig is not included in SL-NRV2XSL-NRV2XSL-NRV2X-Preconfiguration for the concerned frequency and the UE is configured to transmit on s1-nrv2x-CommTxPoolList in SL-NRV2X-Preconfiguration for the concerned frequency:
        2> select a pool associated with the synchronization reference source selected;

Note that if multiple pools are associated with the selected synchronization reference source, it is up to UE implementation which resource pool is selected for NR-V2X sidelink communication transmission.

1> if zoneConfig or priorityConfig is included in NRSystemInformationBlockTypeX1 and the UE is configured to transmit on s1-nrv2x-CommTxPoolNormalCommon or s1-nrv2x-CommTxPoolNormalDedicated for NR-V2X sidelink communication; or
    1> if zoneConfig or priorityConfig is included in SL-NRV2X-Preconfiguration for the concerned frequency and the UE is configured to transmit on s1-nrv2x-CommTxPoolList in SL-NRV2X-Preconfiguration for the concerned frequency:
        2> select the pool configured with zoneID equal to the zone identity determined or priorityID equal to the priority identity from the higher layer and associated with the synchronization reference source selected.

Figure 12:
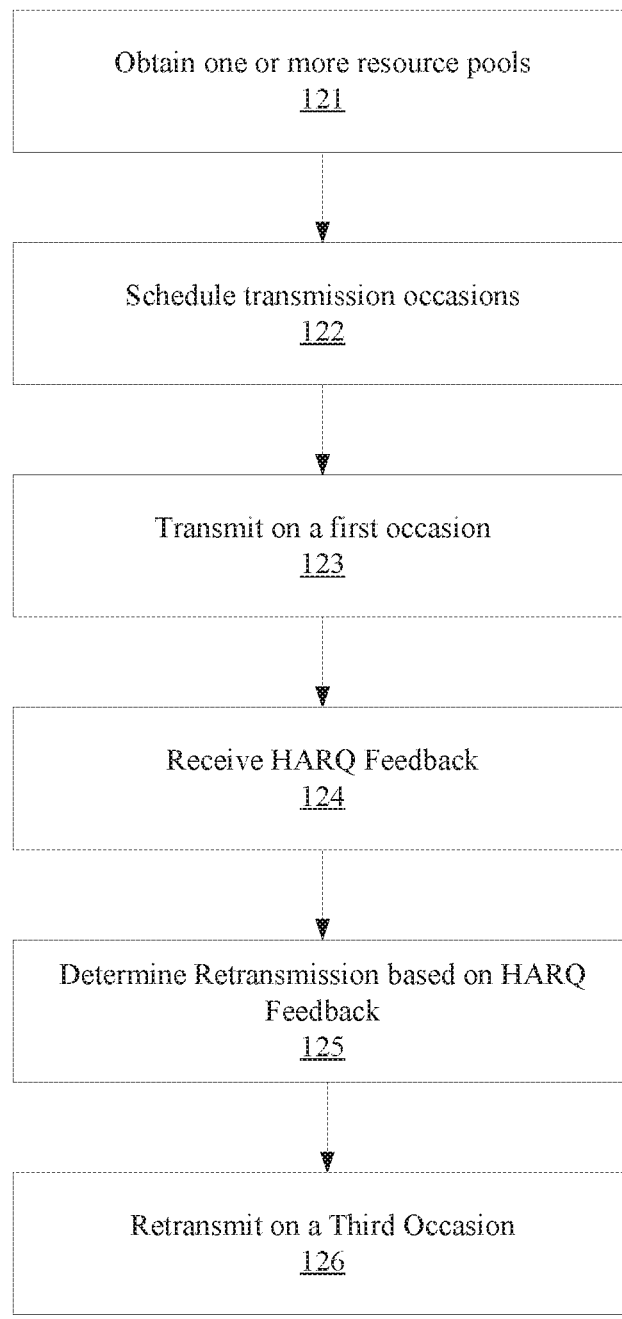
FIG. 12 illustrates an exemplary method.

FIG. 12 illustrates an exemplary method for broadcast, multicast, or unicast on sidelink. An apparatus or device, such as a user equipment, may perform the following steps. At step 121, one or more configurations may be obtained (e.g., received) for one or more resource pools which may be related to resources within just one sidelink bandwidth part (see FIG. 13-FIG. 14) or related to resources within a plurality (e.g., multiple) of sidelink bandwidth parts (see FIG. 14D). At step 122, a first transmission occasion, a second transmission occasion, and a third transmission occasion may be scheduled within the one or more resource pools which may be related to resources within just one sidelink bandwidth part or related to resources within the plurality of sidelink bandwidth parts. The scheduling may include indicating one or multiple transmission occasions with at least one sidelink control information (SCI). See, for example, FIG. 8-FIG. 9.

With continued reference to FIG. 12, at step 123, transmitting a data packet at the first transmission occasion on the sidelink bandwidth part configured at step 121 or indicated by the schedule at step 122, herein referred as selected SL-BWP. At step 124, receiving a HARQ feedback at the second transmission occasion on the selected SL-BWP. At step 125, determining a retransmission based on at least one HARQ feedback received on the selected SL-BWP. At step 126, retransmitting the data packet at the third transmission occasion on the selected SL-BWP.

It is understood that the entities performing the steps disclosed herein may be logical entities. The steps may be stored in a memory of, and executing on a processor of, a device, server, or computer system such as those illustrated in FIG. 15C or FIG. 15D. Skipping steps, combining steps, or adding steps between exemplary methods disclosed herein is contemplated.

Methods, systems, and apparatuses, among other things, as described herein may provide for means for implementing or managing broadcast, multicast, or unicast on sidelink for 5G eV2X. A method, system, computer readable storage medium, or apparatus has means for monitoring the SA SCI for unicast in the control resource pool at the unicast monitoring occasions defined by the unicast Sidelink Control Resource Set (SL-CORESET) within the common sidelink bandwidth part, SL-BWP-C; decoding the SA SCI; and based on decoding the SA SCI, pointing a unicast data allocated in a dedicated sidelink bandwidth part, SL-BWP-U. The apparatus may be a user equipment. The method, system, computer readable storage medium, or apparatus has means for automatically switching to the bandwidth part indicated in the SA SCI based on an SA SCI decoding timer. The method, system, computer readable storage medium, or apparatus has means for switching to the dedicated sidelink bandwidth part, SL-BWP-U, for unicast data. The method, system, computer readable storage medium, or apparatus has means for decoding the data successfully and sends an Acknowledgement (ACK) HARQ feedback at the resource indicated by the SA SCI within the same bandwidth part, SL-BWP-U. The method, system, computer readable storage medium, or apparatus has means for switching back to the common sidelink part, SL-BWP-C, based on a feedback timer and continue monitoring SA SCI for broadcast. The method, system, computer readable storage medium, or apparatus has means for groupcasting or unicasting based on the monitoring occasions defined by the broadcast SL-CORESET. The method, system, computer readable storage medium, or apparatus has means for groupcasting SL-CORESET. The method, system, computer readable storage medium, or apparatus has means for unicasting SL-CORESET. All combinations in this paragraph and the below paragraph (including the removal or addition of steps) are contemplated in a manner that is consistent with the other portions of the detailed description.

Methods, systems, and apparatuses, among other things, as described herein may provide for means for implementing or managing broadcast, multicast, or unicast on sidelink for 5G eV2X. Methods, systems, and apparatuses, among other things, as described herein may provide for means for sending a data packet on NR-PSSCH to receiver UE together with a first SCI on NR-PSCCH, which may carry control information for decoding the data, resource allocation for HARQ ACK/NACK, or the resource allocation for retransmission. The method, system, computer readable storage medium, or apparatus has means for based on a failure to decode the data, transmitting a NACK at the resource as indicated by the first SCI. Methods, systems, and apparatuses, among other things, as described herein may perform sidelink for 5G eV2X. The method, system, computer readable storage medium, or apparatus has means for obtaining one or more configurations (e.g., the system information (SI) or RRC based configurations) for one or multiple resource pools or resources within one or multiple sidelink band width parts; scheduling (e.g., one stage or two stage) a first transmission occasion, a second transmission occasion, and a third transmission occasion within one or multiple resource pools or resources of a sidelink band width part; transmitting (e.g., multi-cast or unicast) a data packet at the first transmission occasion on sidelink; receiving a HARQ feedback (e.g., HARQ feedback schemes for multicast) if enabled at the second transmission occasion on sidelink; determining a retransmission (e.g., HARQ feedback schemes for multicast) based on at least one HARQ feedback received on sidelink; and retransmitting the data packet at the third transmission occasion on sidelink. The method, system, computer readable storage medium, or apparatus has means for scheduling which may further include indicating one or multiple transmission occasions with at least one sidelink control information. The indicating may include one sidelink control information, which may include resource allocations for one or multiple transmission occasions and the configurations for decoding the data associated with (e.g., indicated by) the SCI. The indicating may include a first sidelink control information, which may include resource allocations for one or multiple transmission occasions, or a second sidelink control information, which includes the configurations for decoding the data associated with (e.g., indicated by) the SCI. The method, system, computer readable storage medium, or apparatus has means for transmitting the data packet that may include transmitting to one or multiple user equipment in the proximity on sidelink. The method, system, computer readable storage medium, or apparatus has means for transmitting the data packet that may include transmitting a data packet one or multiple times on sidelink (e.g., repetition). The method, system, computer readable storage medium, or apparatus has means for receiving HARQ feedback which may include receiving HARQ feedback, for example: 1) from one or multiple user equipment in the proximity on sidelink, 2) from multiple resource allocations, 3) from a single resource allocation, 4) on sidelink from one or multiple user equipment within a communication range in the proximity, 5) on sidelink based on the quality of service (QoS) from one or multiple user equipment in the proximity on sidelink, 6) includes a transmitter identification, 7) includes a receiver identification, or 8) at an allocation indicated by a physical sidelink feedback channel (PSFCH) with a PSFCH resource index or PSFCH resource ID. QoS may be indicated in sidelink control information associated with the data. All combinations in this paragraph and the above paragraph (including the removal or addition of steps) are contemplated in a manner that is consistent with the other portions of the detailed description.

Table 21 provides exemplary abbreviations and definitions.

TABLE 21

Abbreviations and Definitions

| | |
|---|---|
| ACK | Acknowledge |
| BO | Broadcast Occasion |
| BSM | Basic Safety Message |
| CAM | Common Awareness Messages |
| CPE | Collective Perception of Environment (high density, congestion) |
| DFN | Direct Frame Number |
| EtrA | Emergency Trajectory Alignment |
| LDM | Local Dynamic Map |
| HARQ | Hybrid Automatic Repeat Request |
| LTE | Long Term Evolution |
| NACK | Non-ACKnowledgement |
| NR | New Radio |
| NR-PSBCH | NR Physical Sidelink Broadcast Channel |
| NR-PSCCH | NR Physical Sidelink Control Channel |
| NR-PSDCH | NR Physical Sidelink Discovery Channel |
| NR-PSSCH | NR Physical Sidelink Shared Channel |
| NR-PSSS | NR Primary Sidelink Synchronization Signal |
| NR-SSSS | NR Primary Sidelink Synchronization Signal |
| RNTI | Radio Network Temporary Identifier |
| SCI | Sidelink Control Information |
| SSMS | Sensor and State Map Sharing |
| UE | User Equipment |
| V2V | Vehicle-to-Vehicle |
| V2X | Vehicle-to-everything |

Figure 11:
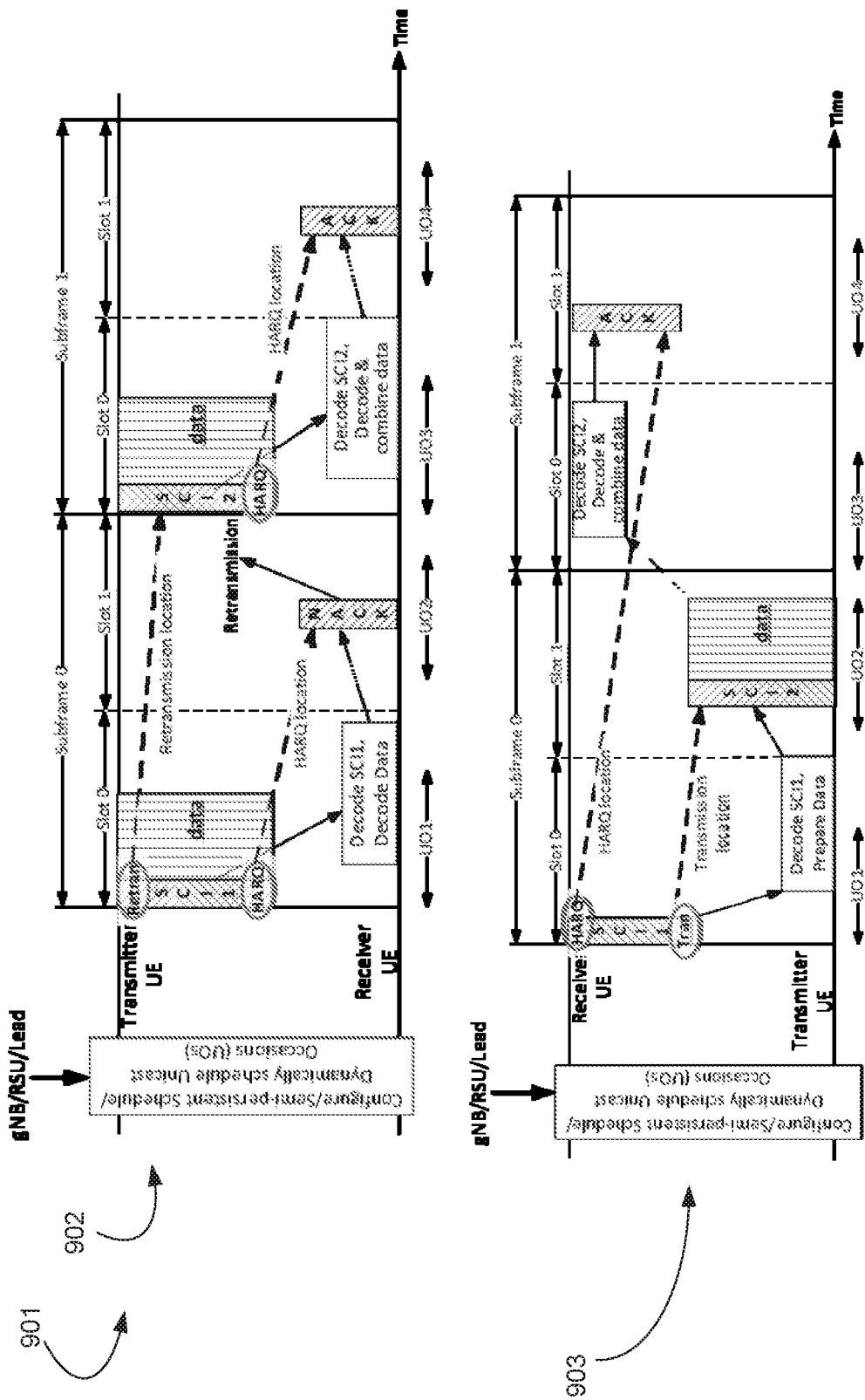
FIG. 11 illustrates an exemplary display (e.g., graphical user interface) that may be generated based on the methods, systems, and devices of mobility signaling load reduction.

FIG. 11 illustrates an exemplary display (e.g., graphical user interface) that may be generated based on the methods, systems, and devices of broadcast, multicast, or unicast on sidelink for 5G eV2X, as discussed herein. Display interface 901 (e.g., touch screen display) may provide text in block 902 associated with of broadcast, multicast, or unicast on sidelink for 5G eV2X, such as method flow. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of broadcast, multicast, or unicast on sidelink for 5G eV2X, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 15A:
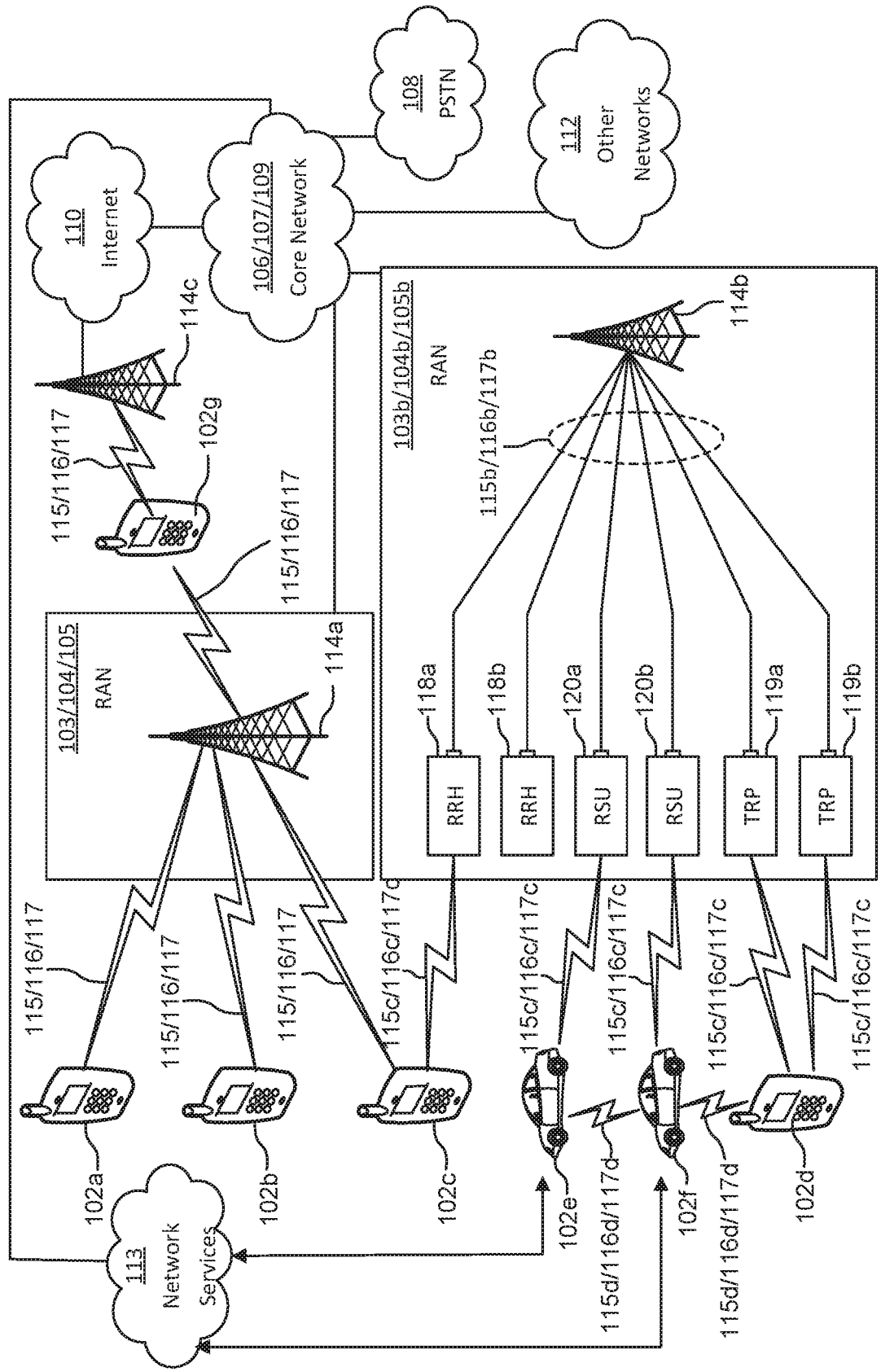
FIG. 15A illustrates an example communications system.

FIG. 15A illustrates an example communications system 100 in which the methods and apparatuses of broadcast, multicast, or unicast on sidelink for 5G eV2X, as described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 15A, FIG. 15B, FIG. 15C, FIG. 15D, FIG. 15E, or FIG. 15F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 15A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of broadcast, multicast, or unicast on sidelink for 5G eV2X, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b,TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 15A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of broadcast, multicast, or unicast on sidelink for 5G eV2X, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 15A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 15A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of broadcast, multicast, or unicast on sidelink for 5G eV2X, as disclosed herein. For example, the WTRU 102g shown in FIG. 15A may be configured to communicate with the base station 114a, which may employ a cellular-based radio technology, and with the base station 114c, which may employ an IEEE 802 radio technology.

Although not shown in FIG. 15A, it will be appreciated that a User Equipment may make a wired connection to a gateway. The gateway may be a Residential Gateway (RG). The RG may provide connectivity to a Core Network 106/107/109. It will be appreciated that many of the ideas included herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 15B:
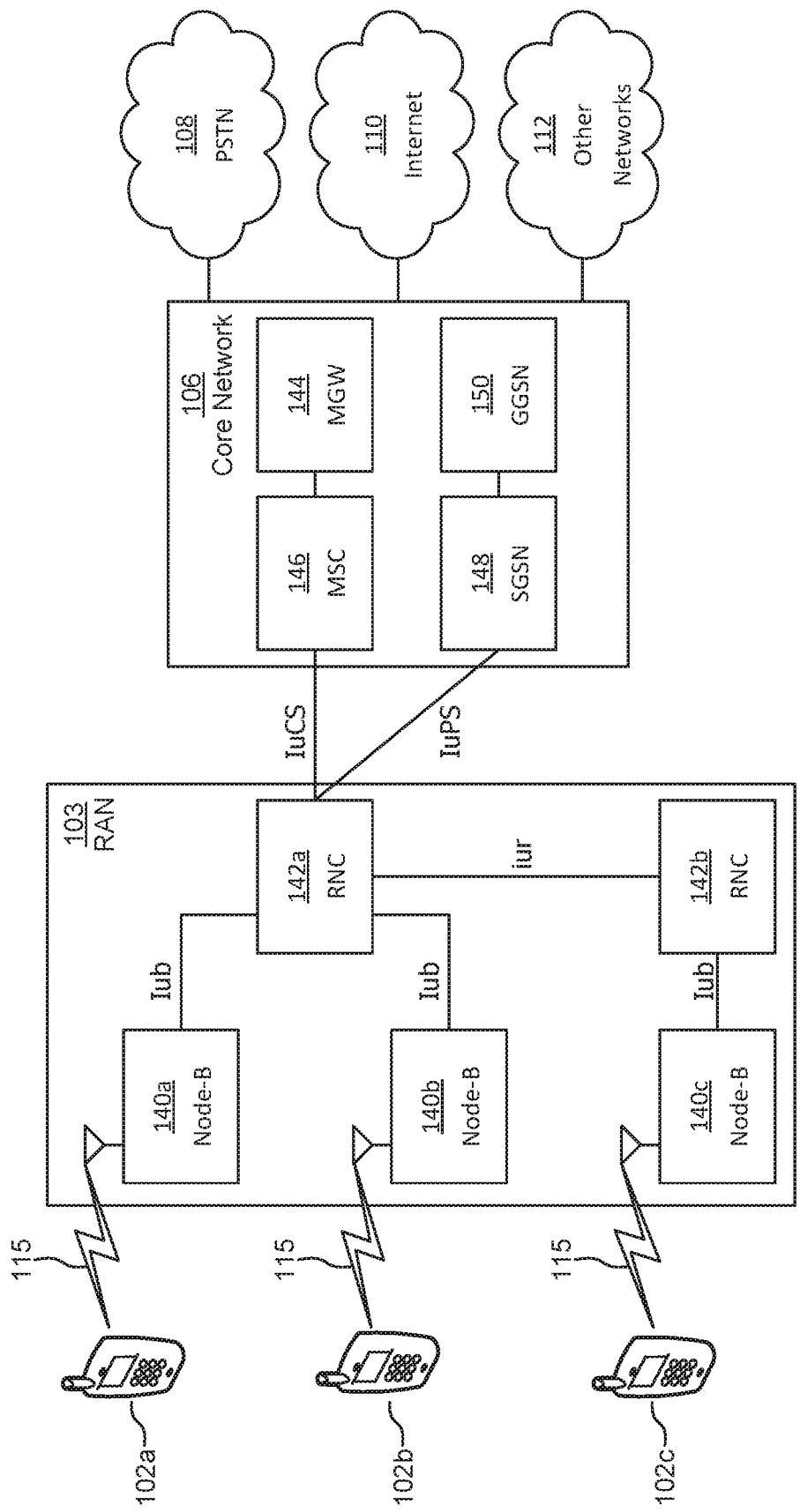
FIG. 15B illustrates an exemplary system that includes RANs and core networks.

FIG. 15B is a system diagram of an example RAN 103 and core network 106 that may implement methods, systems, and devices of broadcast, multicast, or unicast on sidelink for 5G eV2X, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 15B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 15B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 15B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 15C:
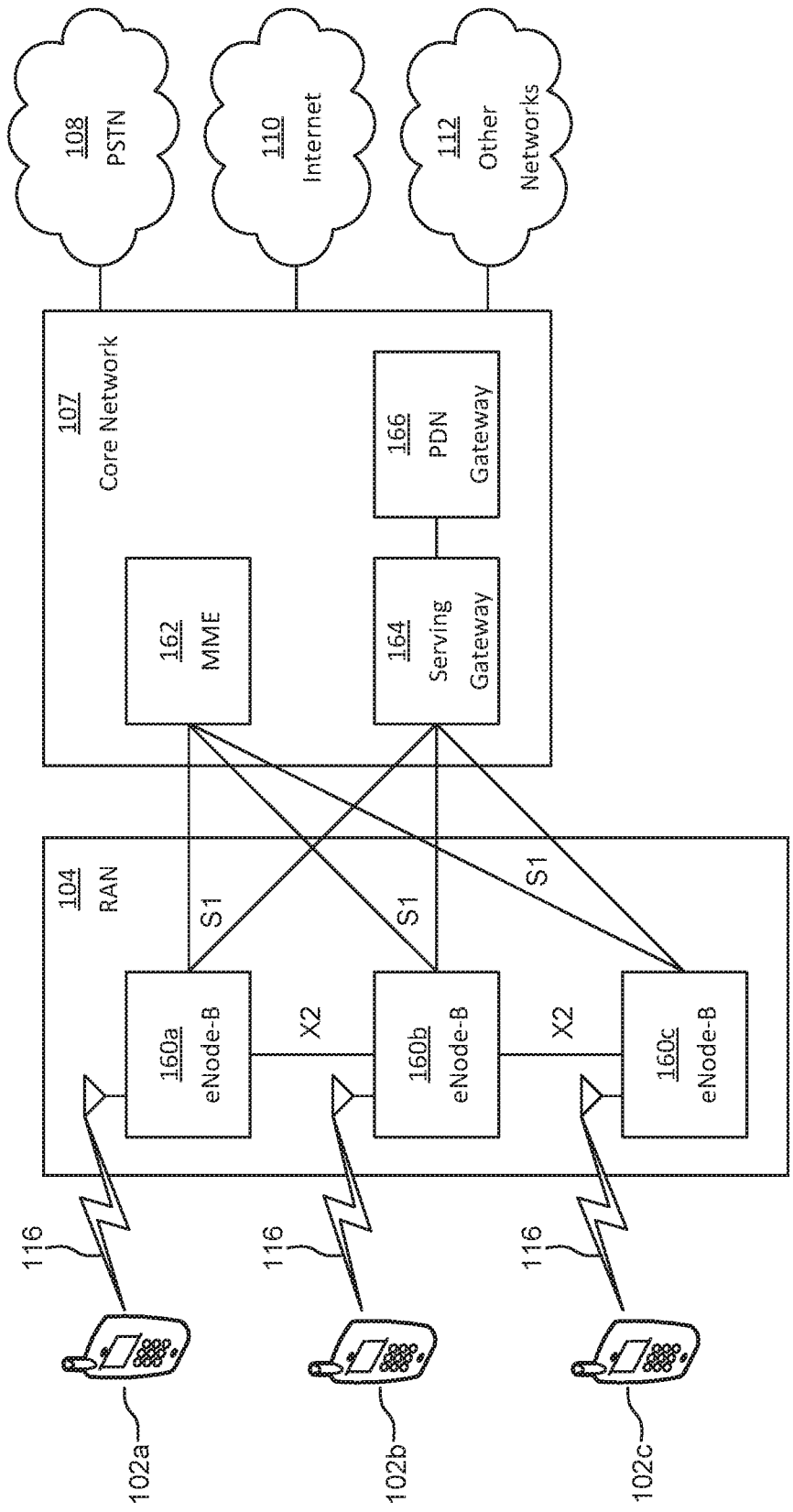
FIG. 15C illustrates an exemplary system that includes RANs and core networks.

FIG. 15C is a system diagram of an example RAN 104 and core network 107 that may implement methods, systems, and devices of broadcast, multicast, or unicast on sidelink for 5G eV2X, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 15C, the eNode-Bs 160a, 160b, and 160c may communicate with one another over an X2 interface.

The core network 107 shown in FIG. 15C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 15D:
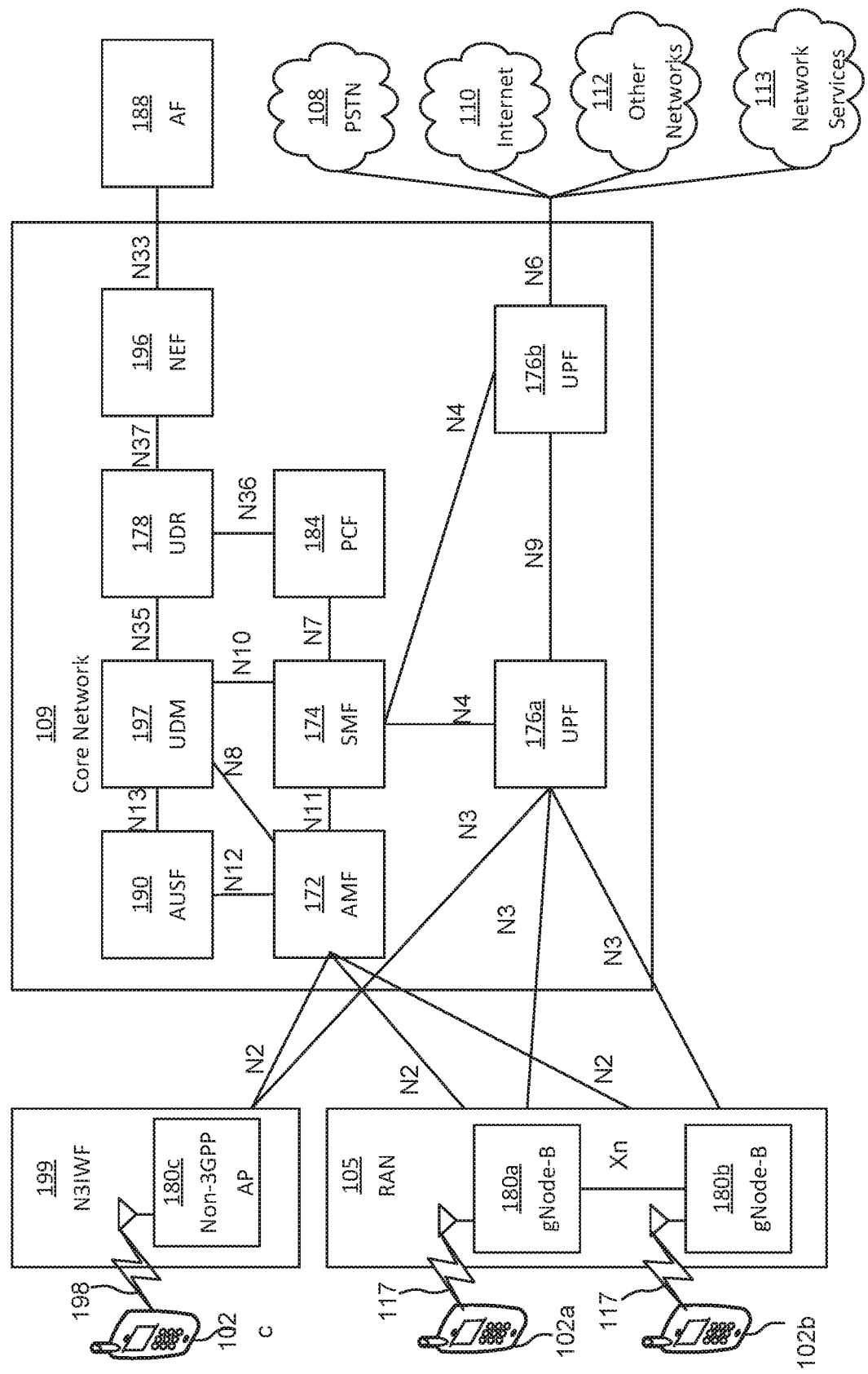
FIG. 15D illustrates an exemplary system that includes RANs and core networks.

FIG. 15D is a system diagram of an example RAN 105 and core network 109 that may implement methods, systems, and devices of broadcast, multicast, or unicast on sidelink for 5G eV2X, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 15D, the gNode-Bs 180a and 180b may communicate with one another over an Xn interface, for example.

The core network 109 shown in FIG. 15D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 15G.

In the example of FIG. 15D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 15D shows that network functions directly connect to one another, however, it should be appreciated that they may communicate via routing agents such as a diameter routing agent or message buses.

In the example of FIG. 15D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 15D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 15D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 15D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 15A, FIG. 15C, FIG. 15D, or FIG. 15E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 15A, FIG. 15B, FIG. 15C, FIG. 15D, or FIG. 15E are provided by way of example only, and it is understood that the subject matter disclosed and claimed herein may be embodied or implemented in any similar communication system, whether presently defined or defined in the future.

Figure 15E:
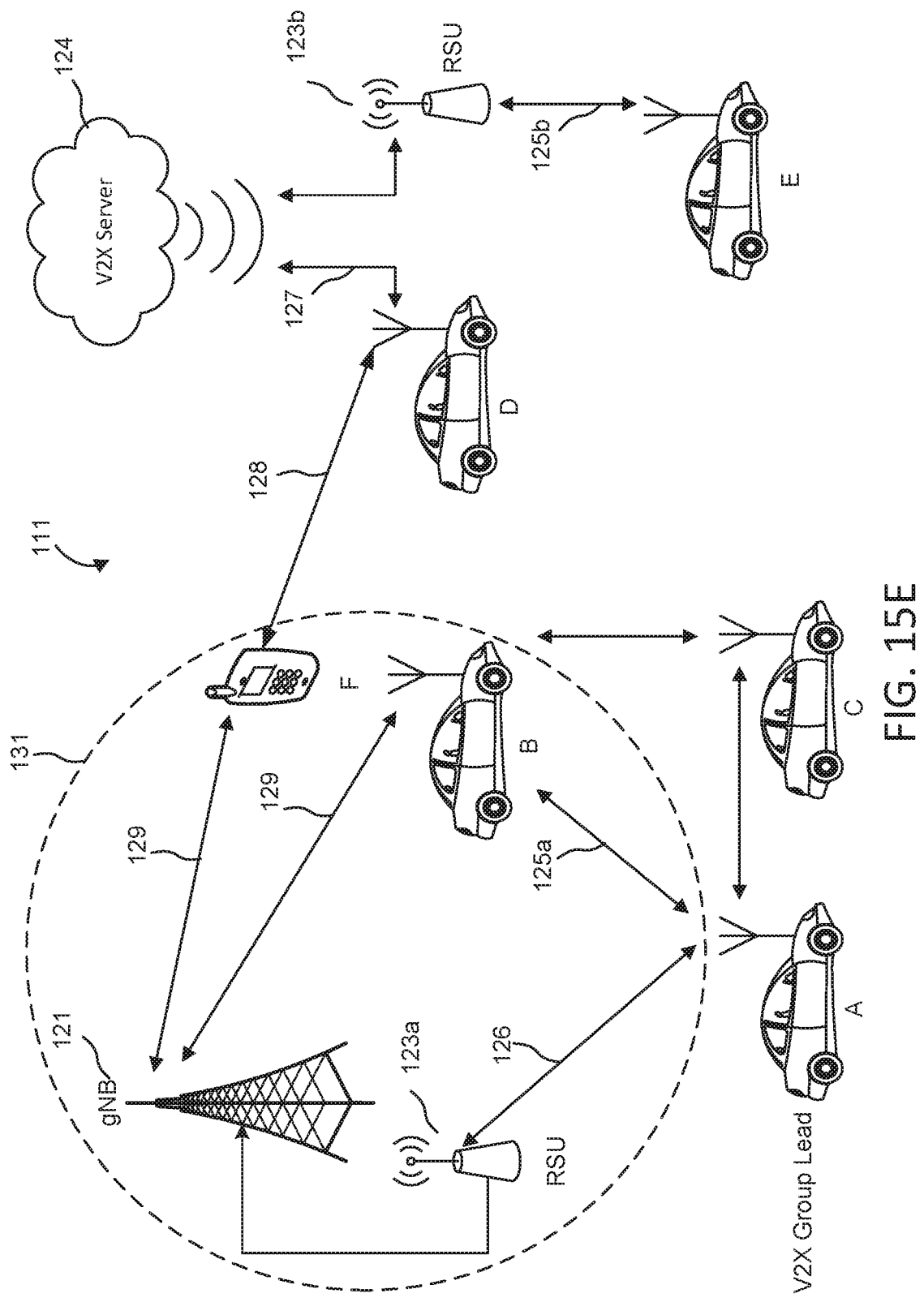
FIG. 15E illustrates another example communications system.

FIG. 15E illustrates an example communications system 111 in which the systems, methods, apparatuses that implement broadcast, multicast, or unicast on sidelink for 5G eV2X, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 15E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 15E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 15F:
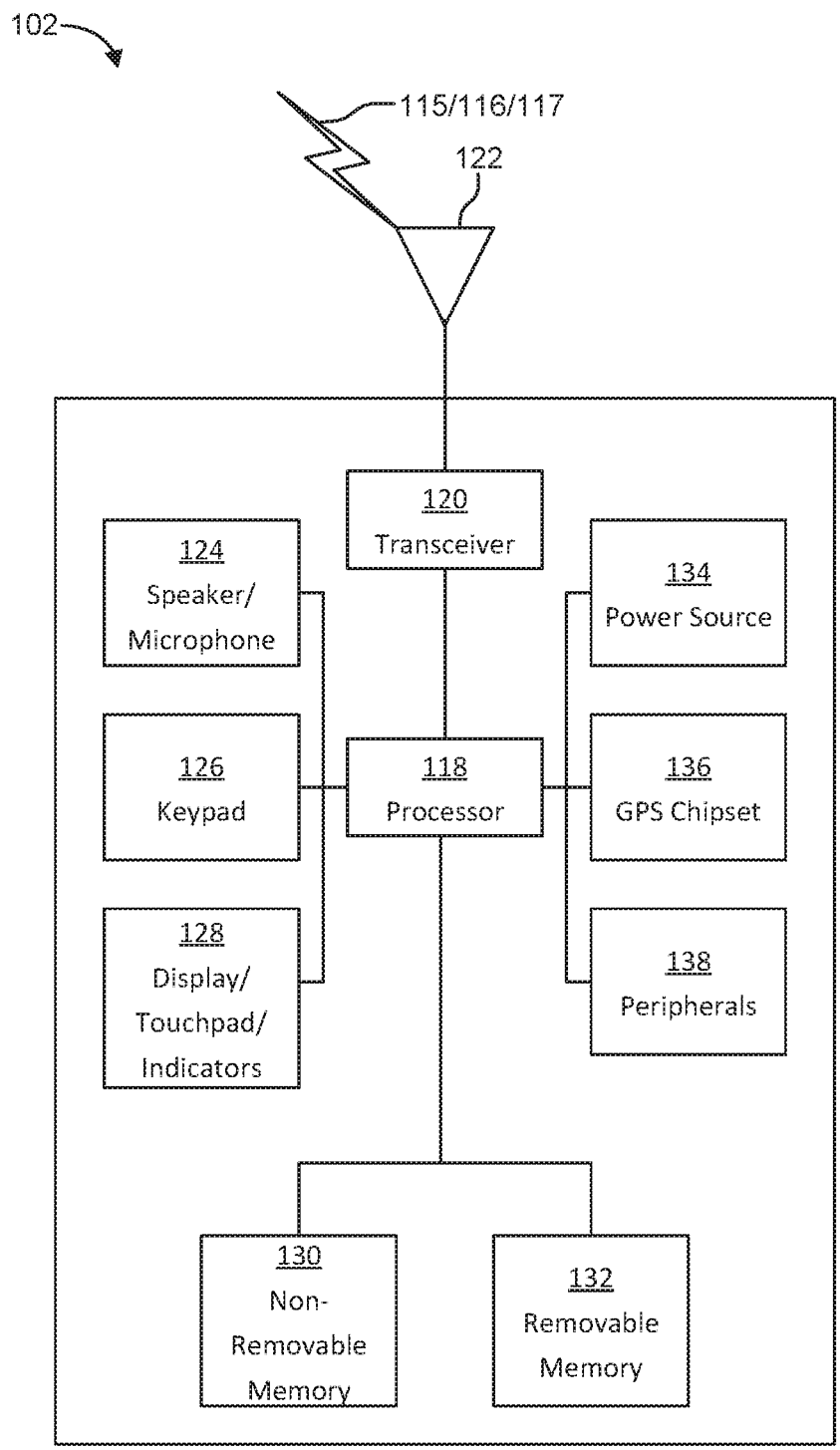
FIG. 15F is a block diagram of an example apparatus or device, such as a WTRU.

FIG. 15F is a block diagram of an example apparatus or device WTRU 102 that may be configured for wireless communications and operations in accordance with the systems, methods, and apparatuses that implement broadcast, multicast, or unicast on sidelink for 5G eV2X, described herein, such as a WTRU 102 of FIG. 15A, FIG. 15B, FIG. 15C, FIG. 15D, or FIG. 15E. As shown in FIG. 15F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 15F and may be an exemplary implementation that performs the disclosed systems and methods for broadcast, multicast, or unicast on sidelink for 5G eV2X described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 15F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 15A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 15F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the broadcast, multicast, or unicast on sidelink for 5G eV2X in some of the examples described herein are successful or unsuccessful, or otherwise indicate a status of broadcast, multicast, or unicast on sidelink for 5G eV2X and associated components. The control lighting patterns, images, or colors on the display or indicators 128 may be reflective of the status of any of the method flows or components in the FIG.'s illustrated or discussed herein. Disclosed herein are messages and procedures of broadcast, multicast, or unicast on sidelink for 5G eV2X. The messages and procedures may be extended to provide interface/API for users to request resources via an input source (e.g., speaker/microphone 124, keypad 126, or display/touchpad/indicators 128) and request, configure, or query broadcast, multicast, or unicast on sidelink for 5G eV2X related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 15G:
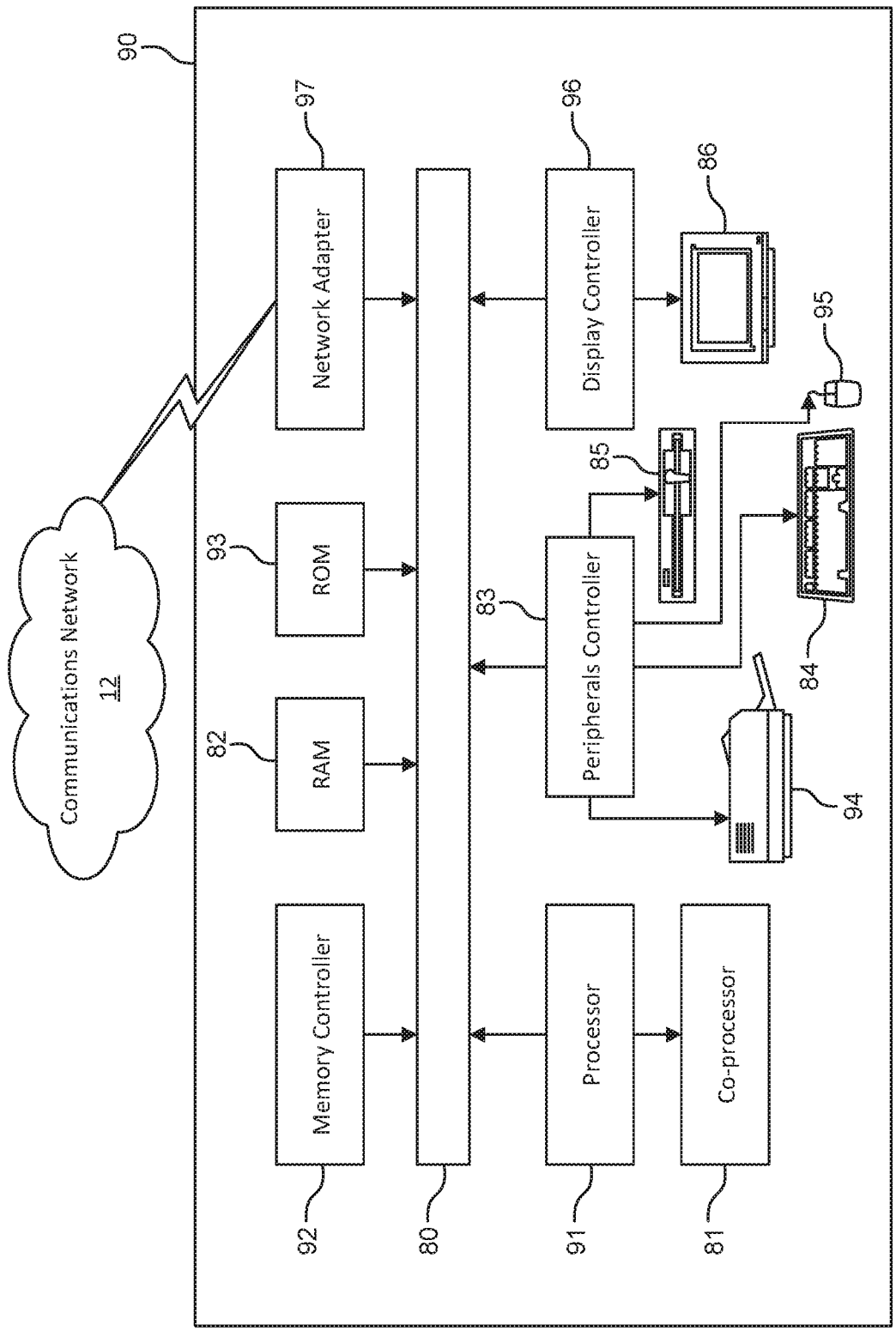
FIG. 15G is a block diagram of an exemplary computing system.

FIG. 15G is a block diagram of an exemplary computing system 90 in which one or more apparatuses of the communications networks illustrated in FIG. 15A, FIG. 15C, FIG. 15D and FIG. 15E as well as broadcast, multicast, or unicast on sidelink for 5G eV2X, such as the systems and methods illustrated in FIG. 1 through FIG. 11 or FIG. 13A-FIG. 14D described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for broadcast, multicast, or unicast on sidelink for 5G eV2X, such as receiving messages for configuring control signaling.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 15A, FIG. 15B, FIG. 15C, FIG. 15D, or FIG. 15E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—broadcast, multicast, or unicast on sidelink for 5G eV2X—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). For example combining some of the subject matter of FIG. 8A, FIG. 8B, FIG. 9A, FIG. 9B, FIG. 13A-FIG. 14D, HARQ feedback channel, sidelink NR-V2X communication, or HARQ ACK/NACK transmission may be combined, for example. Such other examples are intended to be within the scope of the claims if they have structural elements that do not differ from the literal language of the claims, or if they include equivalent structural elements with insubstantial differences from the literal languages of the claims. Methods, systems, and apparatuses, among other things, as described herein may provide for means for broadcast, multicast, or unicast on sidelink for 5G eV2X.

What is claimed is:

1. A wireless transmit/receive unit (WTRU) comprising:
a processor and a memory, the processor and the memory configured to:
send a first sidelink control information (SCI),
on a physical sidelink control channel (PSCCH),
wherein the first SCI is associated with a first format,
and wherein the first SCI comprises an indication of a first resource associated with an initial transmission; and
send the initial transmission using the first resource in accordance with the first SCI, the initial transmission comprising data and a second SCI,
wherein the second SCI comprises control information for decoding the data,
wherein the second SCI comprises cast bit information, the cast bit information comprising two bits indicating one of broadcast, groupcast, or unicast,
wherein the second SCI is associated with a second format, the second format being SCI Format 2-A,
wherein the first format and the second format are different,
wherein the second SCI comprises a source identifier (ID) and a destination identifier (ID),
wherein the second SCI comprises a hybrid automatic repeat request (HARQ) enable indicator and an indication of a HARQ process number,
and wherein the HARQ enable indicator indicates whether HARQ feedback is enabled or disabled using a single bit.

2. The WTRU of claim 1, wherein the processor and memory are configured to use the first SCI for processing associated with a physical sidelink shared channel (PSSCH).

3. The WTRU of claim 1, wherein the second SCI comprises a redundancy version, wherein the redundancy version is indicated by two or three bits.

4. The WTRU of claim 1, wherein the second SCI is formatted based on the type of communication.

5. A method comprising:
sending a first sidelink control information (SCI),
on physical sidelink control channel (PSCCH),
wherein the first SCI is associated with a first format, and wherein the first SCI comprises an indication of a first resource associated with an initial transmission; and
sending the initial transmission using the first resource in accordance with the first SCI, the initial transmission comprising data and a second SCI,
wherein the second SCI comprises control information for decoding the data,
wherein the second SCI comprises cast bit information, the cast bit information comprising two bits indicating one of broadcast, groupcast, or unicast,
wherein the second SCI is associated with a second format, the second format being SCI format 2-A,
wherein the first format and the second format are different,
wherein the second SCI comprises a source identifier (ID) and a destination identifier (ID),
wherein the second SCI comprises a hybrid automatic repeat request (HARQ) enable indicator and an indication of a HARQ process number,
and wherein the HARQ enable indicator indicates whether HARQ feedback is enabled or disabled using a single bit.

6. The method of claim 5, further comprising processing associated with a physical sidelink shared channel (PSSCH) using the first SCI.

7. The method of claim 5, wherein the second SCI comprises a redundancy version, wherein the redundancy version is indicated by two or three bits.

8. A method comprising:
receiving a first sidelink control information (SCI),
on physical sidelink control channel (PSCCH),
wherein the first SCI is associated with a first format,
and wherein the first SCI comprises an indication of a first resource associated with an initial transmission; and
receiving the initial transmission using the first resource in accordance with the first SCI, the initial transmission comprising data and a second SCI,
wherein the second SCI comprises control information for decoding the data,
wherein the second SCI comprises cast bit information, the cast bit information comprising two bits indicating one of broadcast, groupcast, or unicast,
wherein the second SCI is associated with a second format, the second format being SCI format 2-A,
wherein the first format and the second format are different,
wherein the second SCI comprises a source identifier (ID) and a destination identifier (ID),
wherein the second SCI comprises a hybrid automatic repeat request (HARQ) enable indicator and an indication of a HARQ process number,
and wherein the HARQ enable indicator indicates whether HARQ feedback is enabled or disabled using a single bit.

9. The method of claim 8, wherein the first SCI is used for processing associated with a physical sidelink shared channel (PSSCH).

10. The method of claim 8, wherein the second SCI comprises a redundancy version, wherein the redundancy version is indicated by two or three bits.

* * * * *